ELECTRONIC CODE COMMUNICATION SYSTEM

Filed Aug. 17, 1954 21 Sheets-Sheet 1

INVENTOR.
H. C. SIBLEY
BY Forest B. Hitchcock
HIS ATTORNEY

INVENTOR.
H. C. SIBLEY
BY Forest B. Hitchcock
HIS ATTORNEY

ELECTRONIC CODE COMMUNICATION SYSTEM

Filed Aug. 17, 1954 21 Sheets-Sheet 3

INVENTOR.
H. C. SIBLEY
BY Forest B. Hitchcock
HIS ATTORNEY

Feb. 17, 1959 H. C. SIBLEY 2,874,368

ELECTRONIC CODE COMMUNICATION SYSTEM

Filed Aug. 17, 1954 21 Sheets-Sheet 4

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY *Forest B. Hitchcock*
HIS ATTORNEY

Feb. 17, 1959 H. C. SIBLEY 2,874,368

ELECTRONIC CODE COMMUNICATION SYSTEM

Filed Aug. 17, 1954 21 Sheets-Sheet 10

INVENTOR.
H. C. SIBLEY
BY Forest B. Hitchcock
HIS ATTORNEY

ELECTRONIC CODE COMMUNICATION SYSTEM

Filed Aug. 17, 1954 21 Sheets-Sheet 13

INVENTOR.
H. C. SIBLEY
BY Forest B. Hitchcock
HIS ATTORNEY

ELECTRONIC CODE COMMUNICATION SYSTEM

Filed Aug. 17, 1954

INVENTOR.

H. C. SIBLEY

BY Forest B. Hitchcock

HIS ATTORNEY

INVENTOR.
H. C. SIBLEY
BY Forest B. Hitchcock
HIS ATTORNEY

Feb. 17, 1959 H. C. SIBLEY 2,874,368

ELECTRONIC CODE COMMUNICATION SYSTEM

Filed Aug. 17, 1954 21 Sheets-Sheet 16

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

FIG. 9B.

| TIME IN CONTROL CYCLE | STATION STEPPER TUBE GLOW AT CATHODE: | | | | |
|---|---|---|---|---|---|
| | STA. NO. 1 | STA. NO. 2 | STA. NO. 3 | STA. NO. 4 | STA. NO. 5 |
| SYNCH. PULSE AND STA. 1- GR. A. PERIODS | K1 | K2 | K3 | K4 | K5 |
| GR. A.-STA. 2 PERIOD | K10 | K1 | K2 | K3 | K4 |
| GR. A-STA. 3 PERIOD | K9 | K10 | K1 | K2 | K3 |
| GR. A-STA. 4 PERIOD | K8 | K9 | K10 | K1 | K2 |
| GR. A-STA. 5 PERIOD | K7 | K8 | K9 | K10 | K1 |
| GR. B-STA. 1 PERIOD | K6 | K7 | K8 | K9 | K10 |
| GR. B-STA. 2 PERIOD | K5 | K6 | K7 | K8 | K9 |
| GR. B-STA. 3 PERIOD | K4 | K5 | K6 | K7 | K8 |
| GR. B-STA. 4 PERIOD | K3 | K4 | K5 | K6 | K7 |
| GR. B-STA. 5 PERIOD | K2 | K3 | K4 | K5 | K6 |

FIG. 9A.

| GLOW ON STATION STEPPER CATHODE | SYSTEM FUNCTION |
|---|---|
| K10 | EXECUTE GROUP A CONTROLS |
| K9 | |
| K8 | NONE |
| K7 | CLEAROUT SHIFT REGISTER |
| K6 | STATION GATE: TRANSMIT GROUP B INDICATIONS AND RECEIVE GROUP B CONTROLS |
| K5 | EXECUTE GROUP B CONTROLS |
| K4 | |
| K3 | NONE |
| K2 | CLEAROUT SHIFT REGISTER |
| K1 | STATION GATE: TRANSMIT GROUP A INDICATIONS AND RECEIVE GROUP A CONTROLS |

INVENTOR.
H. C. SIBLEY
BY Forest B. Hitchcock
HIS ATTORNEY

INVENTOR.
H. C. SIBLEY
BY Forest B. Hitchcock
HIS ATTORNEY 2,874,368
Patented Feb. 17, 1959

2,874,368

ELECTRONIC CODE COMMUNICATION SYSTEM

Henry C. Sibley, Spencerport, N. Y., assignor to General Railway Signal Company, Rochester, N. Y.

Application August 17, 1954, Serial No. 450,303

9 Claims. (Cl. 340—163)

This invention relates to an electronic pulse type code communication system. More particularly, this invention pertains to such a system which is adapted for the control of track switches, signals, and other devices at various remote field station locations of a section of railroad from a control office location and which is also adapted for the reception of indications at such control office from the various field locations.

Various systems have been developed to make it possible to control the switches, signals, and other devices of a section of railroad from a central location. These systems generally also provide that various indications may be transmitted from each of the various field stations to the control office. These indications comprise information as to the actual operated conditions of the switches and signals and also provide current information as to the occupancy of the various track sections in the territory. Other information may, as desired, also be transmitted to the control office from the field stations.

The code communication systems of the prior art have generally been of the kind using electromagnetic relays so that their speed of operation has necessarily been limited in accordance with the operating times of the relays that are used. Quite frequently these systems have also employed only a single channel of communication for both controls and indications with the controls having superiority so that indications are transmitted only at times when controls are not being transmitted.

Because of the mechanical nature of these prior types of systems, they are normally at rest and operate only when new information (either control or indication) is to be transmitted. A control cycle, usually comprising only the control code for a particular field station, may be initiated by a change in position of one of the operating levers on a master control panel at the control office. An indication cycle, comprising the entire indication code of a single station, is initiated by a change in one of the operated conditions of the devices at such station or by a change in track occupancy conditions of one of the track sections associated with that station. Since two or more field stations may thus attempt to initiate the transmission of an indication cycle simultaneously, it is necessary to establish a predetermined superiority among the various field stations so that, in the event two or more stations attempt to transmit indications simultaneously, the code of the superior station will be transmitted first. This makes it necessary, of course, to so organize the system that differences in superiority between codes for the different field stations will be recognized. An added disadvantage of such systems is that a large part of each control and indication cycle must be devoted to identifying the particular field station with which communication is being had.

In view of these shortcomings of the relay operated code communication systems of the prior art, it has been proposed to provide a system that is electronic in nature. The high speed of such a system which is readily obtainable without mechanical movement and resultant wear makes it entirely feasible to provide a continuous scanning type of system. In such a system, the controls for the various field stations are transmitted successively and repetitively. In other words, in one control cycle all of the controls for all of the stations are transmitted, and this cycle is then followed by an identical cycle, and so on. Concurrently with the transmission of the controls, all indications from all the field stations are transmitted in succession back to the control office. Because of the high speed of such a system, the transfer of controls and indications is so rapid that it is virtually impossible for any backlog of information to accumulate. There is also no need to establish code superiority among the different field stations because each station can transmit its indications only during its allotted part of the cycle. Also, since the code relating to a particular field station is identifiable with that station simply by its position in either a control or indication cycle, substantially the entire cycle may be used for the transmission of controls and indications, respectively.

One objection in the past to the use of electronic systems, however, has been their complexity and their rather severe power requirements. The various field stations of a system of this kind may frequently be at remote locations where commercial power sources are not available or are not sufficiently reliable to be used as the sole source of power. It is, therefore, necessary that the field station apparatus be so organized that it can be operated from a battery source of power without imposing an unduly severe load upon such battery. Accordingly, the circuit organization of the present invention has been so constructed that the power requirements for the system and particularly at the field stations have been reduced to a practicable low value. This highly desirable feature has been accomplished in part through the use of various circuit organizations using cold cathode glow discharge tubes. These tubes, by not requiring any filament heating power, considerably reduce the power requirements for the system apparatus.

Described briefly, and without any attempt to define the invention in its exact terms, the electronic code communication system here disclosed is of the kind known as a repeat scanning type of system. Two channels of communication are provided between the control office and the various field stations. The controls desired to be effective on the apparatus at the different field stations are constantly transmitted over one of these channels of communication and the indications are transmitted on the other channel concurrently with the controls.

The transmitted information (controls or indications) comprises a distinctive code having time-spaced distinctive characters. In the present embodiment of the invention the two different channels of communication comprise two different carrier frequencies which are transmitted over a single pair of line wires. Other means of transmission such as by space radio may equally well be used.

The distinctive characters making up the indication code may for convenience be termed "marks" and "spaces." For a space character, no carrier is transmitted; for a mark character, the carrier frequency is transmitted for the first portion only of the pulse period allotted to the digit; no carrier is transmitted on the second portion so that when successive marks are transmitted there will be gaps between successive transmissions of carrier to facilitate the recognition of the marks as separate characters.

The distinctive characters making up the control code cycle include these same marks and spaces and also include station-call and synchronizing marks. These latter two code characters are alike and are similar to the mark character just described with the exception that their duration is twice as great.

The control code cycle always originates with a synchronizing pulse. Following the synchronizing pulse comes the station-call pulse for the first field station and then a group of code digits (marks and spaces) that comprises the control for the devices at the first station. Upon the conclusion of the control code for the first station another station-call pulse appears in the control code. This is then followed by another group of marks and spaces representing the control code for the second field station. The controls for all the various field stations are thus transmitted sequentially so as to make up a complete control code cycle. At the end of this cycle another synchronizing pulse is transmitted to initiate a second control cycle similar to the first, and this occurs continuously all the time that the system is in operation.

During a control code cycle, the station-call pulses occur only at fairly long intervals since successive station-call pulses are always separated by the control code for a particular field station. At the beginning of each control code cycle, however, the synchronizing pulse occurs and is followed immediately thereafter by a station-call pulse for the first field station. The occurrence of these two long code characters in succession is detected at each field station and results in each field station's being brought into synchronism with the transmitting control office at the beginning of each new cycle in the event that any field station has, since the beginning of the previous cycle, for any reason gotten out of synchronism with the control office.

At each field station, the station-call pulses are recognized as such and applied to a station stepper. This station stepper counts the successive station-call pulses and causes the field station to become responsive to the received control code only when the number of received station-call pulses corresponds to the number of that field station as related to its position in the control cycle. The decoding means at the field station is thus made active so that the required information can be extracted from the code for that station and made effective to control the various devices at that station. Upon the reception of the next station-call pulse for the following field station, the decoding circuits are once again rendered inactive. During the interval that the field station apparatus is gated to be responsive to its control code, its indication coding and transmitting means are also made effective so that the indication code may be transmitted back to the control office concurrently with reception of the control code.

At the control office, various gating circuits selectively condition the indication receiving means so that the successively received indication codes will be routed to the proper indication storage apparatus. For example, at the time that the first field station is being transmitted to, the gating circuits at the control office condition the indication storage circuits associated with the first field station so that the indication code received back from the first field station at this time is routed to the indication storage apparatus that is directly associated with this first station. In the same way, at the time that the control code for station 2 is being transmitted, the gating circuits at the control office cause any indication code received during this time to be routed to the proper indication storage means provided for this second station.

With a code organization as described in which one kind of character is represented by the absence of any transmitted signal, it is necessary that there be some means provided at each field station to demarcate the various pulse periods of a received control code so that it can be determined whether or not carrier is or is not received on any such pulse period. It can thus be determined whether or not any received character is a mark or a space or a station-call or synchronizing mark. This is accomplished by providing an oscillator at each field station which is constructed to operate at the same frequency as a corresponding oscillator at the control office. The control office oscillator establishes the repetition rate for the entire system and is constructed in the present embodiment of the invention to operate at a frequency of 200 cycles per second. This establishes that the duration of each mark or space period is of five milliseconds duration. The similar oscillator at each field station causes the station period for that station to be broken up into similar five millisecond pulse periods. The reception of carrier at the field station during a pulse period is an indication that that character is a mark pulse; when no carrier is received during any five millisecond pulse period that character is recognized as a space.

The code communication system of this invention is particularly adapted for the transfer of a large number of controls and indications between the control office and each of a plurality of field stations. Ordinarily, when a large number of controls is desired to be transmitted to any field station or a large number of indications is desired to be received from a field station, the complexity of the decoding apparatus at the field station is increased correspondingly. In the present system, however, this is avoided by communicating with each field station twice in a complete cycle of operation. The controls and indications relating to a particular field station are transmitted in two different groups. Only part of the controls for a particular station are transmitted to that station the first time; the remainder of the controls are transmitted in the second half of the cycle. In a similar manner, substantially half of the indications are transmitted in one group, and the remaining indications are transmitted in the second group.

As an illustration, during the station period following the transmission of the second station-call pulse of a cycle, a series of control code characters is transmitted which represents half of the controls for the second field station. This transmission of controls to the second station terminates with the transmission of the third station-call pulse. In addition to transmitting substantially half of the controls to the second field station during this interval, half of the indications from the second field station are received at the control office. After this, controls are transmitted to the remaining field stations in sequence but in each case only half of the controls are transmitted and half of the indications from the respective field station are received. While communication is thus being had with the other field stations, the previously received controls at the second field station are executed (i. e. made effective to control the proper devices) and following this they are, in effect, erased from the field station apparatus.

At a later time in the cycle, the second group of controls is transmitted from the control office to the second station. The station stepper causes the decoding circuits to again become responsive to the received control code during the station period extending from the seventh to the eighth staton-call pulse so that this second group of controls will be properly registered in the decoding circuits for this field station. Also, during this station period, the second half of the indications from the second field station are transmitted to the control office. Following this, field stations Nos. 3 and 4 and all other stations receive their second group of controls. In the meantime, the second group of controls registered in the decoding apparatus of the second field station is executed and the registered controls once again erased from the system so that, when the first group of controls for this station is again received in the next cycle of operation, the control registering means is properly cleared out and can respond to the newly received controls.

By thus transmitting a large number of controls and indications in separate groups rather than all at one time, it is possible to simplify greatly the code storage and handling means at each field station. The code handling capacity required is, in effect, approximately halved with a resulting substantial decrease in the number of tubes required and also in the amount of power required to operate the system.

The station stepper provided at each field station comprises a multicathode, cold cathode glow tube. This tube is of the kind having a single anode and a plurality of cathodes arranged in a circular pattern about the anode. The input counts to the tube are applied to transfer electrodes. When the appropriate plate-cathode voltage is applied to the tube, a glow develops between the anode and one of the cathodes. Applying an input count to the transfer electrodes causes this glow to transfer to an adjacent cathode. Thus, if an input pulse is applied to the transfer electrodes for each received station-call pulse, the glow transfers from cathode to cathode and the particular cathode which is glowing at any time provides a means for determining how many station-call pulses have been received since the initial synchronizing pulse.

More specifically, the number of cathodes for the station stepper multicathode tubes preferably equals the number of station periods occurring in a complete cycle of operation. Synchronization of each field station with the transmitting control office takes place at the beginning of each cycle. As a result of this synchronization, the station stepper tube at each field station causes the glow to be on the appropriate cathode for that station at the beginning of each cycle. Consequently, the location of the glow at any subsequent time in the cycle readily determines how many station-call pulses have been received since the beginning of the cycle and thus provides a means for determining which field station should have its decoding circuits at that instant responsive to the received control code.

A shift register is included in the apparatus at each field station and is used both for the registering of received control codes and for registering indication codes prior to their being transmitted to the control office. Just prior to the time that any field station is to receive a control code, the various stages of the shift register are conditioned to what may be termed their "0" or "1" conditions in accordance with whether a mark or a space character is to be transmitted in the corresponding pulse period of the indication code. As the control code is received, an input pulse is applied to the input of the shift register for each occurrence of a mark character in the control code. Between successive characters of the code, whether marks or spaces, shift pulses are applied also to the shift register. These shift pulses have the effect, not only of stepping the received control code into the shift register, but of causing the indication code previously stored in the shift register to appear as time-spaced pulses at the output of the shift register. The exact manner in which this occurs will later be described when a detailed consideration of these circuits is undertaken. The effect, however, is that the single shift register at each field station is concurrently used for both indications and controls with the indications appearing on the output lead of the shift register at the same time that the received control code is applied to the input lead of the shift register.

A feature of this invention is the use of a shift register comprising cold cathode, grid glow tubes. Obviously, an important advantage resulting from the use of cold cathode tubes in a shift register is elimination for any need of supplying filament power. The shift register of this invention has the added advantage that the stages are so interconnected that the transfer of the condition of one stage to the next is greatly facilitated. In shift registers of the prior art, it has been common practice to provide delay circuit means between the successive stages for reasons which will later be more apparent. The use of such delay circuit means introduces added complexity, particularly so in a shift register adapted to operate at a relatively slow rate, as in the system of this invention where the repetition rate of the system is based on a frequency of 200 cycles per second.

The features herein disclosed which relate to the characteristics of the shift register per se have been disclosed and claimed in the divisional application Ser. No. 771,794 filed November 4, 1958.

Another feature of the present invention resides in the use of cold cathode tubes for the storage of indications at the control office. A novel gated matrix organization has been provided, making it possible to provide for the display of a large number of indications at the control office in a manner that is both economical with respect to the number of tubes and power required since the indication storage tubes are, as already mentioned, of the cold cathode type requiring no filament heating power.

An object of this invention, therefore, is that there is provided an improved electronic code communication system using a minimum of apparatus to provide a reliable and fast operating organization.

Another object of this invention is the provision of an electronic code communication system using cold cathode tubes for station counting, for demarcating the pulse periods for the reception of controls and transmission of indications at a field station, and for the display of indications at a control office.

An additional object of this invention is to provide a receiving organization providing an improved electronic shift register including cold cathode tubes and so organized as to eliminate the need for pulse delaying means between successive stages of the shift register.

An added object of this invention is to provide a shift register for an electronic code communication system which is adapted so as to accommodate simultaneously the transmission of indications and the reception of controls.

An additional object of this invention is to provide station counting means at the various field stations comprising a multicathode, cold cathode glow tube with an associated circuit organization that facilitates the construction of the field station apparatus for the different field stations.

Still another object of this invention is to provide indication storage means at the control office comprising a matrix of cold cathode glow tubes so as to provide for the storage of a large number of indications with a minimum of tubes and a minimum of power requirements.

Another object of this invention is to provide means for establishing synchronization between control office and the various field stations in a simplified manner.

Other objects, purposes and characteristic features of this invention will in part be obvious from the accompanying drawings and in part pointed out as the description of the invention progresses.

In describing this invention in detail, reference will be made to the accompanying drawings in which those parts having similar features and functions are designated throughout the several views by like reference characters, and in which.

Figure 3A:
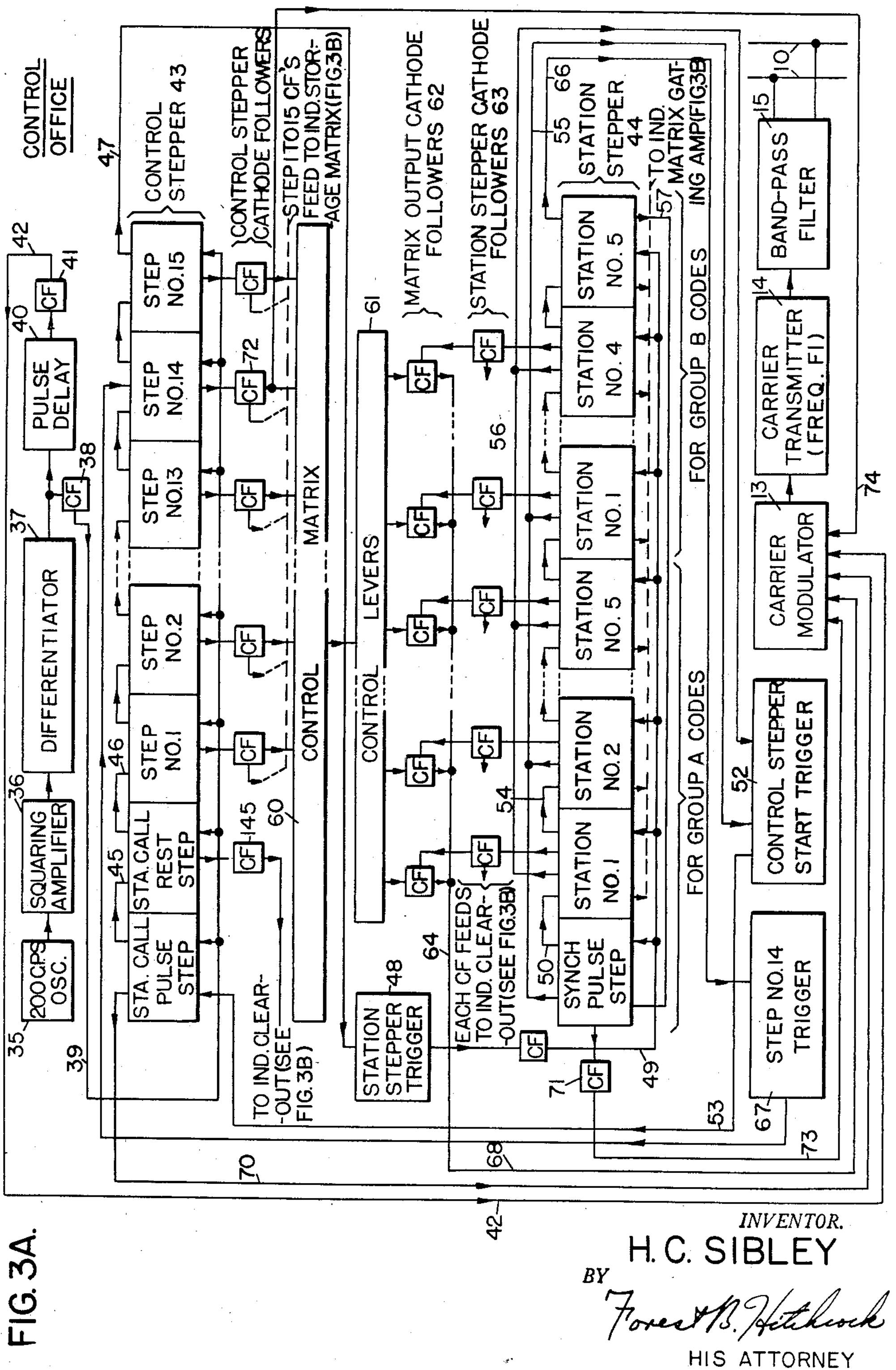
Figure 3B:
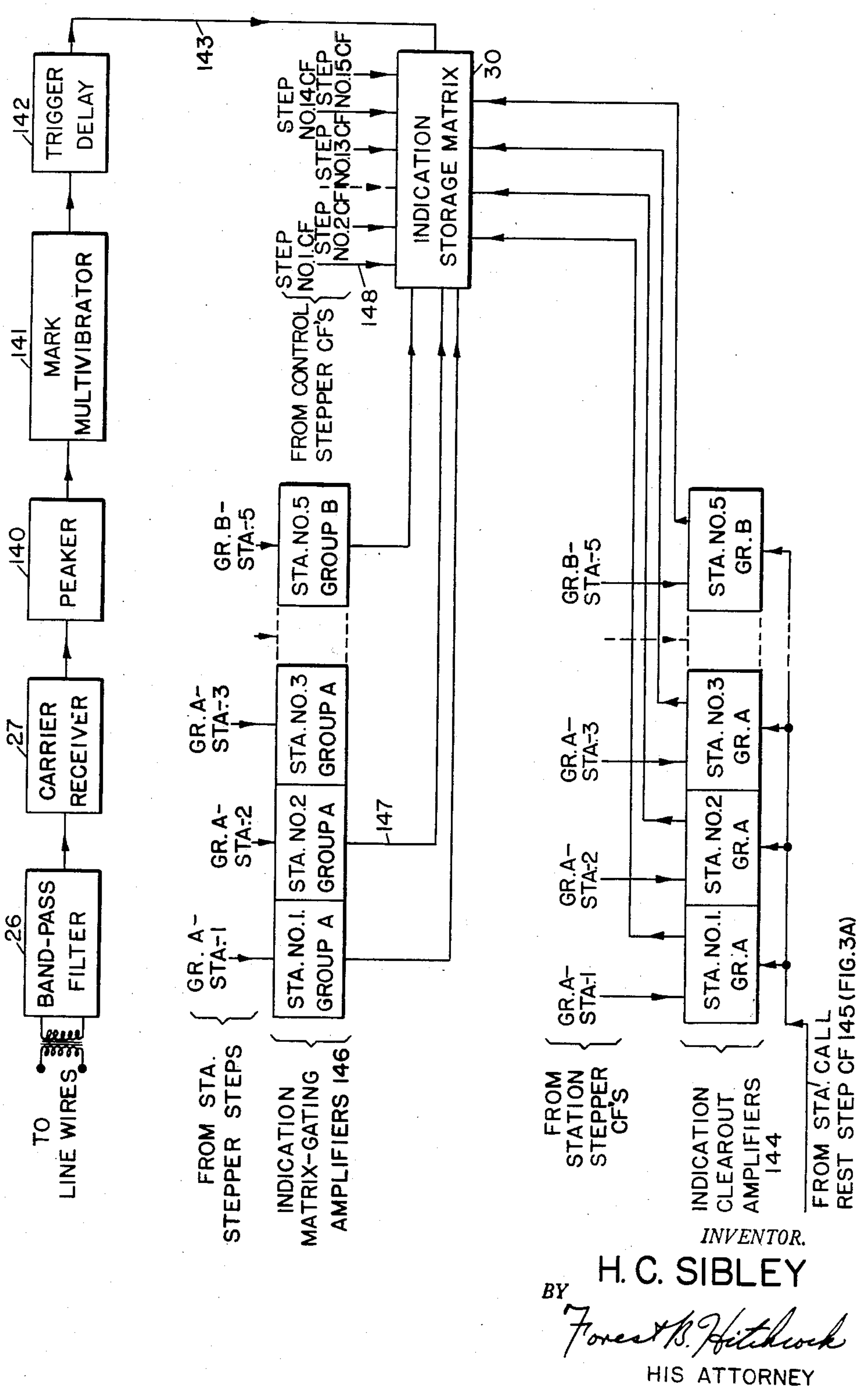
Figure 5A:
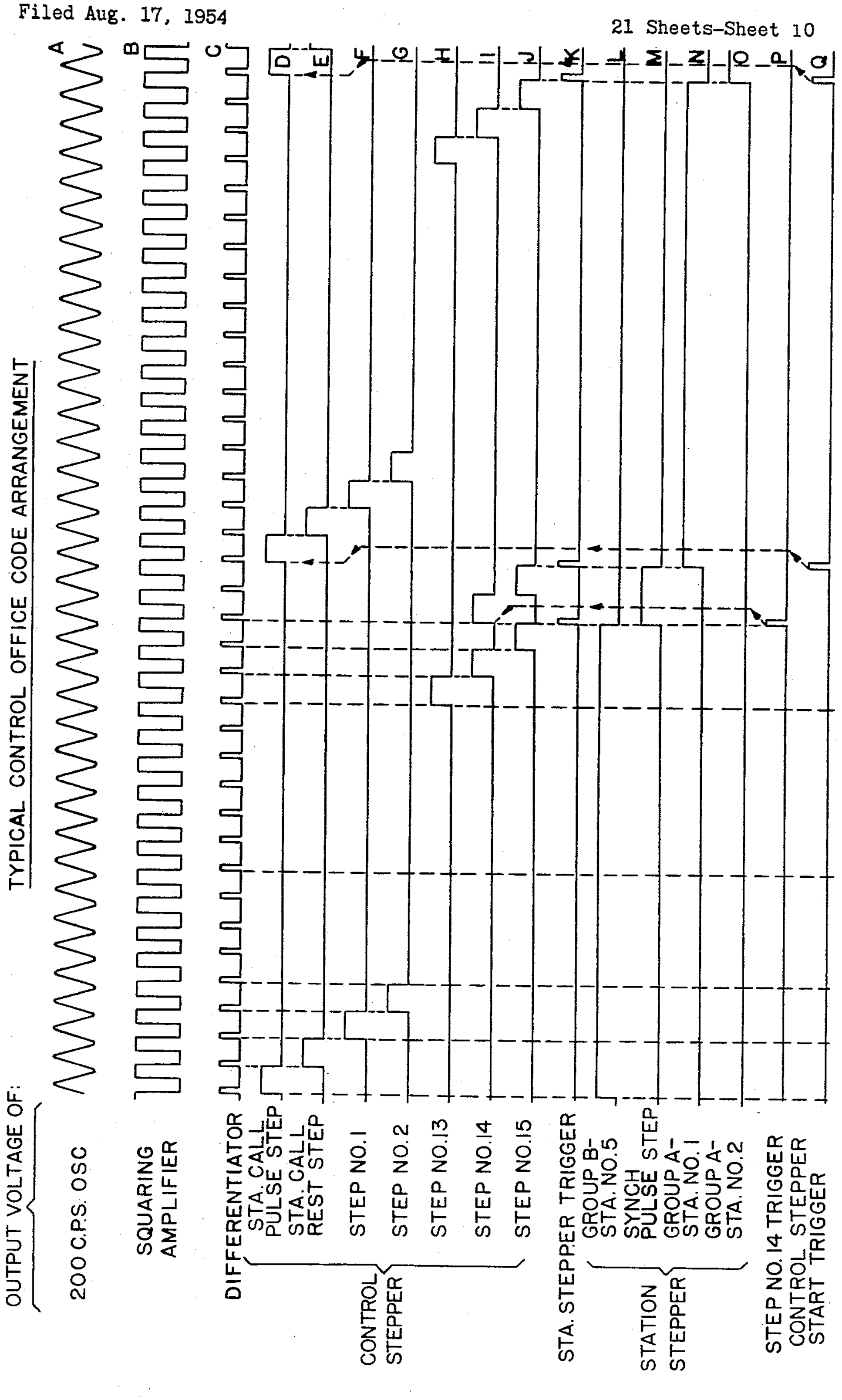
Figure 5B:
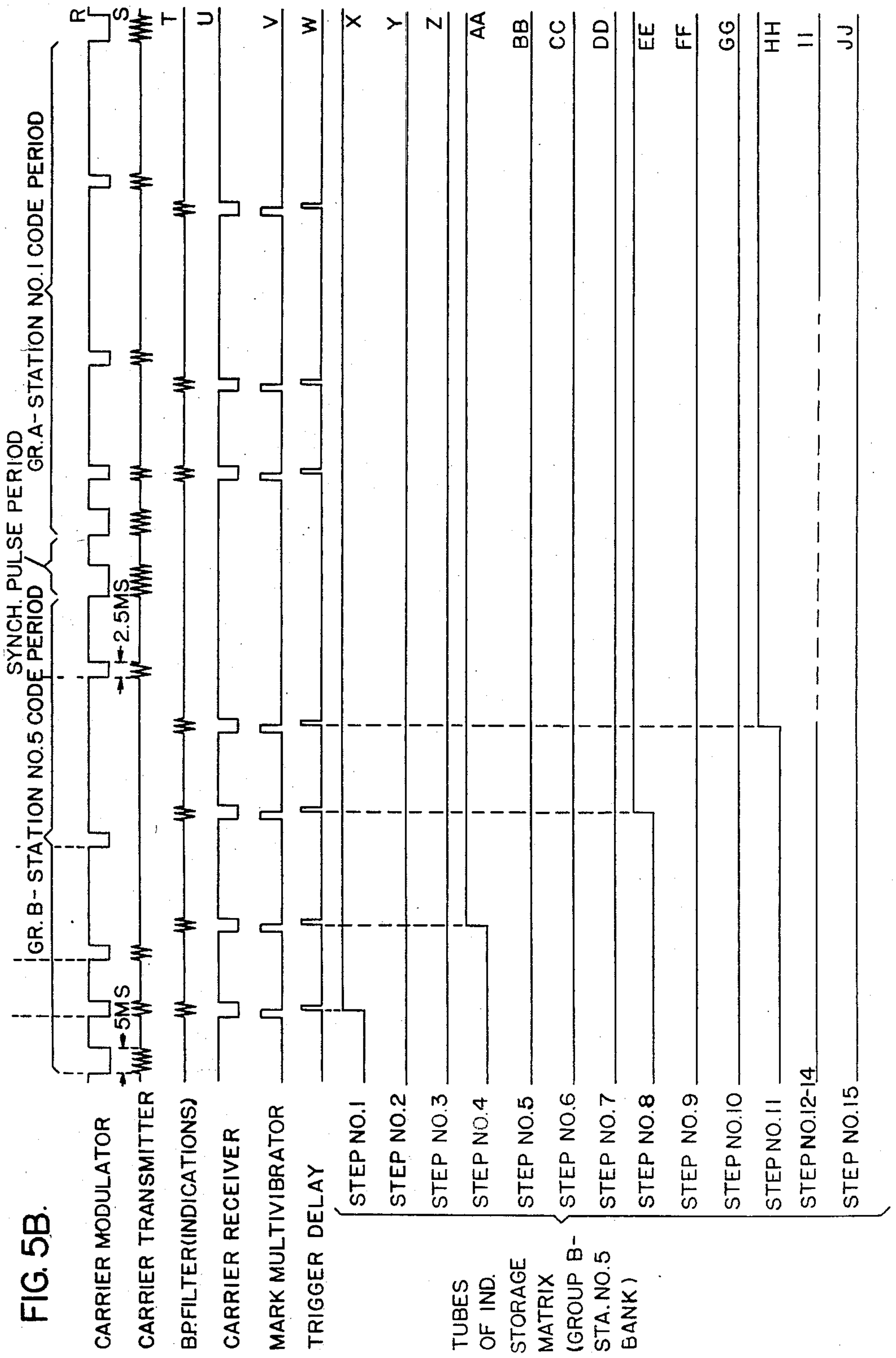
Figure 6A:
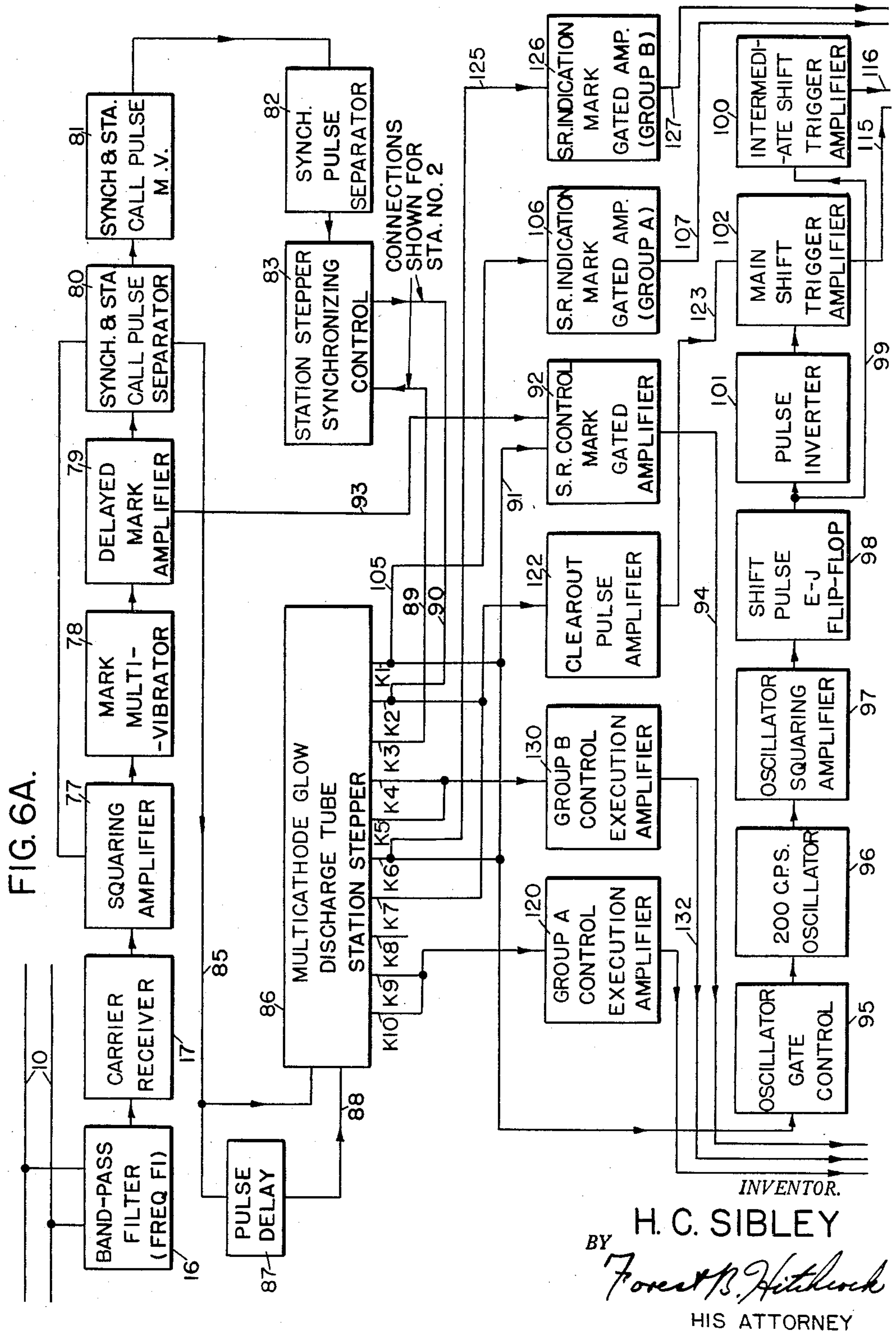
Figure 6B:
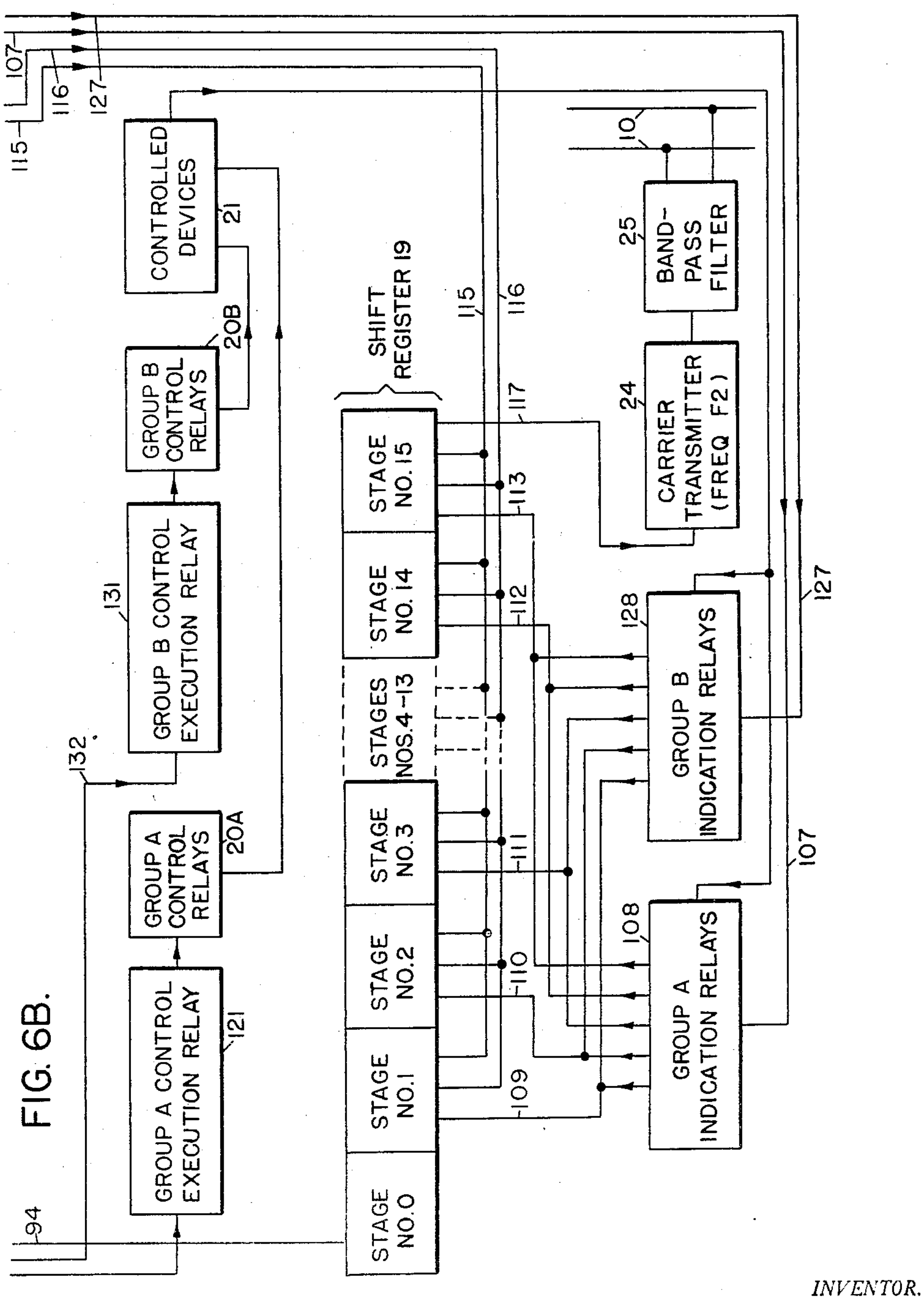
Figure 8A:
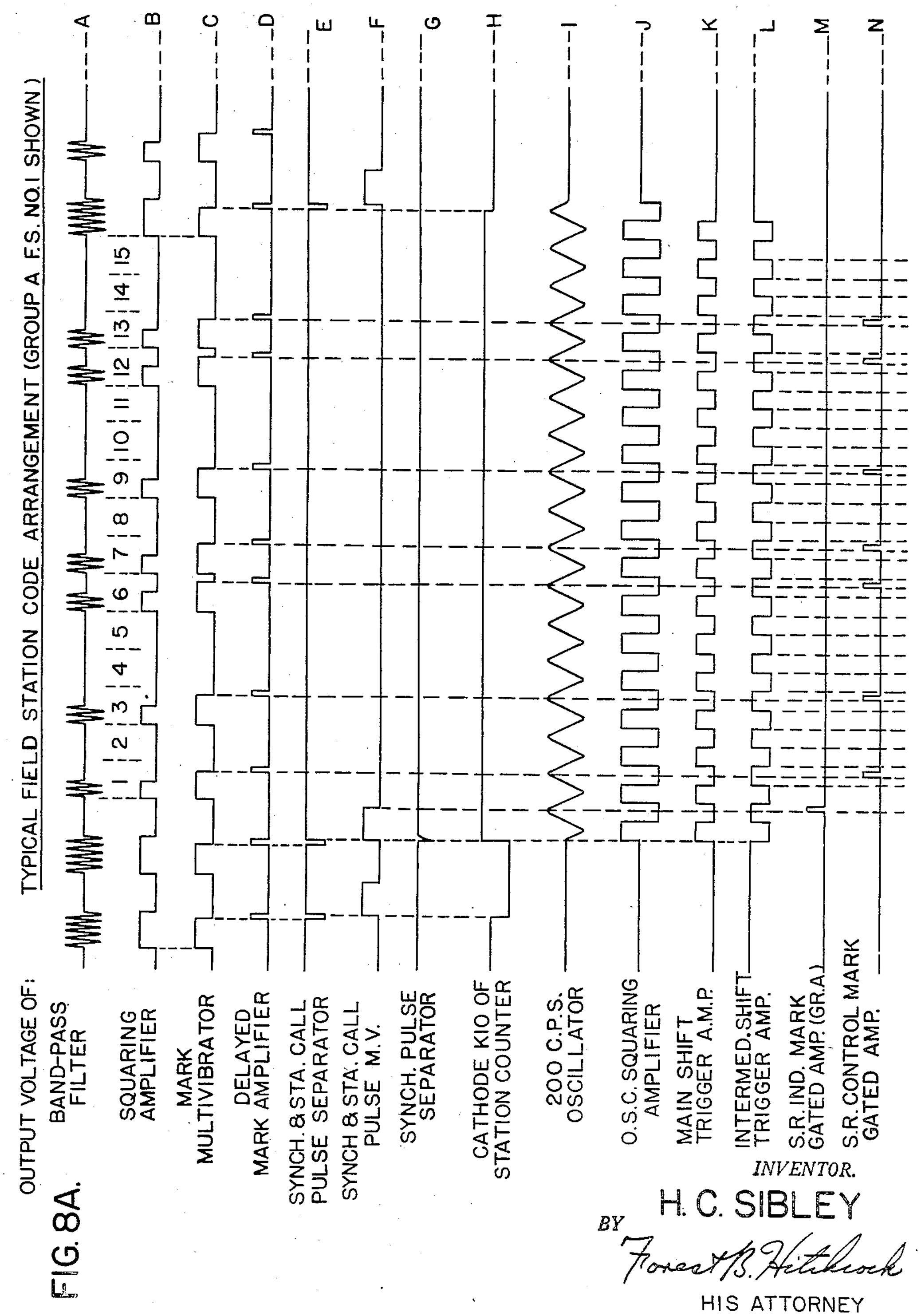
Figure 8B:
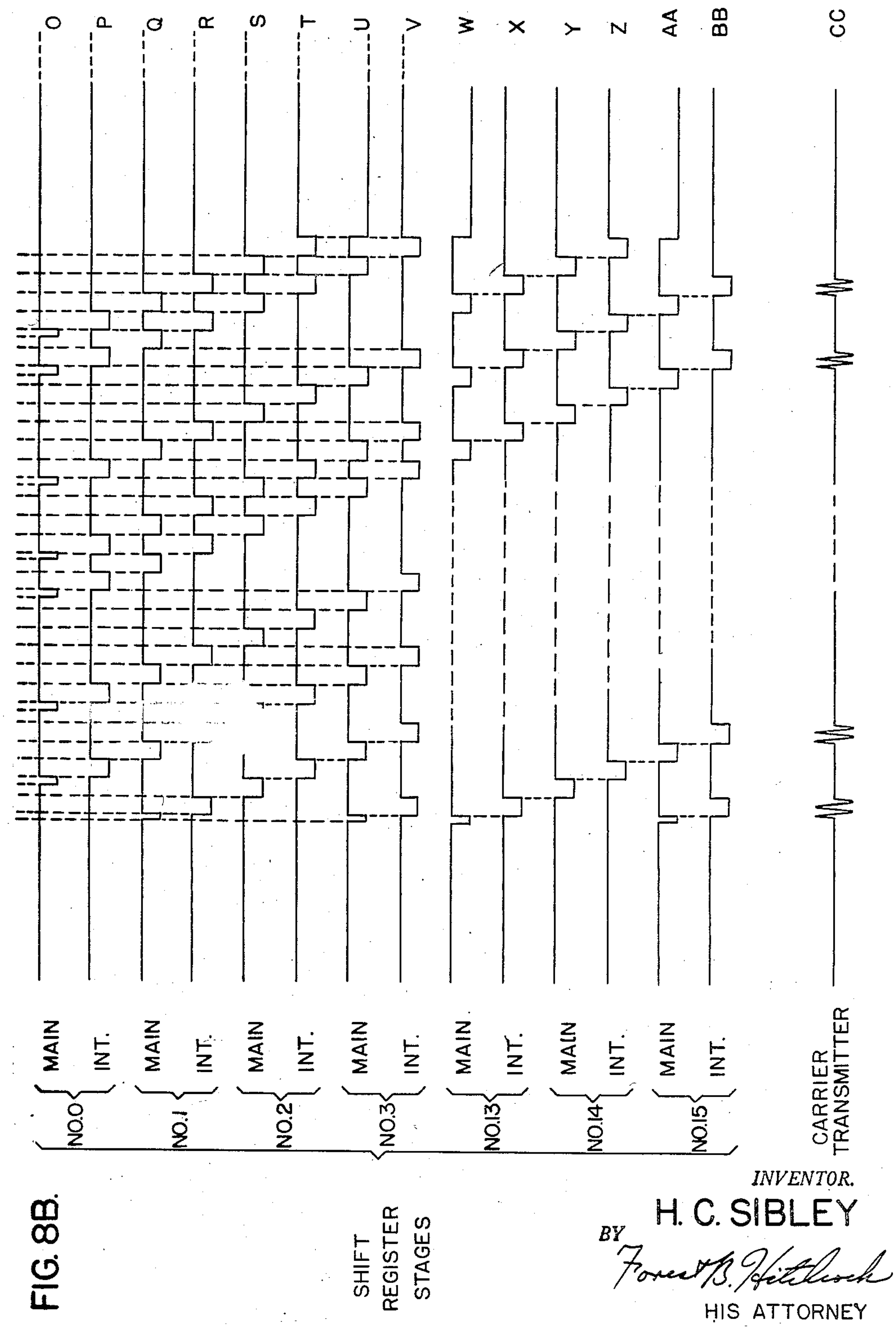
Figure 10:
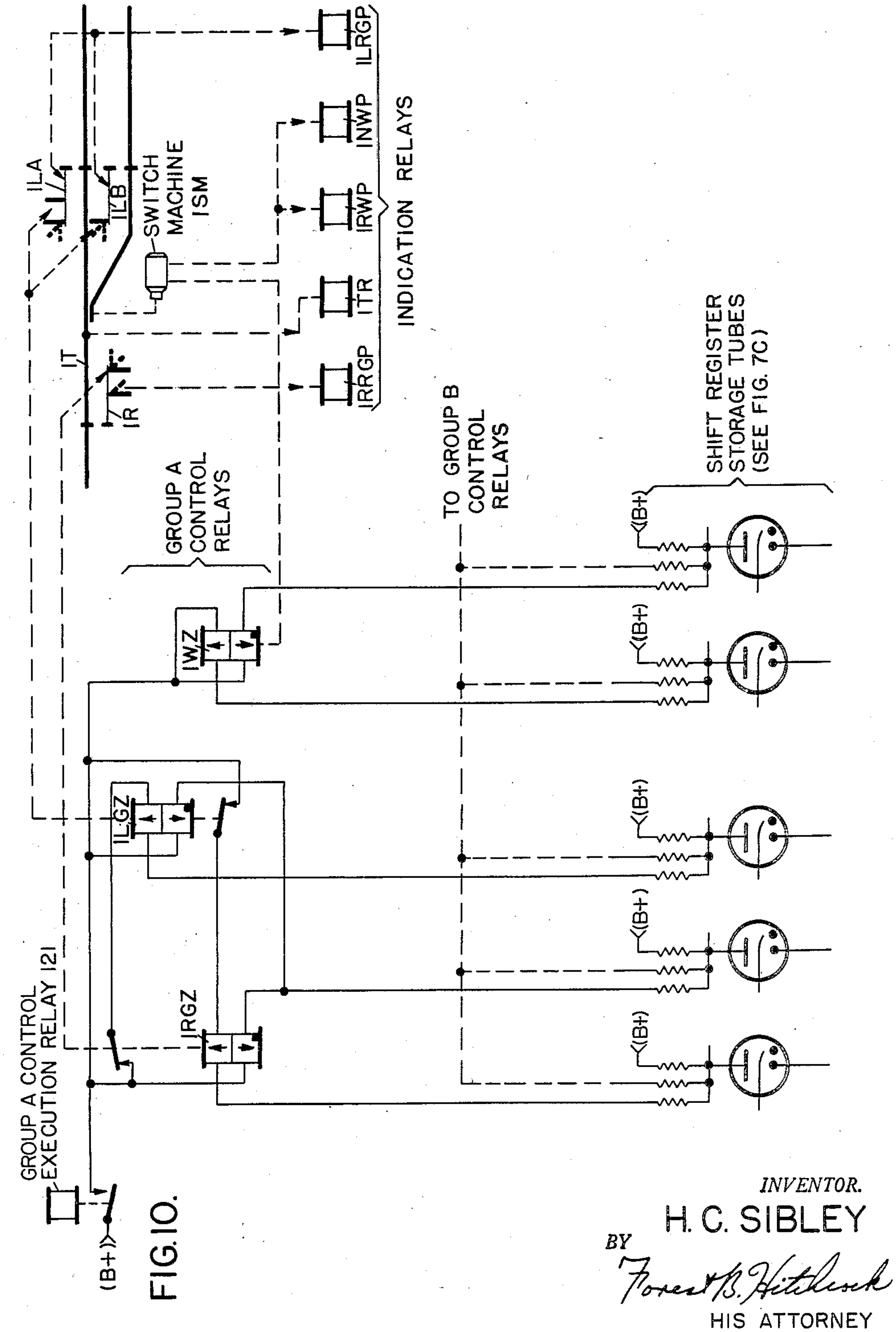

Figs. 3A and 3B, when placed one above the other, illustrate in block form the control office apparatus;

Figs. 4A, 4B, 4C, 4D, 4E, placed one above the other, illustrate the detailed circuit organization for the control office apparatus;

Figs. 5A and 5B, placed one above the other, are waveform diagrams relating to the operation of the control office apparatus;

Figs. 6A and 6B, placed one above the other, provide a block diagram of the field station apparatus;

Figs. 7A, 7B, 7C and 7D, placed one above the other, illustrate the detailed circuit organization of a typical field station;

Figs. 8A and 8B, placed one above the other, constitute a waveform diagram relating to the operation of the field station apparatus;

Figs. 9A and 9B are charts relating to the operation and circuit connections of the station stepper employed at each field station; and Fig. 10 illustrates the application of the field station apparatus to the control of the devices at a typical field station.

To simplify the illustrations and facilitate the explanation of this invention, the various parts and circuits have been shown diagrammatically, and certain conventional illustrations are employed. The drawings have been made to make it easy to understand the principles and manner of operation of this invention rather than to illustrate the specific construction and arrangement of parts that would be used in practice. The various tubes and their elements and all other circuit components have been shown in conventional form. The various relays and their contacts have also been illustrated conventionally instead of showing all of their details. Sources of electrical energy have been represented also by conventional symbols. Thus, the symbols (B+) and (B−) represent the positive and negative terminals respectively of a source of energy of sufficient voltage to make it suitable for the control of electron tubes and their associated apparatus. The symbol for a ground connection represents the connection to a voltage level between the (B+) and (B−) voltage levels. The symbols (+) and (−) associated with appropriate arrowheads and tails respectively represent the positive and negative terminals of a source of energy of relatively low voltage such as is suitable for the control of electromagnetic relays and the like.

GENERAL ORGANIZATION

The general features of the code communication system of this invention are useful in a variety of different applications where the ability to transmit controls and indications rapidly between a control office and a number of remote field stations is desired. However, to demonstrate most clearly and specifically the utility of the present communication system, the particular embodiment that is disclosed here illustrates the use of this system as applied to the control of switches, signals, and other devices of a section of railroad and the reception of information regarding the operated conditions of these various devices as well as track occupancy information and the like.

Figure 1:
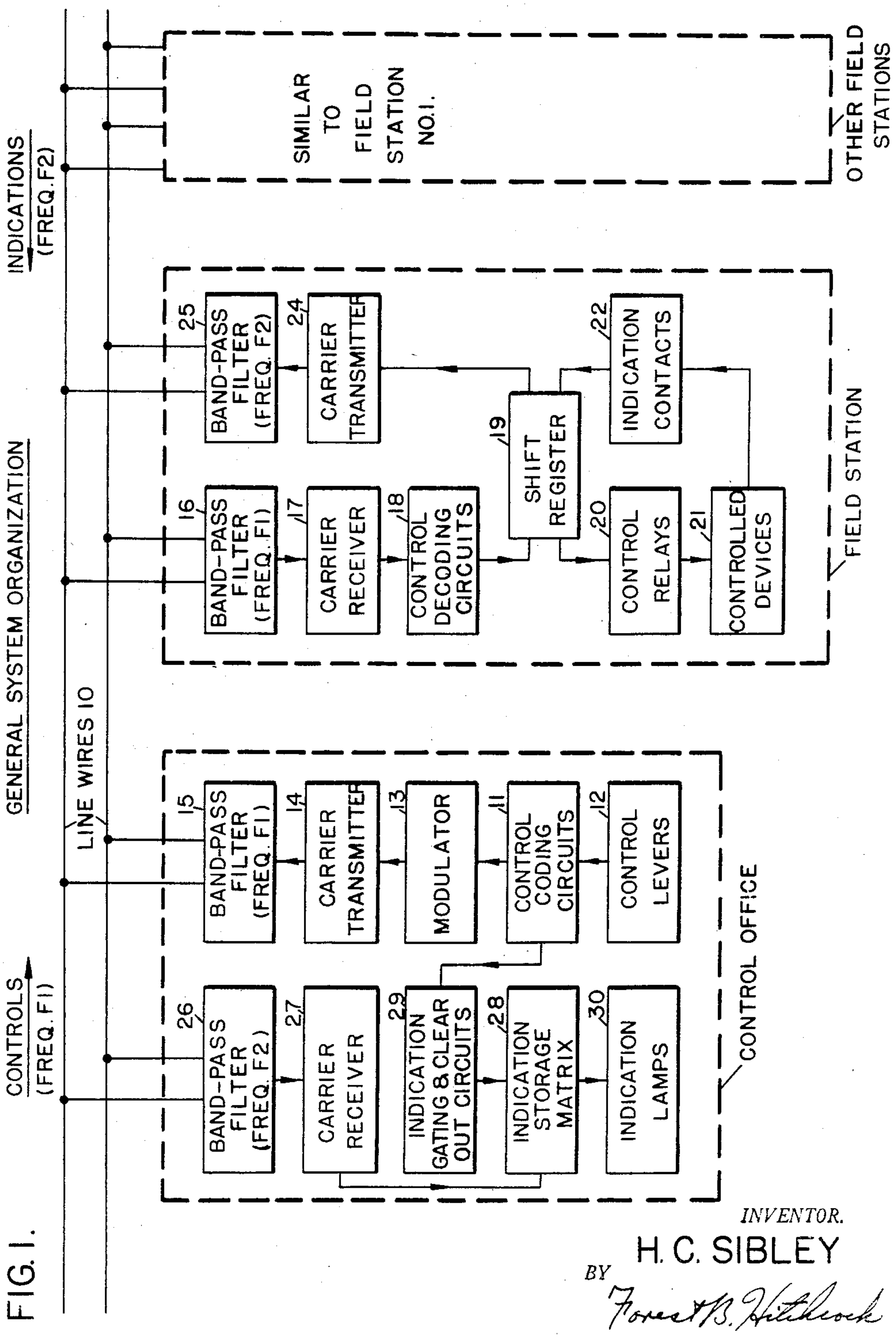
Fig. 1 is a simplified block diagram illustrating the general organization of the system of the present invention.

The general system organization of the present invention is disclosed in block diagram in Fig. 1. This drawing shows a pair of line wires 10 which extend between a control office and a plurality of field stations. Since all of the field stations are similar, only one typical field station has been shown in block form in this diagram.

All the field stations and the control office transmit and receive over the single pair of line wires 10. The controls are transmitted over the line wires as a coded carrier frequency F1; whereas, the indications are transmitted from each of the field stations to the control office over a different carrier frequency F2. Because both carrier receivers and transmitters are by themselves not sufficiently frequency selective, a band-pass filter is interposed between the line wires and each carrier receiver and also between the output of each carrier transmitter and the line wires 10.

The control office apparatus includes control coding circuits 11 which are governed by the control levers 12. Briefly, the control coding circuits 11 includes means for demarcating the successive cycles of operation and for making up the code constituting each complete cycle. The particular permutation of mark and space characters making up the code group for a particular station is governed by the position of the control levers 12.

The output of the control coding circuits 11 comprises a time spaced series of code digits including the synchronizing mark, the various station-call marks, and the mark and space characters constituting the codes for the various field stations. This output is applied to a modulator 13 which controls the output of the carrier transmitter 14. Thus, for each space character in the code, the modulator 13 prevents the carrier transmitter 14 from supplying its distinctive carrier frequency F1 through the band-pass filter 15 to line wires 10. For all the other kinds of characters included in a control code cycle, the modulator 13 causes the carrier transmitter to emit short pulses of carrier frequency for predetermined lengths of time as will later be described, and these pulses of carrier frequency F1 are then applied through the band-pass filter 15 to line wires 10.

At each field station, the received control code of frequency F1 is applied through a band-pass filter 16 to a carrier receiver 17. The code output of receiver 17 is then applied to the control decoding circuits 18. The control decoding circuits 18 include station counting means which renders each station responsive only to that portion of the control code cycle intended for it. As a result, there is applied from the output of the control decoding circuits on selected station periods a distinctive series of pulses corresponding to the control code for that particular station. These are applied to the shift register with the result that, when the entire control code for the station has been received, the various stages of the shift register are successively conditioned in accordance with the pattern of marks and spaces that are intended for this station. The stages of the shift register are then effective to selectively energize a plurality of control relays 20 and these through their contacts are then able to control the various controlled devices 21.

Prior to the reception of a control code at any particular station, the controlled devices are effective through the indication contacts 22 to selectively condition the various stages of the shift register 19. The shift register stages assume a particular permutation of what may be designated their "0" and "1" conditions in accordance with the indication code desired to be transmitted to the control office. Accordingly, when the control decoding circuits 18 are effective to step the received control code into the shift register 19, the indication code previously stored in the shift register is, in effect, stepped out of the last stage of the shift register. Thus, the shift register may be used to directly control the transmitter 24 with the result that pulses of carrier frequency F2 are applied through the band-pass filter 25 to line wires 10 in a preselected combination of marks and spaces making up the desired indication information to be transferred to the control office.

At the control office, the received indication code is applied through the band-pass filter 26 to the carrier receiver 27. As a result, a series of time-spaced pulses whose pattern corresponds to the received indication code is applied to the indication storage matrix 28. The control coding circuits 11 are effective through the indication gating and clear-out circuits 29 to provide the required gating functions with respect to the indication storage matrix 28. This means, in effect, that the received indication code is routed to the proper indication storage circuits relating to the particular field station from which the indication code originated. These indication gating and clear-out circuits 29 also are effective to erase the indications for a particular field station just prior to the reception of a new indication code from that station. In this way, the indications displayed continually represent the latest information received from the field stations.

Figure 2:
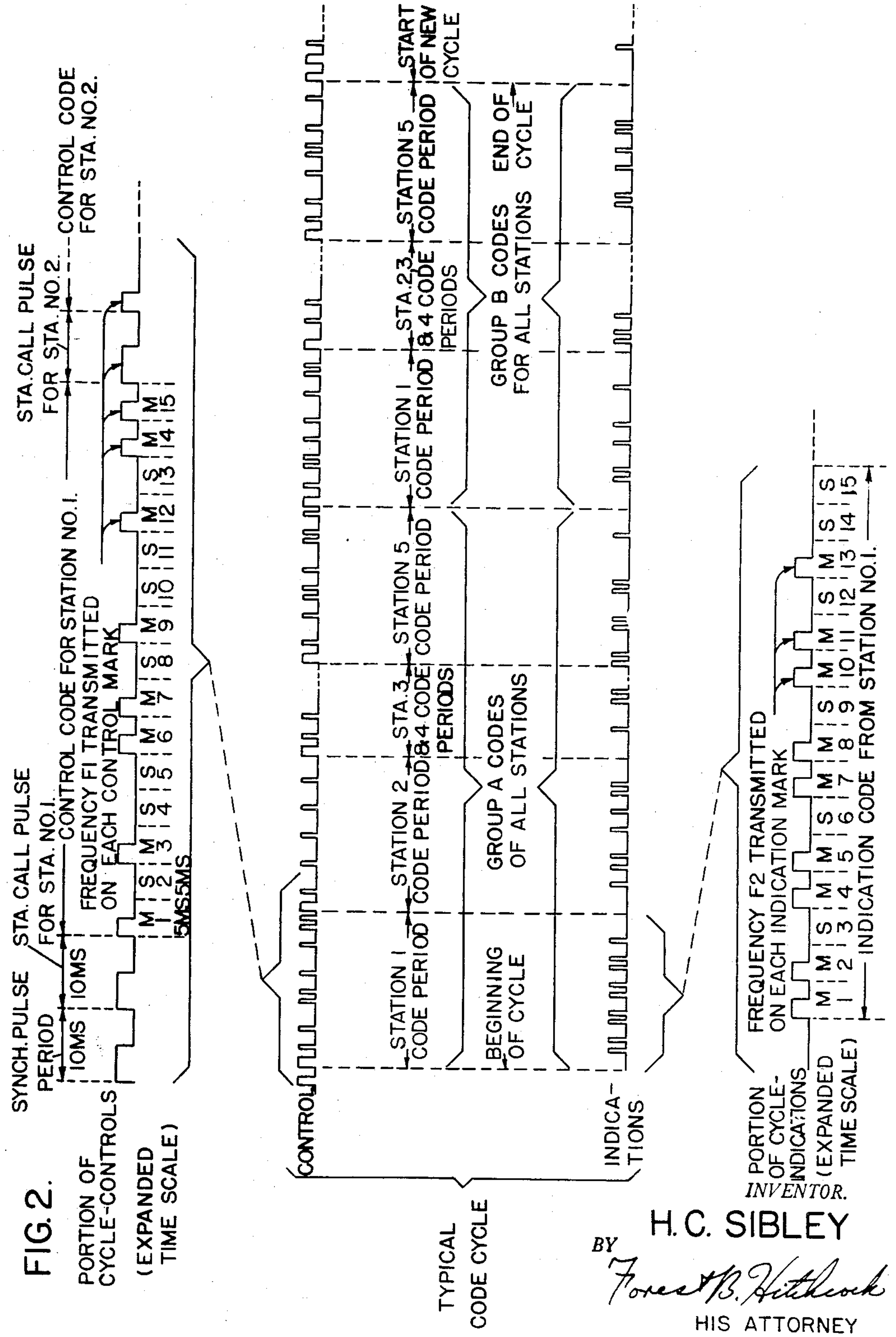
Fig. 2 is a simplified timing chart showing the general code organization of the present invention.

The general code organization of the present invention is illustrated in Fig. 2. It is shown in this drawing that each cycle of operation begins with a series of two pulses whose duration is greater than that of the normal mark characters making up either the control or indication code of a particular field station. The first of these long code characters is the synchronizing pulse, and the second is the station-call pulse for station No. 1. Following the station-call pulse for the first field station is a series of time spaced pulses of carrier frequency which by their permutation of positions in the interval between the first and second station-call pulses provide distinctive control information for the first field station. Following this code for the first field station, the control code includes another station-call pulse and then a series of marks and spaces which provide the information for the control of the devices at the second field station. In a similar way, the control code cycle includes controls for all of the field stations in the system.

In the present embodiment of the invention, it is assumed that five field stations are provided but that each field station receives a group of controls twice within a single cycle of operation so that a greater number of controls and indications may be accommodated at each field station without corresponding increase in complexity of equipment as has already been noted. Thus, after each of the five field stations has received its group A control codes, each station is transmitted to in turn once more so as to receive its group B codes. Upon the conclusion of the second station period for station No. 5, the cycle is completed and a new cycle is again immediately started with another synchronizing pulse.

During the time that the controls are being transmitted to field station No. 1, an indication code is being received from this same field station. In a similar manner, throughout the whole cycle, indication codes are received from the field stations as they respectively receive their control codes. Two separate groups of controls are transmitted to each field station in the system in a complete cycle and concurrently two groups of indications are received from each field station.

A portion of the control code cycle is shown with an expanded time scale at the top of Fig. 2. This makes it clear that the distinctive carrier frequency F1 used for controls is transmitted only during the first half of each 10 millisecond synch pulse period to thereby make up the distinctive synchronizing pulse. The station-call pulse which follows the synch pulse is identical to the synch pulse. On each of the fifteen 5 millisecond pulse periods occurring between the station-call pulse for station No. 1 and the station-call pulse for station No. 2, a mark or space character is represented in the drawing. Thus, a mark, designated by the letter M, is shown as being transmitted for the first pulse period and a space designated by the letter S for the second pulse period. For the mark character, it is shown that the carrier frequency F1 is transmitted for only substantially the first half of the pulse period. For the space character, no carrier is transmitted.

The portion of the indication cycle shown with an expanded time scale on the bottom of the drawing indicates that fifteen pulse periods are also provided for the transmission of indications from any field station. On any pulse period, either a mark or space character may be sent. These mark and space characters are exactly like those in the control cycle except that they are transmitted instead on frequency F2. This drawing indicates also that the indication code includes no synchronizing or station-call pulses. The reason for this is that the gating functions are provided at the control office, and since the indication code from any field station is received during the same station period during which controls are transmitted to that station, the control office gating circuits may be directly utilized for routing received indication codes to the appropriate indication storage circuits.

DESCRIPTION OF BLOCK DIAGRAMS

*Control office apparatus—transmission of controls*

The apparatus provided at the control office for the transmission of controls to the various field stations will first be described with reference to the block diagram of Fig. 3A and also to the waveform diagrams of Figs. 5A and 5B. The detailed circuits of this apparatus will then subsequently be described in connection with the detailed circuit diagrams of Figs. 4A to 4E.

The control office apparatus is shown in the block diagram of Fig. 3A as including a 200 C. P. S. oscillator 35. This oscillator is constructed to provide an output sine wave having a frequency of approximately 200 cycles per second. The sine wave output voltage of this oscillator 35 is illustrated at line A of Fig. 5A. The oscillator output is then applied to a squaring amplifier 36 which provides an output having an approximately rectangular wave shape as indicated at line B of Fig. 5A. This output of the squaring amplifier is applied to a differentiator 37 which responds to each negative-going portion of the output of the squaring amplifier by providing a positive-going pulse which is applied to the input of the cathode follower 38 so that a similar positive going pulse appears on the output wire 39 of this cathode follower 38. The positive-going pulse output of differentiator 37 is also applied to the pulse delay 40 which produces positive-going output pulses that are only slightly delayed with respect to those appearing on wire 39 and have, therefore, not been shown in Fig. 5A. These delayed pulses are applied to the cathode follower 41 so that similar positive-going pulses appear also on the wire 42.

The apparatus at the control office also includes a control stepper 43 and a station stepper 44. Both of these steppers comprise a plurality of cascade-connected, bistable state flip-flop stages. Each stage comprises two interconnected electron discharge tubes. Under one stable condition of operation of the stage, one of the tubes is conductive and the other is fully cut off. In the opposite condition of this stage, the previously conductive tube becomes cut off and the previously nonconductive tube becomes fully conductive. These different states of each stage may be termed their "0" and "1" conditions respectively in accordance with customary binary notation.

When the control office apparatus is first put into operation, both the control and station steppers are first conditioned by external resetting means (not shown in Fig. 3A) so that a single selected stage of each is in the "1" condition and all remaining stages are in the "0" condition. More specifically, with respect to the control stepper 43, only its step No. 14 stage is in the "1" condition, while all remaining stages of the stepper are in the "0" condition. With respect to the station stepper 44, only its synch pulse step stage is in the "1" condition; whereas, all its remaining stages are in the "0" condition.

The trigger pulses appearing on wire 39 can only cause a stage in its "1" condition to transfer to the "0" condition and not vice versa. Consequently, the first positive-going voltage pulse appearing on wire 39 and applied to each stage of the control stepper 43 can affect only the step No. 14 stage and causes this stage to revert to its "0" condition.

With the restoration of the step No. 14 stage to its "0" state, a pulse is applied to the step No. 15 stage of the control stepper 43 and causes this stage of the stepper to be operated to its "1" condition. Thus, the total effect of the first pulse on wire 39 is to restore the step No. 14 stage of the control stepper to its "0" condition and cause the step No. 15 stage to be operated to its "1" condition. The next pulse appearing on wire 39 operates in a similar manner and causes the step No. 15 stage to return to its "0" condition while at the same time a pulse is applied over wire 47 to the station stepper trigger 48. As a result, a trigger pulse appears on wire 49 and is applied to all the stages of the station stepper 44.

This positive-going trigger pulse on wire 49 has the same effect on the station stepper as do the trigger pulses appearing on wire 39 with respect to the control stepper 43. As already stated, only the synch pulse step of the station stepper 44 is initially in its "1" condition so that the positive-going trigger pulse on wire 49 causes this synch pulse step stage to be returned to its "0" condition while at the same time a pulse is applied over connection 50 to cause the group A-station No. 1 step stage to operate to its "1" condition.

The restoration of the synch pulse step stage of the station stepper 44 to its "0" condition also produces an effect over wire 55 on the control stepper start trigger 52. As a result, a trigger pulse appears on wire 53 and is applied to the station-call pulse step stage of the control stepper 43. This trigger pulse causes the station-call pulse step stage to operate to its "1" condition with the result that a subsequently occurring trigger pulse on wire 39 is effective to restore this stage again to the "0" condition. Further occurrences of these trigger pulses on wire 39 again cause the "1" condition of this first stage to be transferred from stage to stage of the control stepper 43. As before, the restoration of step No. 15 of the control stepper to the "0" condition causes a voltage variation to appear on wire 47 with the result that a positive-going trigger pulse is applied to wire 49 and restores the group A-station No. 1 step of the station stepper 44 to its "0" condition. The trigger pulse that then appears on wire 54 causes the group A-station No. 2 step to operate to its "1" condition. Restoration of the group A-station No. 1 step of the station stepper 44 also produces an effect over wire 56 on the control stepper start trigger 52 with the result that a pulse appears on wire 53 and once more causes the station-call pulse step stage of control stepper 43 to operate to its "1" condition.

In a similar manner, the series of pulses appearing on wire 39 cause the various steps of the control stepper 43 to operate successively to their "1" condition and then back to their "0" condition. Each step of the control stepper 43 thus remains in its "1" condition only throughout the time interval between successive pulses on wire 39. When each step of the control stepper 43 has thus operated to its "1" condition and then been restored to the "0" condition, the restoration of the No. 15 stage results in the advance of a single step at the station stepper 44. The advance of a step at the station stepper then causes the control stepper start trigger 52 to operate the station-call pulse step of the control stepper 43 to its "1" condition so that the control stepper can again operate through all its successive steps. This advance of a step at the station stepper and the operation of the station-call pulse step stage of the control stepper occurs almost simultaneously with the restoration of the step No. 15 stage of the control stepper to its "0" condition.

After all of the station stepper stages associated with the group A codes have been successively operated to their "1" conditions and then restored, the station Nos. 1 to 5 stages relating to the group B codes for these stations are then successively stepped through. Eventually, the group B-station No. 5 stage is restored to its "0" condition with the result that an input is applied over wire 66 to the step No. 14 trigger 67. This step No. 14 trigger 67 then causes a positive-going trigger pulse to appear on wire 68 and be applied directly to the step No. 14 stage of the control stepper 43 and causes this stage to be operated to its "1" condition. At the same time, the restoration of the group B-station No. 5 step causes an input to be applied over wire 68 to the synch pulse step of this same station stepper so that this stage of the stepper is operated to its "1" condition.

The first trigger pulse to appear on bus 39 approximately five milliseconds later restored the step No. 14 stage to its "0" condition. This causes the step No. 15 stage to be operated to its "1" condition, but this stage is also restored to its "0" condition after five milliseconds when the next pulse appears on bus 39. The restoration of this step No. 15 stage causes the station stepper trigger 48 to put a pulse on wire 49 in the usual way that is then effective to restore the synch pulse step of the station stepper 44 to its "0" condition with a resulting operation of the group A-station No. 1 step to its "1" condition.

Each of the steps of the station stepper 44 such as its group A-station No. 1 step, for example, remains in its "1" condition throughout the time required for the control stepper 43 to operate through all its steps. The synch pulse step of the station stepper 44 remains in its "1" condition, however, only for the length of time required to step through the last two steps of the control stepper 43.

This sequence of operations is illustrated in the waveform diagram of Fig. 5A. Thus, the restoration of step No. 15 stage of the control stepper as shown at line J in response to the occurrence of a trigger pulse at line C causes the station stepper trigger 48 to supply a positive-going trigger pulse as shown at line K to bus 49. In response to this trigger pulse, the group B-station No. 5 of the station stepper is operated back to its "0" condition as shown at line L and this action causes a voltage variation to be put over wire 57 to the synch pulse step of this stepper to cause this stage to be operated to its "1" condition as indicated at line M.

Restoration of the group B-station No. 5 step to its "0" condition also causes the step 14 trigger 67 to provide a positive-going trigger pulse as indicated at line P of Fig. 5A to step No. 14 of the control stepper and causes this step No. 14 to operate to its "1" condition as shown at line I. The following positive-going trigger pulse appearing on wire 39 and illustrated at line C of Fig. 5A transfers the "1" condition of step No. 14 to step No. 15. The next occurring trigger pulse restores step No. 15 to its "0" condition so that the station stepper trigger 48 provides a positive-going trigger pulse as indicated at line K of Fig. 5A. This trigger pulse then is applied over bus 49 to the station stepper 44 and causes the "1" condition of the synch pulse step to then be transferred to the group A-station No. 1 step of the station stepper (see lines M and N). An input is thus caused to be applied to the control stepper start trigger 52 and the result of this is that there is then a pulse supplied over wire 53 (see line G) to the station-call pulse step of the control stepper 43 to operate this step to its "1" condition as illustrated at line D of Fig. 5A. Subsequently occurring trigger pulses as shown at line C then cause the control stepper to operate through its various steps in the manner already described.

Each step of the control stepper 43 as well as of the station stepper 44 has associated with it a cathode follower stage designated CF in the drawings. These cathode followers are of a conventional kind and are so connected to their respective step of the stepper that their output cathode voltage is normally zero but rises to a fairly high level during the time that the associated step is in its "1" condition.

The cathode followers associated with steps 1 to 15 of the control stepper 43 each provide their output voltages to the control matrix 60. The structure of this matrix and the manner in which it cooperates with the control levers 61 will later be described in detail in connection with the detailed circuit organization of the control office apparatus. Briefly, each of these cathode followers is effective to energize a corresponding bus in the control matrix 60. Each of the matrix output cathode followers 62 is connected to selected ones of these buses through the control levers 61. For each cycle of operation of the control stepper 43, each of the various matrix output cathode followers 62 is selectively gated on predetermined steps with the selection of steps on which gating occurs being controlled by the control levers 61.

An additional gating function takes place with respect to these matrix output cathode followers, and this gating function is effected by the station stepper cathode followers 63. Depending upon the particular station period then in effect, only one of the station stepper cathode followers 63 can then apply a gating voltage to its associated one of the matrix output cathode followers 62. Thus, the common output wire 64 of the matrix output cathode followers 62 receives an output only from the particular one of these cathode followers 62 that is then being gated, and it will then result in pulses appearing on wire 64 only for certain predetermined steps of the control stepper 43 as governed by the positions of the control levers 61. The voltage waveform that appears on wire 64 and is applied to the carrier modulator 13 thus comprises a voltage pulse for each pulse period on which a mark character is to appear in the control code for the various field stations.

The carrier modulator 13 receives a plurality of different inputs that cause it to be effective on the carrier transmitter for all the different code characters making up a control code cycle. As already described, a voltage pulse appears on wire 64 and is applied to the carrier modulator 13 for each control mark digit that is to appear in the control code. The carrier modulator also receives an input over wire 70 from the station-call pulse step of the control stepper 43. As a result, the carrier modulator 13 causes carrier transmitter 14 to transmit carrier frequency throughout the time that the station-call pulse step is in its "1" condition, thereby causing the station-call pulses to appear in the control code cycle at the proper times.

The carrier modulator 13 also receives inputs from the cathode follower 71 associated with the synch pulse step of station stepper 44 and another input from the cathode follower 72 that is associated with step No. 14 of control stepper 43. These inputs are applied to the carrier modulator over wires 73 and 74 respectively. The gating effect of the two voltages obtained from these different stages when they are concurrently in their "1" conditions make the carrier modulator 13 effective on the carrier transmitter 14 for the transmission of carrier frequency F1 only at the time the synchronizing pulse is to appear in the cycle. As indicated at line M of Fig. 5A, the synch pulse step of the station stepper is in its "1" condition for a length of time equivalent to two pulse periods, but step No. 14 of the control stepper is in its "1" condition only for the first half of this time. Consequently, the carrier modulator provides a negative pulse to the carrier transmitter as shown at line R of Fig. 5B only at the proper time in the cycle.

The delayed marks appearing on wire 42 and applied to carrier modulator 13 are only very slightly delayed with respect to the pulses appearing on wire 39 which actually result in operation of the control and station steppers and their associated circuit means. These slightly delayed trigger pulses on wire 42 result, however, in control of the modulator 13 in such a way as to avoid interference resulting from changes in the gating conditions of the modulator 13.

For each occurrence of a negative voltage pulse from the output of carrier modulator 13, the carrier transmitter 14 is controlled to supply its distinctive frequency F1 through band-pass filter 15 to the line wires 10. The resulting interrupted carrier appearing on line wires may thus have the general appearance as indicated at line S of Fig. 5B.

*Field station apparatus*

The interrupted carrier frequency F1 that constitutes the control code cycle transmitted from the control office is supplied from the line wire 10, through band-pass filter 16, to carrier receiver 17 (see Fig. 6A). The output of the carrier receiver 17 is applied to the carrier squaring amplifier 77. This squaring amplifier 77 provides an output of rectangularly shaped voltage pulses whose duration corresponds to the length of the carrier pulse received. Thus, in response to a typical input of carrier signal as illustrated at line A of Fig. 8A, the squaring amplifier 77 provides an output of positive-going rectangularly shaped pulses as shown on line B of this figure.

These positive-going pulses are applied to the mark multivibrator 78. This mark multivibrator comprises a two tube, dual state trigger circuit of the kind commonly known as a one-shot multivibrator. The mark multivibrator 78 responds to the positive-going leading edge of each output pulse of the carrier squaring amplifier 77 by operating from its normal condition to the opposite condition. After a predetermined time interval, the mark multivibrator abruptly restores itself to its normal condition. This time interval is selected to be greater than the 2.5 millisecond period for which carrier is applied to the line for a control mark digit appearing in the control code but less than the five millisecond interval of time that carrier is applied for either a synchronizing mark or station-call mark as shown by comparing line C with lines A and B in Fig. 8A.

Each time the mark multivibrator 78 restores to its normal condition it causes the delayed mark amplifier 79 to provide a positive-going trigger pulse that is applied to the synch and station-call pulse separator 80 (see line D, Fig. 8A). The synch and station-call pulse separator 80 thus receives an input pulse of carrier that is received. Its function is to produce an output pulse only in response to each synch or station-call pulse. To accomplish this, it is provided with an additional gating voltage obtained from the carrier squaring amplifier 77; it is only when this separator 80 is being gated in this manner that it can respond to a trigger pulse from the delayed mark amplifier 79 by producing a corresponding output pulse. As can be seen by comparing lines D and B of Fig. 8A, a trigger pulse from the delayed mark amplifier 79 occurs concurrently with an output pulse from the carrier squaring amplifier only at the time of either a synchronizing or station-call pulse. Consequently, it is only at such times that a negative-going pulse is supplied to the synch and station-call pulse multivibrator 81 as shown at line E of Fig. 8A.

The synch and station-call pulse multivibrator 81 is similar to the mark multivibrator 78 already described. Each negative-going pulse causes this multivibrator to operate from its normal condition on the positive-going trailing edge, and this multivibrator then restores to its normal condition only after a preselected time interval. The resulting positive-going output pulses of the synch and station-call pulse multivibrator 81 shown in Fig. 8A at line F are applied to the synch pulse separator 82.

The purpose of the synch pulse separator 82 is to provide an output at the beginning of each cycle so as to obtain proper synchronization of the field station apparatus. Essentially, this synch pulse separator is an integrating circuit and is effective to provide an output pulse as shown at line G of Fig. 8A only when it receives in quick succession two pulses from the synch and station-call pulse multivibrator 81. Such successive pulses are applied to the synch pulse separator 82 only at the beginning of each complete cycle of operation when the synchronizing pulse is immediately followed by the station-call pulse for field station No. 1. Consequently, an output pulse is applied to the station stepper synchronizing control 83 (see line G of Fig. 8A) only at the beginning of a cycle.

The negative-going trigger pulses obtained from the output of the synch and station-call pulse separator 80 are applied over wire 85 directly to the station stepper 86 and to the pulse delay 87. The pulse delay 87 causes negative-going trigger pulses to be applied to station stepper 86 over wire 88 that are very slightly delayed with respect to those applied to the station stepper directly over wire 85. Therefore, in response to each synch and each station-call pulse, the station stepper receives input pulses over both wires 85 and 88 with the pulse on wire 88 being slightly delayed with respect to the pulse on wire 85. Each such input of two pulses causes the glow of the multi-cathode station stepper tube to advance from one cathode to the next. The glow transfers one cathode at a time in the direction from cathode A10 to cathode A1. These cathodes are successively positioned in a circular pattern about the anode of the tube so that cathode K10 is actually adjacent cathode K1. Thus, an input applied to the stepper tube when the glow is on cathode K1 causes the glow to transfer to cathode K10.

At each field station, the station stepper 86 not only conditions the decoding circuits to be responsive to the particular part of the control code cycle designated for that station but also causes certain other functions to be performed at other times in the code cycle. These other functions relate to the clearing out of the shift register just prior to the reception of new controls and the execution of the controls after they are received. Thus, on the station period immediately preceding the one on which a station is to receive its controls, the station stepper 86 causes the shift register at that station to be cleared out. On the two station periods immediately following the one on which controls are to be received at any field station, the station stepper 86 provides an output causing the controls then stored in the shift register to be executed.

These various circuit functions are performed in response to outputs obtained directly from the cathodes of the station stepper 86. Thus, when the glow is on a particular cathode of the station stepper tube, the voltage at that cathode is raised with respect to all the other cathodes and this higher voltage is then effective to control an associated circuit organization to produce the desired result.

The connections from the various station stepper cathodes to the plurality of different circuit organizations providing the desired functions are made the same at each of the different field stations; only the station stepper synchronizing control 83 is connected differently at each field station. Because of this, it is necessary that the station steppers at the various field stations be operated out of step with respect to each other so that the proper function will be performed at each station at the appropriate time in the cycle.

As an illustration, the station stepper at any station renders the associated decoding circuits responsive to receive group A controls and transmit group A indications when the glow of the station stepper tube is on cathode K1 as shown in Fig. 9A. At field station No. 1, therefore, the station stepper synchronizing control 83 must respond to the pulse received from the synch pulse separator 82 and cause the glow of the station stepper tube to be on cathode K1 at the very beginning of the cycle as illustrated in Fig. 9B so that the associated decoding circuits will be responsive during the No. 1 station period to the control code received at such time and intended for this particular field station.

In an analogous manner, at field station No. 4 the station stepper synchronizing control 83 must cause the station stepper tube to glow at cathode K4 at the very beginning of the cycle as shown by Fig. 9B. If this is done, the glow will be on cathode K1 during the fourth station period. With the glow on cathode K1, the decoding circuits will be responsive to the code received during this fourth station period as this is, of course, the code intended for station No. 4.

The connections between the synchronizing control 83 and the station stepper 86 have been shown in Fig. 6A as they are required to be for field station No. 2 in the system. The connections are thus made in such a way that wire 89 is connected to cathode K3, and wire 90 is connected to cathode K2. These connections thus ensure that the glow of the tube in the station stepper 86 will always be on cathode K2 immediately following the first station-call pulse in the cycle. The manner in which the synchronizing control effects this synchronization of the station stepper will later be described in detail when the specific circuits employed are being considered.

The chart of Fig. 9A indicates the various functions that are performed by the station stepper on its various steps. As previously explained, the various decoding circuits at a field station are rendered responsive to the group A controls intended for that station when the glow is on cathode K1 of the station stepper tube. In addition, the station stepper causes the group A indications to be placed in the shift register at the beginning of the station period so that these indications may be stepped out of the shift register and transmitted back to the control office as the controls from the control office are being stepped into the shift register.

These various functions occur as the result of the application of the voltage then appearing on cathode K1 to a plurality of different circuit organizations. For example, the positive voltage appearing on cathode K1 is applied over wire 105 to the shift register indication mark gated amplifier (group A) 106. As a result, a gating voltage is applied over wire 107 to contacts of the group A indication relays 108 shown in Fig. 6B. In accordance with the operated conditions of these relays, voltage pulses appear selectively on wires 109 to 113, and these voltage pulses condition the various stages of the shift register respectively. The operated conditions of the various stages of the shift register 19 thus represent the indication code that is to be transmitted with the operated condition of stage No. 15 representing the first digit of the indication code and the operated condition of stage No. 1 representing the last digit of the indication code.

To render the decoding circuits responsive to the control code intended for the station, the positive voltage appearing on cathode K1 is applied over wire 91 to the shift register control mark gated amplifier 92 and also to the oscillator gate control 95. The function of the gated amplifier 92 is to supply to the first stage of the stift register 19 a single trigger pulse for each mark digit included in the code for that station. This gated amplifier 92 receives an input pulse from the delayed mark amplifier 79 over wire 93 for each carrier pulse received in the cycle. However, this gated amplifier 92 becomes effective to provide output pulses in response to the input pulses received over wire 93 only during the time that it is being gated by the voltage received over wire 91 from cathode K1. It thus becomes effective to supply input pulses to stage No. 1 of shift register 19 only for the control code marks intended for that station.

The shift register 19 is required to be supplied with timed pulses on buses 115 and 116, and these timed pulses must occur at the same repetition rate of 200 cycles per second that is employed at the control office in making up the control code. The application of these pulses to buses 115 and 116 controls the stepping of control digits into the shift register as well as the stepping of indication digits out of the shift register. Thus, these pulses must appear on buses 115 and 116 only throughout the station period corresponding to that station. This is accomplished by applying the gating voltage appearing on wire 91 to the oscillator gate control 95. This gate control renders the 200 cycle per second oscillator 96 operative throughout the station period on which controls are being received and indications transmitted. The sine wave output of this oscillator 96 is applied to the oscillator squaring amplifier 97 which is effective to produce a square wave of voltage output for each cycle of its sine wave input. Thus, the output of the oscillator squaring amplifier may be as shown at line J of Fig. 8A as it responds to a sine wave of input as illustrated at line I of Fig. 8A.

The square wave output voltage of the oscillator squaring amplifier 97 is applied to a shift pulse E-J flip-flop 98. This Eccles-Jordan type flip-flop circuit comprises a dual triode, bistable state, trigger circuit which operates to its "1" condition in response to the positive-going leading edge of each of its input pulses and back to its "0" condition on the negative-going trailing edge of each input pulse. The output voltage waveform that is thus obtained from one of the plate electrodes of this flip-flop 98 is illustrated at line K of this Fig. 8A. This voltage waveform is similar to that appearing at line J which illustrates the output of the oscillator squaring amplifier 97. However, the characteristics of the flip-flop trigger circuit and particularly its ability to change its state almost instantaneously cause the output voltage of this flip-flop to have very steep leading and trailing edges, and these are desirable for the operation of the shift register 19.

The output of this flip-flop circuit is applied over wire 99 to the intermediate shift trigger amplifier 100. This amplifier 100 merely inverts the square wave of voltage applied to it and causes this inverted voltage waveform to appear on bus 116 supplying the stages of the shift register 19. The voltage that thus appears on wire 116 has the waveform as indicated at line L of Fig. 8A.

The output of the flip-flop circuit 98 is also applied to the pulse inverter 101. This pulse inverter merely inverts its input voltage waveform and causes such inverted voltage to be applied to the main shift trigger amplifier 102. This amplifier 102 again inverts its input waveform with the result that the voltage appearing on bus 115 has the wave shape as illustrated at line K of Fig. 8A. A comparison of lines K and L of Fig. 8A makes it clear that at the time the voltage on either bus 115 or 116 is at a high level, the voltage on the other bus is at a low level and that this condition alternates between these two buses at the 200 cycle per second rate established by the oscillator 96.

The manner of operation of the shift register 19 will subsequently be considered more fully when the detailed circuits are being considered. Briefly, the shift register 19, which is assumed in the present embodiment of the invention to have sixteen stages (one more than the number of pulse periods in a station period), responds to the time-spaced code pulses applied to its stage No. 0 and, under the influence of the shift pulses appearing on buses 115 and 116, causes these time-spaced input pulses to be distributed in the various stages of the shift register in accordance with the pattern of the received code. Each stage of the shift register comprises a bistable state trigger circuit device which may be considered as being normally in its "0" condition but being operative also to a stable "1" condition. Each input pulse applied to stage No. 0 causes this stage to operate to its "1" condition. Before another code digit can be applied to this stage No. 1, shift pulses appear on buses 115 and 116 and restore stage No. 1 to its "0" condition. The restoration of stage No. 0 to its "0" condition causes stage No. 1 to operate to its "1" condition. Of course, if a space digit appears in the code so that no input pulse is applied to stage No. 0, this stage remains in its "0" condition. The shift pulses that then appear on buses 115 and 116 before the arrival of the next code digit cannot restore stage No. 0 to its "0" condition so that no pulse is applied to stage No. 1 to operate it to its "1" condition.

The shift pulses that appear in this way on buses 115 and 116 repeatedly cause any shift register stage in its "1" condition to transfer such "1" condition to the next higher numbered stage. In this way, a time-spaced code of input pulses may be stepped into the shift register in such a way that the operated conditions of the various stages represent the makeup of the received control code. For example, if the first and third digits of the received codes are marks but the second and fourth digits are spaces, then stages 15 and 13 of the shift register will be in their "1" conditions when the complete code has been stepped into the shift register and stages 14 and 12 will then be in their "0" conditions.

If the various stages of the shift register have previously been selectively conditioned to respective "0" and "1" conditions in accordance with an indication code, the shift pulses appearing on buses 115 and 116 cause the stored indication code to be stepped out of the last stage No. 15 of the shift register and over wire 117 to the carrier transmitter 24. As an example, if the first and third digits of the indication code are intended to be mark pulses with the second digit a space pulse, stages 15 and 13 will initially be operated to their "1" conditions but stage 14 will be allowed to remain in its "0" condition.

Shift pulses appearing subsequently on buses 115 and 116 cause the condition of each stage to be successively transferred to the next. Each time that stage No. 15 is restored to its "0" condition, the carrier transmitter is controlled to supply its carrier frequency output to the line wires 10. Consequently, the first pair of shift pulses operate stage No. 15 from its "1" condition to its "0" condition, causing carrier frequency F2 to be transmitted for one-half of a pulse period. At the same time, the "0" condition of stage No. 14 is, in effect, transferred to stage No. 15, and the "1" condition of stage No. 13 to stage No. 14.

The next pair of shift pulses do not affect stage No. 15 because it is already in its "0" condition so that carrier frequency is not transmitted on this next pulse period. These shift pulses are effective, however, to transfer the "1" condition of stage 14 to stage No. 15. The next pair of shift pulses that then occurs result in the restoration of stage No. 15 to its "0" condition so that carrier frequency F2 is again transmitted for one-half of this next pulse period. In this manner, the indication code transmitted includes, in succession, for the first three digits a mark, followed by a space, followed by another mark as originally intended.

As the first pair of shift pulses, in effect, causes the indication digits stored in any stage to be transferred to the next higher numbered stage, the first stage of the shift register is assured of being in its "0" condition so that it may properly be controlled in accordance with the incoming control code digits. There is, consequently, no interference between the outgoing indication digits and the incoming control digits since the indication digits are being successively stepped into the higher numbered stages of the shift register, thereby leaving the lower numbered stages vacant so that they can handle the incoming control digits.

At the end of the station period on which group A controls are received at a station and its group A indications are transmitted, a station-call pulse is received which demarcates the end of the station period and the beginning of the next. In response to this station-call pulse, the station stepper tube transfers its glow from cathode K1 to cathode K10. During this station period and also during the following station period when the glow is on cathode K9, the controls which have just been received and are stored in shift register 19 are executed, i. e. they are made effective to control the group A control relays 20A. This is accomplished by supplying the positive voltage obtained from cathodes K10 and K9 to the group A control execution amplifier 120. As a result, there is applied during these two consecutive station periods a gating voltage to the group A control execution relay 121. The actuation of this execution relay 121 then causes the group A control relays 20A to become selectively responsive to the conditions of the various shift register stages.

On the following station period when the station stepper tube has the glow on cathode K8, no particular circuit function is performed although the station stepper synchronizing control 83 may, of course, be connected to this cathode or to any other cathode dependent upon the number of the field station.

During the next station period when a received station-call pulse has caused the glow on the station stepper tube 314 to transfer to cathode K7, a positive voltage is applied from this cathode K7 to the clear-out pulse amplifier 122. As a result, a voltage is applied over wire 123 to the main shift trigger amplifier 102. This voltage acts on this amplifier 102 and causes the voltage on bus 115 supplying the shift register to be at a high level at the same time that the voltage on bus 116 is caused to be at a high level. This condition results, as will later be described in detail, in the cancellation of all digits then stored in the shift register, i. e. each shift register stage is immediately restored to its "0" condition so that the shift register, is, in effect, cleared out.

Having been thus cleared out, the shift register is once more effective to receive a control code and transmit an indication code. Thus, when the next station period is initiated with the station stepper tube glowing at its cathode K6, the decoding circuits are once more rendered responsive to the received control code and the group B indications are placed in the shift register 19. Thus, a connection is provided from cathode K6 over wire 125 to the shift register indication mark gated amplifier (group B) 126. An enabling voltage is then caused to appear on wire 127, and this voltage is applied through contacts of the group B indication relays 128 to selectively condition the various shift register stages in accordance with the group B indication code to be transmitted.

At the same time, the oscillator gate control 95 is made effective to start the oscillator 96 with the final result that shift pulses are made to appear on buses 115 and 116 in a manner already described. Furthermore, the shift register control mark gating amplifier 92 is again gated over wire 91 by the positive voltage obtained from cathode K6 so that trigger pulses may be applied to the first stage of the shift register 19 for each mark pulse appearing in the control code during that station period. In this way, the group B controls for the station are stepped into the shift register so that the final permutation of the conditions of the stages corresponds to the time-spaced pattern of marks and spaces constituting the control code for that station. As before, the stepping of controls into the shift register by pulsing the buses 115 and 116 causes the indications to be transferred in succession to stage No. 15 with the result that the transmitter is modulated as required to form the indication code.

As indicated in Fig. 9A, the group B controls received when the glow was on cathode K6 are executed during the following two station periods when the glow is on cathodes K5 and K4, respectively, of the station stepper tube. This execution of group B controls is accomplished by supplying the positive voltage existing during these two consecutive station periods on cathode K5 and K4 to the group B control execution amplifier 130. As a result, the group B control execution relay 131 is energized over wire 132. The group B control relays 20B are then made respectively responsive to the various stages of the shift register so that they can be selectively energized in accordance with the control code then stored in the respective shift register stages. Being thus selectively controlled, these relays are effective to operate the controlled devices 21, which may include switches, signals, and the like, to their desired conditions.

On the station period immediatelly following the two on which the group B controls are executed, the glow of the station stepper tube is on cathode K3. As indicated in Fig. 9A, no particular system function is accomplished on this station period although, as shown in Fig. 6A, a connection may be made from this cathode K3 to the station stepper synchronizing control 83 at certain of the field stations.

On the following station period when the cathode glow is on cathode K2, the shift register is again cleared of the group B controls then stored there as indicated in Fig. 9A. This is accomplished by again providing the positive voltage appearing on cathode K2 to the clear-out pulse amplifier 122 which then provides a control over wire 123 to the main shift trigger amplifier, which, in turn, controls the voltage appearing on the shift bus 115 and is thereby effective to restore all of the shift register stages to their respective zero conditions.

On the following station period when the cathode glow transfers to cathode K1, another cycle is begun and the same system functions are provided in the manner already described. In this way, the station stepper 86, by providing distinctive outputs for the various station periods, is able to accomplish a variety of system functions on the different station periods merely by providing connections from the respective cathodes of the single multi-cathode glow discharge tube to the various circuit organizations provided to accomplish these desired system functions.

*Control office—reception of indications*

Fig. 5B shows at line T a typical indication code such as might be received at the control office. The pulses of carrier frequency that are received over line wires 10 are applied through the band-pass filter 26 to the carrier receiver 27. The first group of four pulses shown at line T of Fig. 5B occur during the group B-station No. 5 period. This is indicated at line L of Fig. 5A which indicates that the group B-station No. 5 step of the station stepper is at that time supplying a high output gating voltage. The second group of three carrier pulses shown at line T occur during the group A-station No. 1 station period because, as indicated at line N of Fig. 5A, the group A-station No. 1 step of the station stepper is then providing a positive output gating voltage.

The pulses of carrier frequency applied to the carrier receiver 27 produce negative-going output pulses whose duration corresponds to the length of time that carrier frequency is received for each indication mark. These output pulses of the carrier receiver 27 are applied to the peaker 140 which supplies positive-going trigger pulses to the mark multivibrator 141 for each negative-going leading edge of the output pulses supplied by the receiver 27. This mark multivibrator is also of the kind known as a one-shot multivibrator similar to those previously described. In response to each input pulse received from the peaker 140, the mark multivibrator operates from its normal condition to the opposite condition and remains in such opposite condition for a predetermined length of time before restoring itself again to its normal condition. This length of time that the mark multivibrator 141 remains operated from its normal condition is chosen to be approximately one-half the time that carrier is received on an indication mark. Each time that the mark multivibrator 141 restores itself to its normal condition, it supplies a negative-going pulse on the trailing edge of its pulse output to the trigger delay 142, and this negative-going trigger pulse causes the trigger delay 142 to supply a narrow, positive-going output pulse over wire 143 to the indication storage matrix 30. The indication storage matrix thus receives a positive-going trigger pulse for each indication mark received at the control office.

The indication storage matrix 30 comprises a plurality of glow discharge tubes. These tubes are successively gated in a predetermined sequence throughout a cycle of operation in such a way that each received indication mark occurring on a particular pulse period will find only the particular storage tube associated with that pulse period capable of responding to such indication mark.

A bank of cold cathode indication storage tubes is provided not only for each field station in the system but a separate bank is provided for both the group A and group B indications for each field station. Each such bank of storage tubes includes a separate storage tube for each different pulse period occurring in a station period. As previously described, in the present embodiment of the invention 15 successive pulse periods are allotted to each station period for either controls or indications. Therefore, each bank of indication storage tubes includes 15 different tubes and each tube of each bank is selectively controlled to become conductive when an indication mark is received on the associated pulse period but remains in its norman nonconductive condition when the corresponding pulse period comprises a space digit.

Each gas tube included in the matrix 30 possesses the characteristic common of gas tubes in that it tends to remain conductive when once controlled to such condition even though the input to its grid is removed. Consequently, a change in the indication code such that a space is received where a mark was previously received will not of itself tend to make the corresponding storage tube nonconductive and thus cancel the previously received indication mark. It is for this reason that the indication clear-out amplifiers 144 are provided. These clear-out amplifiers clear out any indications stored in a particular bank of the matrix immediately prior to the reception of new indications for that particular bank. In this way, the information stored in the matrix 30 represents the latest indications just received from the various field stations.

The indication clear-out amplifiers 144 cause each storage bank to be cleared out of all stored indications just prior to the reception of new indications intended for that storage bank. The indication clear-out amplifiers comprise a plurality of double gated amplifier stages each one of which is associated with a corresponding bank of indication storage tubes. Each clear-out amplifier receives one of its required two gating voltages from a corresponding one of the cathode followers 63 associated with the various steps of the station stepper 44. Thus, the particular clear-out amplifier designated as corresponding to the group A-station No. 1 storage bank receives a gating voltage from the cathode follower associated with the group A-station No. 1 stage of the station stepper.

Each of the clear-out amplifiers also receives a gating voltage obtained from the cathode follower 145 associated with the station-call rest step of control stepper 43. The two gating voltages are thus being simultaneously applied to the clear-out amplifier related to a particular storage bank only at the very beginning of the corresponding station period, i. e. only during the pulse period of the entire station period on which the station-call rest step of the control stepper 43 is in its "1" condition and effective to cause its associated cathode follower 145 to supply the required gating voltage. In this manner, a clear-out pulse is supplied to all the tubes of any storage bank in the matrix 30 only at the beginning of the station period during which a new indication code is to be received from the field station corresponding to that particular bank of tubes.

The indication matrix gating amplifiers 146 comprise a plurality of gated amplifier stages with one being provided for each bank of storage tubes included in the indication storage matrix. These gating amplifiers are themselves selectively gated on the corresponding station period. Thus, the gating amplifier associated with the station period for the group A code of station No. 3 is gated from the group A-station No. 3 step of the station stepper 44. Being thus gated, each amplifier is effective to supply a gating voltage to the bank of indication storage tubes relating to the associated station period. For example, during the group A-station No. 2 station period, a positive-gating voltage is applied over wire 147 from the group A-station No. 2 indication matrix gating amplifier, and this gating voltage causes all of the storage tubes which are to receive the indications on the group A-station No. 2 station period responsive to the time-spaced pulses that appear on wire 143 as a result of the received indication code.

Additional gating voltages are applied to the cold cathode tubes included in the indication storage matrix 30 so as to select the particular one out of the entire bank that is being gated on that station period. These gating voltages are obtained from the cathode followers associated with the various steps of the control stepper 43. Thus, whenever the control stepper 43 has its step No. 1 in the "1" condition, a gating voltage is supplied to wire 148 supplying the matrix 30, and this gating voltage is then effective to gate all of the storage tubes in each of the various banks that correspond to the first pulse period. Only one particular bank is at any one time being gated by the indication matrix gating amplifiers 146 with the result that only one out of all of the storage tubes included in the matrix 30 is simultaneously receiving two gating voltages. Thus, although the pulses appearing on wire 143 are applied to all of the storage tubes in the matrix 30, only the one particular storage tube that is then being simultaneously gated from the two different sources can become conductive in response to the pulse appearing on wire 143. In this manner, each indication mark is routed to the proper storage tube and causes such storage tube to become conductive.

DETAILED CIRCUIT ORGANIZATION

*Control office transmitting apparatus*

In describing the detailed circuit organization included in the control office, reference will be made to the Figs. 4A–4E which, when placed one underneath the other in order, illustrate the detailed circuits for the apparatus at the control office. Occasionally, where apparatus is repeated in identical form, the repeated apparatus is shown only for a representative number of units. For example, the control stepper used in the control office includes 17 different stages in the disclosed embodiment of the invention. Of the 17 stages, only seven are shown in the drawings; the remaining ten stages are identical to those shown.

*200 C. P. S. oscillator and squaring amplifier*

The basic timing device at the control office is the 200 C. P. S. oscillator 35. This Colpitts type oscillator includes the tube 150 having in its grid-cathode circuit a resonant tank circuit including the inductor 151 and capacitors 152 and 153. The output of this oscillator shown at line A of Fig. 5A is applied over wire 154 to a squaring amplifier 36 which includes tubes 155 and 156. These two tubes are interconnected in such a way as to provide a regenerative type of amplifier of the kind commonly known as a Schmitt trigger circuit. Both tubes 155 and 156 are provided with a common cathode resistor 157. An increase of voltage at the grid of tube 155 results in increased conduction of this tube so that there is a greater voltage drop across its plate load resistor 158. The lower plate voltage of this tube that is then applied through the parallel resistor 159 and capacitor 160 causes this tube 156 to conduct less plate current. Since the voltage drop across cathode resistor 157 is affected most by the level of conduction of tube 156, there is a lower voltage drop across the cathode resistor 157 so that the grid-cathode voltage of tube 155 is further increased.

A decrease of voltage obtained from the oscillator 35 has a similar cumulative effect in the reverse direction. In this way, any voltage change appearing at the grid of tube 155 has a large effect and causes this tube 155 to shift readily from a condition of very low current conduction to a condition of high current conduction. As a result of the large voltage variation appearing at the plate of tube 155, tube 156 also alternates readily between fully conductive and substantially nonconductive conditions as the sine wave output of the oscillator 35 varies between its extreme limits. The result is that there appears at the plate of tube 156 a voltage waveform having substantially a rectangular wave shape as illustrated at line B of Fig. 5A.

*Differentiator*

The differentiator 37 includes the triode tube 161 whose plate is connected through resistor 162 to (B+) and whose grid is connected through resistor 163 also to (B+). The square wave of output voltage of tube 156 is applied to the grid of this tube 161 through capacitor 164. Since the grid of tube 161 is connected directly through a large value of resistance to the (B+) voltage source, there is a flow of current between cathode and grid which causes the potential at the grid of tube 161 to be reduced by the voltage drop across resistor 163 to a value substantially that of the grounded cathode of this tube.

Upon each increase of voltage at the plate of tube 156, the capacitor 164 is readily charged through a circuit which includes the low resistance grid-cathode circuit of tube 161. Consequently, capacitor 164 charges very rapidly and only a very small positive voltage pulse appears between grid and cathode of tube 161. Since this tube is fully conductive because of its practically zero grid-cathode voltage, this slightly positive pulse has substantially no effect upon the output of this tube.

When the plate voltage of tube 156 has been at a high level so that the capacitor 164 is charged to a relatively high voltage, the sudden drop of voltage of tube 156 upon the negative-going edge of its square wave voltage output causes capacitor 164 to discharge. Because the voltage across capacitor 164 cannot change instantly, the sudden drop in plate voltage of tube 156 causes a corresponding drop in voltage between grid and cathode of tube 161. Tube 161 is in this way immediately driven to cutoff so that current can no longer flow from the cathode to either the grid or the plate. Also, the plate voltage of this tube immediately rises to a high value substantially equal to that of the (B+) voltage supply. Capacitor 164 can now discharge only through the resistor 163 which is of a high value of resistance so that capacitor 164 can discharge only slowly. While capacitor 164 is thus being discharged, tube 161 is held nonconductive so that its plate voltage remains at substantially the (B+) level. After an interval as determined by the time constant in the discharging circuit for capacitor 164, this capacitor becomes sufficiently discharged that the grid potential rises above the cutoff level, and tube 161 again becomes conductive. Its plate voltage then is quickly lowered to provide the trailing edge of the positive-going output pulse.

The differentiator 37 operates in this manner in response to each negative-going voltage variation appearing in the square wave output of the squaring amplifier 36. Each of the resulting positive-going pulses (see line C, Fig. 5A) is applied through a capacitor 165 to the grid of tube 166 included in the pulse delay 40 and is also applied to a cathode follower 38 through a capacitor 167.

The cathode follower 38 as well as the other cathode followers included in the organization of the present invention are of a conventional type and have, therefore, for the interest of simplicity, been shown in block form. These cathode followers are normally biased so as to be nonconductive or substantially nonconductive with a resulting cathode voltage of zero volts but become conductive when the grid is driven positive so as to provide a positive output voltage at the cathode.

*Pulse delay*

The pulse delay 40 comprises the two tubes 166 and 168 each of which is connected to operate as a differentiator circuit similar to the differentiator 37 just described. Thus, upon each negative-going trailing edge of the output pulses provided by the differentiator 37, tube 166 becomes nonconductive with a resulting abrupt increase of its plate potential, and this tube then is restored to its conductive condition only at the end of an interval as determined by the time constant provided for the discharging of capacitor 165. When capacitor 165 is sufficiently discharged to allow tube 166 to again become conductive, its plate voltage is quickly lowered to provide the negative-going trailing edge of the positive pulse output of this tube.

The positive-going leading edges of the voltage pulses appearing at the plate of tube 166 have substantially no effect upon the conduction of tube 168. The negative-going trailing edges, however, result in the discharging of capacitor 169 and cutoff tube 168 so that an abrupt increase of voltage occurs at the plate of tube 168. After a predetermined interval, capacitor 169 becomes sufficiently discharged to allow tube 168 to conduct once more so that the plate voltage of this tube 168 is lowered to its normal value. As a result, positive-going trigger pulses of relatively short duration appear at the plate of tube 168. These pulses are delayed with respect to those provided by the differentiator 37, and the amount of this delay corresponds to the length of time during which tube 166 remains nonconductive since it is only the restoration of conduction to this tube that causes tube 168 to become nonconductive for a time and provide a positive-going output pulse at its plate. These output pulses obtained from tube 168 are applied through a capacitor 170 to a cathode follower 41. The corresponding positive-going trigger pulses obtained from the output of this cathode follower 41 are then applied to the carrier modulator 13 illustrated in Fig. 4C. These pulses are only very slightly delayed with respect to those provided by the differentiator 37 and shown at line C of Fig. 5A so that they have not been illustrated again in this Fig. 5A.

*Control stepper*

Figure 4A:
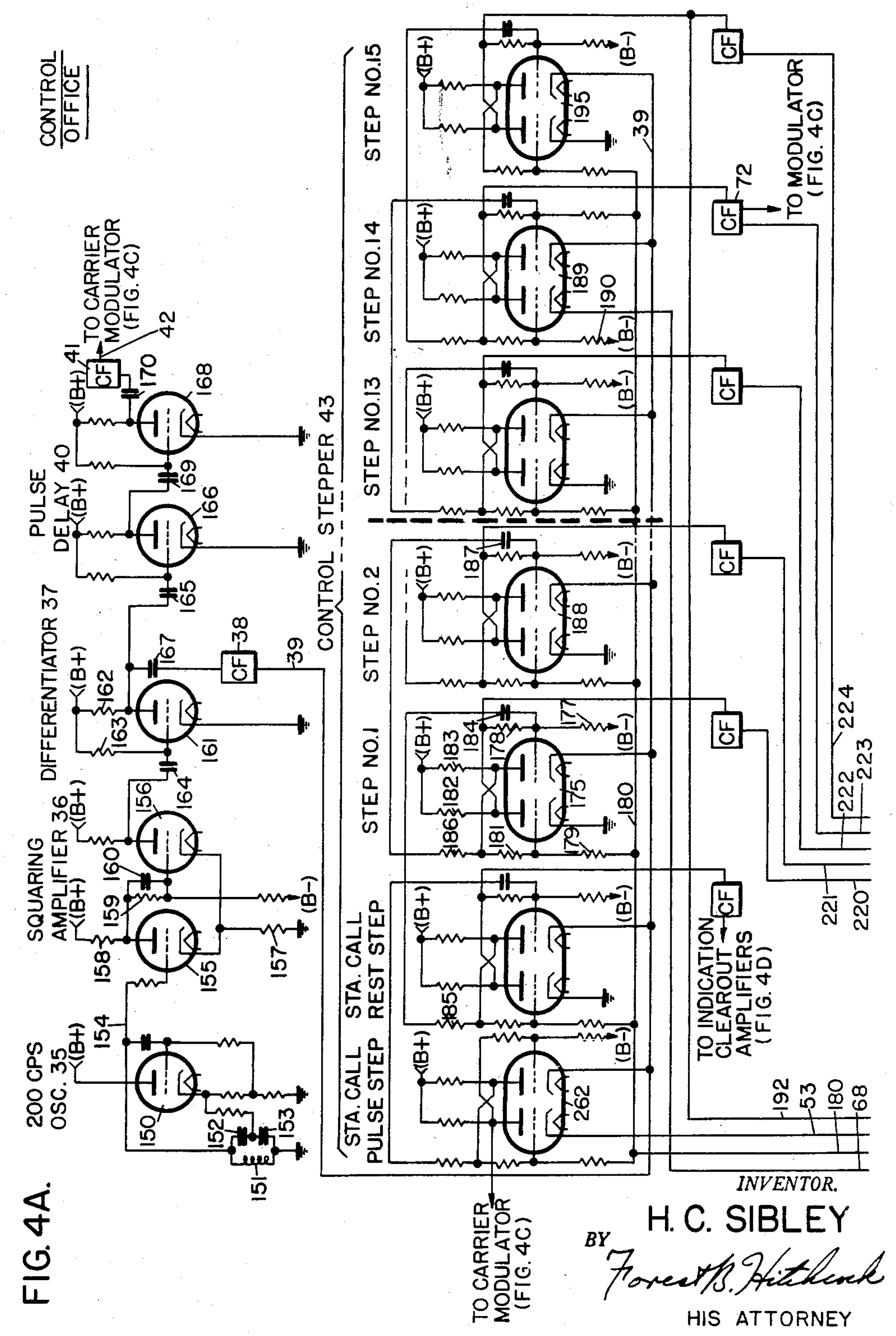

The control stepper 43 shown in detail in Fig. 4A includes a number of cascade-connected, bistable state, trigger circuits. A separate stage is provided for each of the 15 steps included in a station period with one extra stage being provided for a station-call pulse step and another stage for a station-call rest step.

Each stage of the control stepper 43 has two interconnected triode tubes. The interconnections are made in such a way that only one tube of the pair can at any time be conductive; the other tube of the pair is then controlled to a fully cut-off condition. The conductive condition of the one tube results in a low grid voltage for the other tube so that such tube is held non-conductive. The non-conductive condition of such other tube tends to provide a high grid voltage for the other tube to maintain it fully conductive. The relative conduction conditions of these tubes may be reversed almost instantly by the application of the proper input voltage to an appropriate electrode of one of the tubes.

Considering the stage of the control stepper 43 which corresponds to step No. 1 of a station period, the tube 175 is shown as having its left-hand cathode connected directly to ground while its right-hand cathode is connected to a pulse transfer bus 39. The control grid of the right-hand side of tube 175 is connected through a resistor 177 to the (B−) voltage source and is also connected through a resistor 178 to the plate of the left-hand side of tube 175. The left-hand grid of tube 175 is connected through a resistor 179 to a bus 180 and is connected through resistor 181 to the right-hand plate of tube 175. The left-hand and right-hand plates of this tube are connected through resistors 182 and 183, respectively to the (B+) voltage source. The right-hand grid of tube 175 receives an input through capacitor 184 and resistor 185 from the right-hand plate of the tube included in the preceding stage of the control stepper. The voltage appearing at the right-hand plate of tube 175 is similarly applied through a resistor 186 and capacitor 187 to the succeeding stage of the control stepper.

Figure 4B:
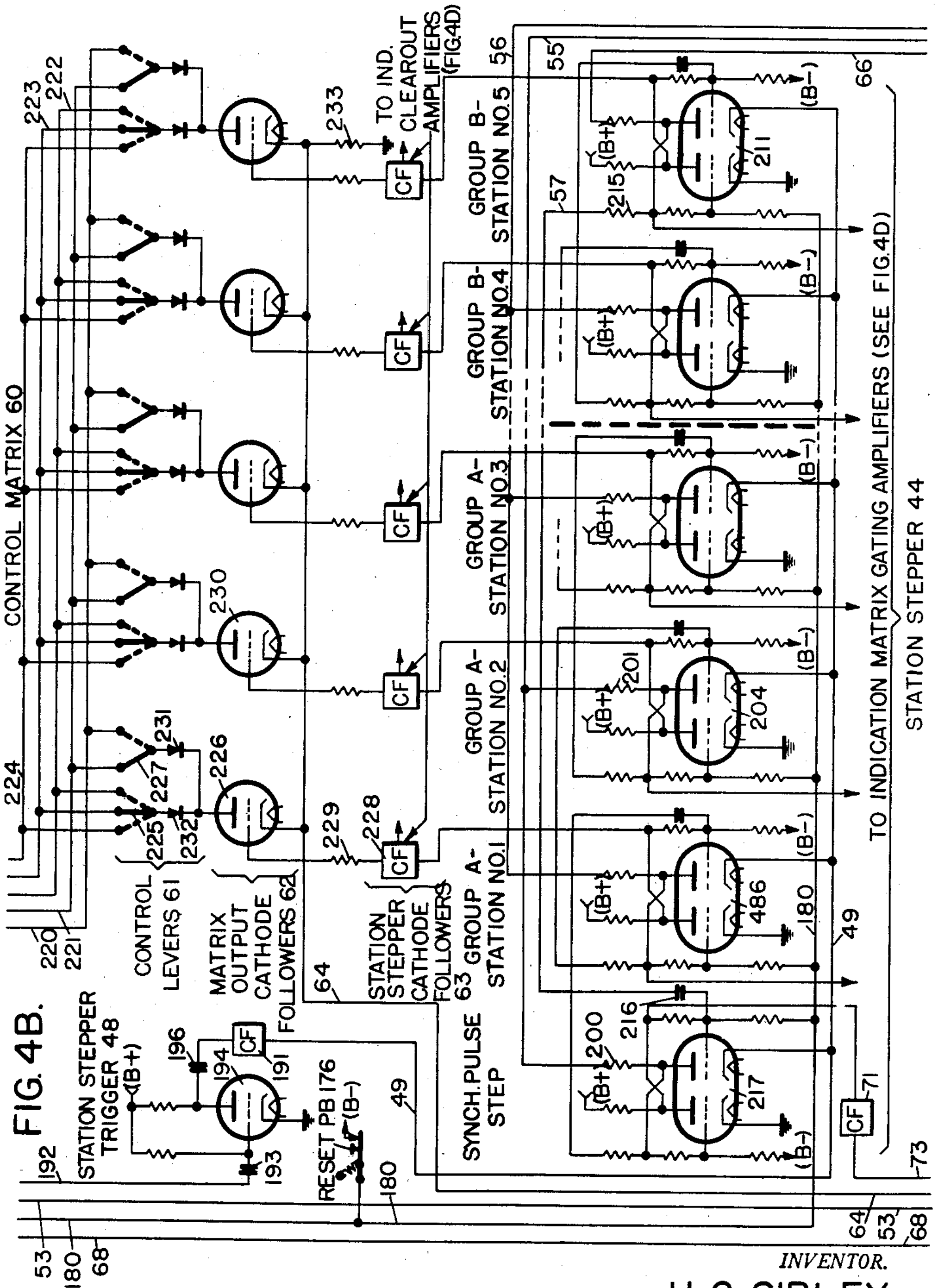

Bus 180 is ordinarily connected through a normally closed re-set push button 176 shown in Fig. 4B to the (B−) voltage source. To properly condition the various stages of both the control stepper and the station stepper when the system is initially put into operation, the re-set push button 176 is depressed so as to remove the (B−) voltage from bus 180. As a result, the resistor 179 in the grid circuit of the left half of tube 175 no longer has its lower terminal connected to (B−). The left-hand grid of this tube is still, however, connected through resistors 181 and 183 to the (B+) source of voltage so that a relatively high voltage tends to appear between the left-hand grid and grounded cathode of tube 175. The left half of tube 175 is, therefore, made highly conductive, and the resulting voltage drop across its plate load resistor causes its plate voltage to be at a fairly low level.

Between occurrences of pulses from the output of cathode follower 38, bus 39 is substantially at ground potential. Consequently, the right-hand cathode of tube 175 is also normally grounded. The voltage at the right-hand control grid is at some value between the relatively low positive voltage at the plate of the conducting left-hand half of the tube and the voltage of the (B−) supply. The actual level of this voltage, as determined by the relative values of resistors 177 and 178, is selected to provide a voltage at the right-hand grid sufficiently negative to bias the right-hand half of the tube to beyond cutoff.

This condition of the stepper stage wherein the left-hand half of tube 175 is conductive and the right-hand half is nonconductive is a stable condition and is maintained when the reset push-button 176 is restored to its normal closed condition to connect bus 180 to the (B−) source of voltage. Thus, the right-hand half of the tube 175 is maintained nonconductive because the low plate voltage of the other half of the tube causes it to have a highly negative grid-cathode voltage. At the same time, the high plate voltage of the right-hand half of the tube 175 raises the grid-cathode voltage of the left-hand half sufficiently to ensure that this half of the tube is fully conductive.

This condition of the control stepper stage wherein the left-hand half of the tube is conductive and the right-hand half is nonconductive is designated as the "0" condition of this stage. The opposite condition where the right-hand half is conducting and the left-hand half is cut off is designated as the "1" condition of the stage.

When any stage of the control stepper is restored from its "1" condition to the "0" condition, a positive-going voltage variation is applied to the succeeding stage. Thus, restoration of the step No. 1 stage from the "1" to the "0" condition in a manner to be presently desirable results in the right-hand half of tube's 175 being restored from a conductive to a nonconductive condition. While in the conductive condition, the right-hand plate is at a low voltage because of the voltage drop produced by the flow of plate current through resistor 183. When the right-hand half becomes nonconductive as the stage is returned to its "0" condition, the right-hand plate abruptly rises in potential as the flow of plate current ceases through resistor 183. A positive-going voltage variation is, therefore, applied through resistor 186 and capacitor 187 to the control grid of the right-hand half of tube 188 in the step No. 2 stage.

In exactly the same manner, the restoration of the station-call rest step causes a positive-going voltage variation to be applied through capacitor 184 to the right-hand grid of tube 175. The right-hand control grid is thus momentarily raised above cutoff potential so that the right-hand half of the tube becomes momentarily conductive. The flow of plate current through resistor 183 is momentarily increased with a resulting decrease in voltage at the right-hand plate and also at the left-hand grid of this tube. The left-hand half of this tube then conducts less so that its plate voltage rises and produces an increase in voltage at the right-hand grid so that the right-hand half conducts more plate current. The action is thus cumulative, resulting in an almost instantaneous transfer of relative conduction conditions of the two halves of tube 175.

Being thus controlled to its "1" condition by a positive-going voltage variation obtained from the preceding stage, the step No. 1 stage remains in this condition until a positive-going voltage pulse appears on bus 39. The rise in potential at the right-hand cathode of tube 175 results in an abruptly lowered grid-cathode voltage for the right-hand half of this tube so that it immediately conducts less current. The cumulative switching action just described now operates in reverse and instantly causes the right-hand half of the tube to become cut off and the left-hand half to become fully conductive so that the stage is abruptly restored to its "0" condition. There occurs then again an abrupt rise in voltage at the right-hand plate so that a positive-going voltage variation is applied to the right-hand grid of tube 175, causing this next stage to immediately operate to its "1" condition. The step No. 2 stage remains in this state until another occurrence of a positive-going voltage pulse on bus 39 is effective to restore the step No. 2 stage once more to its "0" condition.

From this description, it can be seen that each occurrence of a positive-going voltage pulse on bus 39 causes any stage in its "1" condition to be restored and at the same time causes such "1" condition to be transferred to the next stage.

To obtain the desired stepping operation, the control stepper 43 is initially conditioned by operation of the reset push button 176 of Fig. 4B so that only a single stage of the control stepper is initially in the "1" condition and all the remaining stages are in their "0" conditions. Thus, as described, the operation of the reset push button assures that step No. 1 is initially in its "0" condition since it causes the right-hand half of tube 175 to be nonconductive and the left-hand half to be conductive. The same situation holds with respect to the remaining stages of the control stepper with the exception of the stage corresponding to step No. 14. Tube 189 of this step No. 14 stage has its right-hand control grid rather than its left-hand control grid connected to bus 180. Consequently, the removal of the (B−) voltage from bus 180 assures that the right-hand grid of tube 189 will be more positive than the left-hand grid which remains connected through resistor 190 to (B−). In this way, tube 189 is so conditioned that its right-hand half becomes conductive and its left-hand half nonconductive so that this stage may be considered as being conditioned to its "1" condition. The reason for conditioning the control stepper so that step No. 14 is the particular stage chosen to be initially conditioned to its "1" condition will later become apparent.

*Station stepper*

The station stepper 44 shown in Fig. 4B is similar to the control stepper 43 just described. A separate stage is provided in the station stepper for each station period in the cycle with one extra stage being provided for the synch pulse step. Each stage of the station stepper is connected to bus 180. Each stage has the left-hand grid of the tube for that stage connected to bus 180, but the synch pulse step stage has the right-hand grid of its tube connected to bus 180. Consequently, exactly as was described with the control stepper 43, the synch pulse step stage is initially conditioned by operation of the reset push button 176 to its "1" condition, but all the remaining stages of the station stepper are initially conditioned to their "0" conditions.

The right-hand cathode of each stage included in the station stepper 44 is connected to a bus 49 which receives a voltage from cathode follower 191 associated with the station stepper trigger 48. Positive-going trigger pulses are made to appear on bus 49 in a manner to be presently described and each such pulse causes the particular stage of the station stepper 44 then in its "1" condition, wherein the right-hand half of its tube is conductive, to be restored to the "0" condition, where the right-hand half of the tube is nonconductive. This restoration of a stage to its "0" condition then causes a positive-going voltage variation to be applied to the right-hand grid of the tube for the next succeeding stage, thereby causing such next stage to operate to its "1" condition.

*Station stepper trigger*

The station stepper trigger 48 receivers its input from the left-hand plate of the tube included in the step No. 15 stage of control stepper 43. When the step No. 15 stage is finally operated from its "1" condition to its normal "0" condition by a pulse appearing on bus 39, the left-hand half of tube 195 becomes conductive so that a negative-going voltage variation appears at this left-hand plate and is applied over wire 192 and through capacitor 193 to the grid of tube 194 included in the station stepper trigger 48.

The station stepper trigger 48 is essentially a differentiator circuit similar to the differentiator 37 shown in Fig. 4A and already described in detail. Any positive-going voltage variations appearing at the left-hand plate of tube 195 such as occur when the step No. 15 stage operates to its "1" condition have substantially no effect upon the plate output voltage of tube 194. The negative-going voltage variations that occur, however, when step No. 15 stage is restored to its "0" condition cause tube 194 to be driven to cutoff so that its plate voltage abruply rises and causes a positive-going voltage variation to be applied through capacitor 196 to the input of cathode follower 191. Such positive-going voltage variation causes the cathode follower 191 to provide a positive-going trigger pulse on bus 49 to the various stages of the station stepper 44.

From this description it can be seen that each time the control stepper 43 has been operated through all its steps and with its last step No. 15 stage finally restored to its "0" condition, a trigger pulse is made to appear on bus 49 so as to advance the station stepper 44 a single step.

Figure 4C:
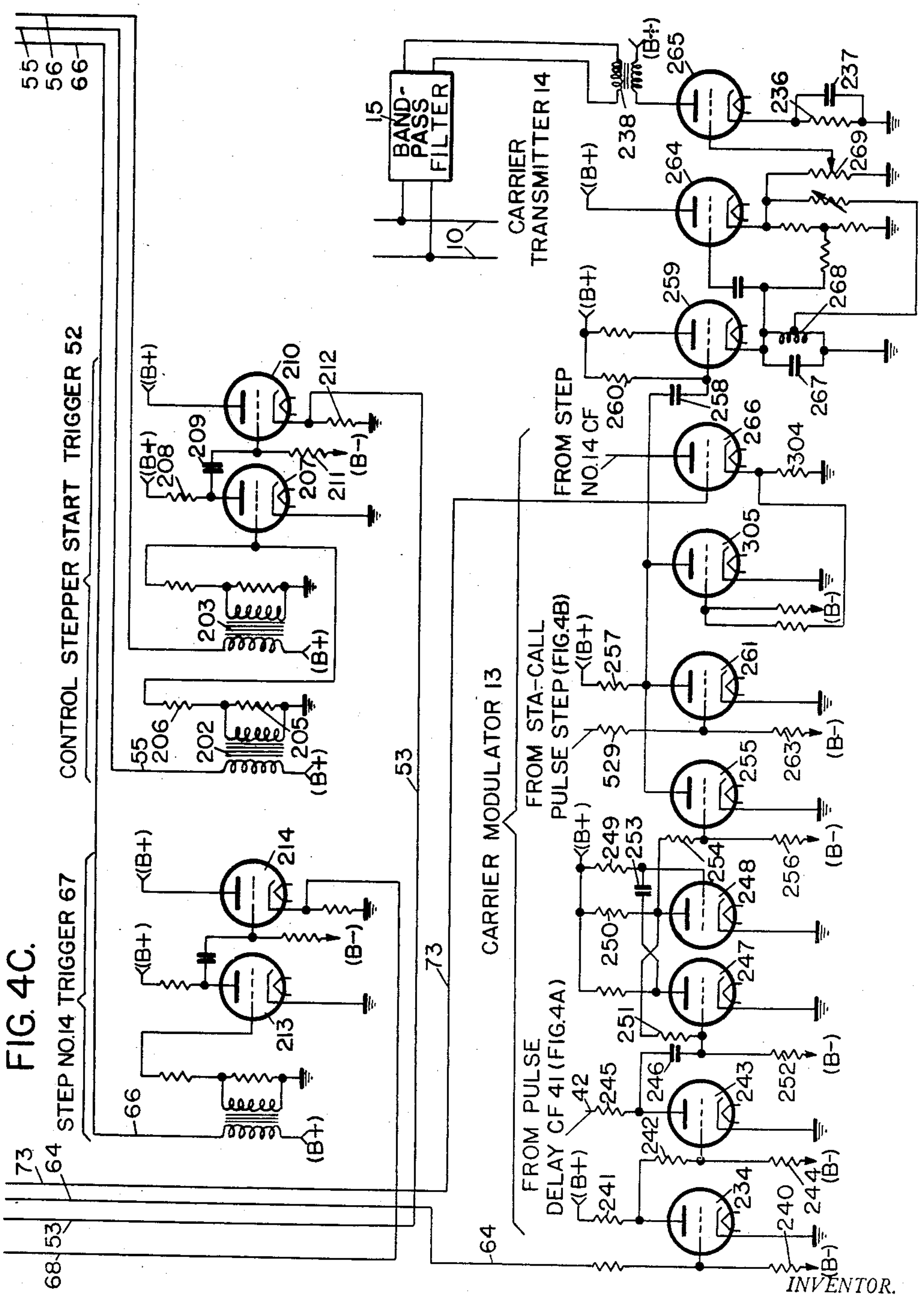

The advance of a step by the station stepper 44 causes an input to be applied to the control stepper start trigger 52 of Fig. 4C with the result that a pulse is applied over wire 53 to the station-call pulse step of control stepper 43. This pulse causes the station-call pulse step to operate to its "1" condition so that subsequently occurring pulses on wire 39 can produce the desired stepping operation by transferring this "1" condition to the succeeding stages of control stepper 43.

Alternate stages of the station stepper 44 are connected to bus 55, and the remaining alternate stages are connected to bus 56. For example, the right-hand plates of the dual triode tubes included in the synch pulse stage and the group A-station No. 2 stage are respectively connected through plate resistors 200 and 201 to bus 55 which is then connected through the primary winding of a transformer 202 to the (B+) voltage terminal. The right-hand plates of the dual triode tubes included in the group A-station No. 1 stage, group A-station No. 3 stage, and group A-station No. 5 stage (not shown in Fig. 4B) all connect to bus 56 which is then connected through the primary winding of transformer 203 to the (B+) terminal.

When any stage of the station stepper 44 is restored to its "0" condition from the "1" condition with the result that the right-hand half of the corresponding tube becomes nonconductive, a decrease of current occurs in the primary winding of the associated transformer included in the control stepper start trigger 52. For example, operation of the group A-station No. 2 stage to its "0" condition causes the right-hand half of tube 204 to become nonconductive so that a decrease of current occurs through resistor 201 and through the primary winding of transformer 202. The resulting flux change in the primary winding induces a voltage in the associated secondary winding. This secondary winding is shunted by a resistor 205 whose purpose is to dampen the waveform of voltage appearing across the secondary winding. The negative-going voltage pulse that appears at the upper terminal of the secondary winding is then applied through resistor 206 to the control grid of triode tube 207.

Tube 207 is normally conductive because its cathode is grounded and its control grid is normally also at ground potential. Because of the flow of plate current through its plate load resistor 208, the plate voltage of this tube is normally at a relatively low value. The negative-going voltage pulse that is applied to its control grid results in the tube's being momentarily driven to cutoff so that its plate potential rises abruptly to substantially the level of the (B+) voltage source. Capacitor 209 thus charges and causes the control grid of the cathode follower triode tube 210 to be driven momentarily positive. Tube 210 is normally cut off because of the connection of its control grid through resistor 211 to the (B−) source of voltage so that no voltage drop appears across the cathode resistor 212 and wire 53 is accordingly at ground potential. The charging of capacitor 209 and the resulting increase of grid-cathode potential of this tube 210, however, causes the tube to conduct momentarily so that a positive voltage appears at the cathode and is applied over wire 53 directly to the left-hand cathode of the tube 262 included in the station-call pulse step stage of control stepper 43 (see Fig. 4A).

When a stage of the station stepper 44 that is connected to bus 56 rather than bus 55 is operated to its "0" condition, the effect is the same as that just described with the exception that a current variation then takes place in the primary winding of transformer 203 instead of transformer 202. Tube 207 then receives a negative-going voltage pulse on its control grid from the secondary winding of this transformer 203. This pulse is effective in the same way to produce a positive-going pulse on wire 53 for operating the station-call pulse step stage of this station stepper 43 to its "1" condition.

Successive stages of the station stepper 44 must be connected over separate buses to separate transformers of the control stepper start trigger 52 because of the fact that a decrease of current occurring in one stage as that stage is operated to its "0" condition is accompanied by an increase of current in the right-hand half of the tube for the preceding stage as that stage is operated to its "1" condition. If such two successive stages were associated with the same transformer winding, there would be substantially no current change in such winding because the increase of current in the one tube would be counterbalanced by a corresponding current decrease in the other tube. However, by connecting the adjacent stages alternately to separate transformer windings, this difficulty is avoided so that each operation of a stage to its "0" condition can cause a pulse to appear on wire 53 and thereby operate the station-call pulse step of the control stepper 43 to its "1" condition.

From the description that has been given, it is clear that a continuous stepping operation occurs with respect to both control and station steppers as long as trigger pulses are applied to bus 39. Thus, each complete operation of the control stepper results, when step No. 15 is restored to its "0" condition, in the application of a trigger pulse to bus 49 so that the station stepper 44 will advance one step. With this advance of a step by the station stepper 44, a trigger pulse is produced by the control stepper start trigger 52 to operate the first stage of the control stepper 43 to its "1" condition. In this way, it is possible for pulses appearing on wire 39 to again effect a stepping operation of the control stepper. This chain of events occurs over and over, thereby demarcating the station periods through operation of the station stepper and the various pulse periods included in each station period through operation of the control stepper.

*Step No. 14 trigger*

At the end of a cycle, a variation occurs with respect to the just-described repetitive operation of control and station steppers, and the purpose of this variation is to insert, at the beginning of the new cycle, the required synchronizing pulse. Accordingly, when the group B-station No. 5 stage of the station stepper 44 is restored to its "0" condition at the end of a cycle, an output is applied to the step No. 14 trigger 67 (see lines L and P of Fig. 5A). This contrasts with the previously described operation wherein the restoration of any step of the station stepper to its "0" condition causes an output to be applied to the control stepper start trigger 52.

This control which the step No. 14 trigger receives over wire 66 is effective in much the same manner as the similar controls applied to the control stepper start trigger 52 from any other stage of the station stepper. Thus, the rendering to a nonconductive condition of the right-hand half of the tube 211 of the group B station No. 5 stage causes a negative-going voltage variation to be applied to the control grid of tube 213 included in this step No. 14 trigger 67. The normally nonconductive cathode follower tube 214 becomes momentarily conductive so that a positive-going voltage pulse is applied over wire 68 to the left-hand cathode of the step No. 14 stage of control stepper 43. This step No. 14 stage is at this time in its normal "0" condition with the left-hand half of its tube 189 conductive. The positive voltage pulse applied to the left-hand cathode causes the left-hand half of the tube to become nonconductive and the right-hand half conductive so that this stage is, in effect, operated by this voltage pulse to its "1" condition (see line I, Fig. 5A).

The next positive-going trigger pulse to appear on wire 39 five milliseconds later causes the step No. 14 stage to return to its "0" condition and step No. 15 stage then assumes the "1" condition (line I, Fig. 5A). Five milliseconds later another trigger pulse on bus 39 causes the step No. 15 stage to return to its "0" condition and a pulse is then applied over wire 192 to the station stepper trigger 48 (line K).

The restoration of the group B-station No. 5 stage of station stepper 44 not only produces the results just described with reference to the control stepper 43 but also causes a trigger pulse to be applied over wire 57 to the synch pulse step stage of the station stepper (see line M). The increase of potential that occurs at the plate of the right-hand half of tube 211 when this last stage of the station stepper is restored to its "0" condition causes a positive-going voltage variation to be applied through resistor 215 and capacitor 216 to the right-hand grid of tube 217 in the synch pulse step stage. The positive-going pulse that then appears between grid and cathode of the right-hand half of tube 217 reverses the condition of this stage so that the right-hand half becomes conductive and the left-hand half nonconductive. Consequently, during the time that the step No. 14 and step No. 15 stages of the control stepper 43 are being operated following the end of the cycle, the synch pulse step stage of the station stepper 44 is in its "1" condition.

Two pulse periods later, the step No. 15 stage is restored to its "0" condition (see line J, Fig. 5A) with the result that the station stepper trigger 48 responds by causing a pulse to appear on wire 49 (see line K). This pulse causes the synch pulse step stage of station stepper 44 to be returned to its "0" condition (see line M) and the group-A station No. 1 stage then is operated to its "1" condition (see line N). Thus, it can be seen that the synch pulse step stage remains in its "1" condition only for two pulse periods for a total of ten milliseconds. All other stages of the station stepper 44 of course remain in their "1" conditions successively for the length of time required for the control stepper 43 to operate through all of its 17 stages. It will later be described in detail in connection with a consideration of the carrier modulator 13 that the control carrier frequency is transmitted when both the synch pulse step stage and the step No. 14 stage are simultaneously in their "1" conditions. Thus, carrier is transmitted only for the first five milliseconds of the total of ten milliseconds that the synch pulse step stage is in its "1" condition, thereby providing the required synch pulse at the beginning of each cycle in the manner outlined in Fig. 2.

*Control stepper cathode followers*

Each stage of the control stepper 43 other than the station-call pulse step has its left-hand plate connected to the input grid circuit of a cathode follower amplifier. When any stage is in the zero condition, with the left-hand half of the tube fully conductive, the plate voltage at the left-hand plate is at a relatively low value so that a correspondingly low level of voltage is applied to the grid circuit of the associated cathode follower. This cathode follower is so biased that the low voltage it receives from the corresponding control stepper stage under these circumstances results in the cathode follower's tube being cut off. However, when any stage of the control stepper is in the "1" condition where the left-hand half of the tube is nonconductive, the plate voltage applied to the grid circuit of the associated cathode follower is at a considerably higher value so that the cathode follower tube becomes conductive and supplies a fairly high level of output voltage.

The cathode followers connected to the step Nos. 1 to 15 stages of the control stepper 43 control the voltages appearing on buses 220 to 224 respectively. Although only five such buses are shown in Figs. 4A and 4B, one for each of the five steps shown of the control stepper, actually one bus is provided for each of the 15 steps corresponding to the 15 pulse periods in each station period.

*Matrix output cathode followers*

The matrix output cathode followers 62 shown in Fig. 4B comprise a number of double gated, cathode follower amplifier stages with one being provided for each station period in a cycle of operation. The plate of each of these cathode followers 62 is selectively connected through the control levers 61 to the buses 220 to 224. The control lever 225, for example, is a three-position switch which will selectively connect the plate of cathode follower tube 226 to either bus 222, 223 or 224. The two-position switch 227 functions in a similar manner to selectively connect the plate of tube 226 to either bus 220 or 221. Additional switches, which are not shown in Fig. 4B, may be provided so that the plate of tube 226 can be selectively connected to the remaining of the 15 buses included in the control martix 60.

Each stage of the station stepper 44 other than the synch pulse step stage also has an associated cathode follower stage which provides a substantially zero cathode output voltage when the respective station stepper stage is in the "0" condition, but provides a relatively high output voltage when such stage is in its "1" condition. Each of these cathode followers supplies its output through a resistor to the control grid of a corresponding one of the matrix output cathode followers 62. The output voltage obtained at the cathode of cathode follower 228, for example, is applied through resistor 229 to the control grid of cathode follower tube 226.

In order that any matrix output cathode follower can become conductive, both its plate and control grid must be simultaneously applied with positive gating voltages. As each stage of the station stepper 44 is in turn operated to its "1" condition through a cycle of operation to thereby demarcate a station period, the respective matrix output cathode follower has its control grid positively gated. Thus, during the group A-station No. 1 period the cathode follower 226 has its control grid positively gated, and during the group A-station No. 2 station period, the cathode follower tube 230 has its control grid positively gated.

Each matrix output cathode follower 62 has its plate electrode selectively gated on certain pulse periods of the station period in which its control grid is then gated. During the group A-station No. 1 period, for example, positive gating voltages, each of five milliseconds duration appear successively on the buses 220 to 224. During the step No. 1 pulse period, a positive gating voltage appears on bus 220 but cannot be applied to the plate of tube 226 if the switch 227 is in its left-hand position as shown in Fig. 4B. During the step No. 2 pulse period, a positive gating voltage appears on bus 221 and is applied through the closed contact of switch 227 and the isolation rectifier 231 to the plate of cathode follower tube 226. Similarly, on the step Nos. 13 to 15 pulse periods, positive gating voltages appear successively on buses 222 to 224. However, with the three-position switch 225 in its center position, only the gating voltage appearing on bus 223 can be applied through the closed contact of this switch 225 and through the isolation rectifier 232 to the plate of tube 226.

On those pulse periods during the group A-station No. 1 station period on which the plate of tube 226 is gated as selected by the positions of the control levers, the matrix output cathode follower tube 226 becomes highly conductive so that a positive voltage is developed across resistor 233 which is the common cathode resistor for all these cathode followers. This positive voltage is then applied over wire 64 to the control grid of tube 234 included in the carrier modulator 13 of Fig. 4C.

In a manner similar to that just described, each matrix output cathode follower tube can, on the particular station period that its control grid is positively gated, become conductive on certain selected pulse periods of that station period in accordance with the positions of the control levers relating to that particular cathode follower. Since the positive pulses that are thus made to appear on wire 64 and which are applied to the carrier modulator 13 result in the transmission of carrier so as to constitute marks in the control code, it can be seen that the selection of the pulse periods on which marks are to be transmitted in any station period is entirely in accordance with the positions of the control levers corresponding to that station period. In this way, a two-position device at a field station such as a switch machine may be controlled by a two-position control lever such as control lever 227. In one position, the control lever causes a mark pulse to appear in the code on the first pulse period and this can then be decoded at the fiel station as representing the "switch normal" control for the switch machine. With the control lever in its other position so that a mark is transmitted on the second pulse period, the resulting code may be decoded at the corresponding field station and interpreted as designating a switch reverse control for the particular switch machine.

A more complex control may be effected at a field station by utilizing three successive pulse periods with a three-position control lever determining on which of the three pulse periods a mark character shall be transmitted. For example, a mark on the first of the three pulse periods may denote a clearing control of a signal for eastbound traffic; a mark on the second pulse period can then denote a stop control for the signal; and a mark on the third pulse then denotes a clearing control for the signal for westbound traffic.

*Carrier modulator*

The purpose of the carrier modulator 13 shown in Fig. 4C is to gate the carrier transmitter 14 at appropriate times throughout a cycle of operation so that the various control code characters, including station-call marks and the synchronizing marks, are transmitted to the various field stations.

The carrier modulator receives an input over wire 64 from the matrix output cathode followers 62. As already described, the voltage on this bus 64 is normally at about ground potential but is raised to a positive value throughout each pulse period that a mark digit is to appear in the control code. When the wire 64 is at its normal ground potential, tube 234 in the carrier modulator 13 is nonconductive because of the negative bias potential applied to its control grid from (B—) through resistor 240. Because there is then no plate current drop through the plate load resistor 241 of this tube, a high voltage appears at the plate of tube 234. This voltage is applied through resistor 242 to the control grid of tube 243 and is sufficiently high to overcome the negative biasing voltage applied to this grid from (B—) through resistor 244. Tube 243 is, consequently, conditioned to be conductive provided only that the required high voltage is applied to its plate through resistor 245.

The voltage for the plate of tube 243 is obtained from the pulse delay cathode follower 41 of Fig. 4A over wire 42. Each positive-going trigger pulse obtained from this cathode follower 41 and occurring at a time when the grid of tube 243 is raised so as to condition this tube to conduct, encounters a low impedance circuit between the plate of tube 243 and ground so that such positive-going trigger pulses are, in effect, shorted out. Each pulse that is shorted in this way has substantially no effect through capacitor 246 on the control grid of tube 247.

When, however, a mark digit is to appear in the control code, the voltage on bus 64 is raised so that tube 234 becomes conductive. The plate voltage of this tube is then lowered because of the voltage drop across resistor 241. This lower plate voltage causes tube 243 to be biased beyond cutoff. Consequently, any positive-going trigger pulse applied through resistor 245 to the plate of tube 243 at such time encounters a high impedance between this plate and ground so that the pulse is not shorted out. Each such trigger pulse when applied through capacitor 246 to the grid of tube 247 is then effective to momentarily raise the grid-cathode potential of tube 247.

The trigger pulses which cause the stepping operation of both control and station steppers are obtained from the cathode follower 38 associated with differentiator 37. The trigger pulses which are applied to the plate of the tube 243 through resistor 245 are, however, obtained from the output of cathode follower 41 associated with pulse delay 40. These trigger pulses are only very slightly delayed with respect to those obtained from the cathode follower 38. The reason for this delay is that the gating pulses applied to the grid of tube 234 have their time of application and of removal substantially coincident with the pulses appearing on bus 39 since the control and station steppers take their successive steps in response to these pulses on bus 39. The slight delay provided for the pulses that are applied to the tube 243 ensures that these pulses occur after all required switching actions have taken place.

Tubes 247 and 248 are included in a circuit organization commonly known as a one-shot multivibrator. A substantially zero grid-cathode potential for tube 248 is provided by the connection of its control grid through resistor 249 to the (B+) source of voltage. The conductive condition of this tube 248 causes it to have a relatively low plate voltage because of the voltage drop across resistor 250. Consequently, this voltage, when applied through resistor 251 to the control grid of tube 247, is not of sufficient magnitude to overcome the negative bias provided through resistor 252 from the (B−) voltage source so that tube 247 is normally in a nonconductive condition.

When a positive-going trigger pulse is applied through capacitor 246 to the control grid of tube 247, the grid-cathode potential of this tube is momentarily raised above the cutoff level so that this tube begins to conduct. Capacitor 253 which is normally charged to a relatively high voltage then discharges through the conducting tube 247 with the result that the grid of tube 248 is abruptly driven negative with respect to its grounded cathode. Tube 248 thus becomes nonconductive and the high plate voltage that it then provides through resistor 251 to the control grid of tube 247 causes tube 247 to remain conductive even after the termination of the positive pulse on its control grid. This reversal of the conductive states of tubes 247 and 248 continues as capacitor 253 discharges through tube 247 and through the relatively high resistance of resistor 249. After an interval, however, whose length is determined by the time constant for the discharge of capacitor 253, the grid potential of tube 248 rises to a level to permit this tube to again conduct. A similar cumulative switching action then takes place which reverses the conductive states of these two tubes and restores them almost instantaneously to their original conditions.

The multivibrator comprising tubes 247 and 248 is organized to remain in its abnormal state in response to positive-going pulses applied to the grid of tube 247 for a length of time that is substantially equal to one-half of a five millisecond pulse period. Accordingly, at the beginning of each pulse period on which a mark is to be transmitted, tube 248 becomes nonconductive and tube 247 conductive but this condition is maintained only for the first half of the pulse period. At about the middle of the pulse period, the multivibrator restores itself to its normal condition so that tube 248 is once more conductive and tube 247 is cut off.

In the normal condition of this multivibrator circuit, the plate voltage of tube 248 is at a relatively low level because of its conductive condition. This voltage is applied through resistor 254 to the control grid of tube 255 but is not sufficient to overcome the negative bias applied to this grid from (B−) through resistor 256. Tube 255 is thus normally nonconductive so that there is no flow of plate current of this tube through resistor 257. At the start of any pulse period on which a mark digit is to be transmitted, tube 248 becomes nonconductive so that its plate voltage rises and causes tube 255 to conduct. There is then a substantial flow of plate current of this tube 255 through resistor 257 so that a negative-going voltage variation is applied at this time through capacitor 258 to the control grid of tube 259. Upon the restoration of the multivibrator circuit to its original condition, tube 255 again becomes nonconductive so that the plate voltage abruptly rises and the voltage at the grid of tube 259 then is raised to its normal value.

Tube 259 is normally in a fully conductive condition because of the connection of its control grid through resistor 260 to (B+). The negative-going voltage variation occurring at the beginning of each mark digit causes capacitor 258 to discharge and thereby abruptly lower the grid-cathode voltage of tube 259 so that this tube becomes nonconductive. Since, as will presently be described, the carrier transmitter 14 is effective to supply its distinctive carrier frequency F1 to the band-pass filter 15 whenever tube 259 is controlled to be nonconductive, it is apparent that this carrier frequency will be transmitted on each pulse period on which a mark character is desired to be sent. Moreover, since the multivibrator including tubes 247 and 248 remains in its abnormal state only for the first half of each such pulse period, it follows that the carrier frequency will likewise be transmitted only on the first half of each mark pulse period in accordance with the general code organization shown in Fig. 2.

Tube 261 also has its plate connected through the same plate load resistor 257 to (B+). The control grid of this tube is connected through resistor 529 to the station-call pulse step of control stepper 43. When this station-call pulse step is in its normal or "0" condition, its left-hand plate is at a low potential because the left-hand half of the tube 262 in this stage is then conductive. This low plate voltage causes tube 261 to be normally nonconductive since a negative biasing voltage is applied to the grid of this tube from (B−) through resistor 263. Each time, however, that the station-call pulse step of the control stepper is in its "1" condition, the left-hand plate of tube 262 rises in potential and causes an increase of voltage at the grid of tube 261 for the entire following pulse period. The control grid of tube 261 is then sufficiently raised in potential so that this tube is conductive with the result that a negative-going voltage variation is applied through capacitor 258 to the control grid of tube 259. Consequently, the carrier frequency F1 is caused to be transmitted throughout the entire five millisecond pulse period that the station-call pulse step is in its "1" condition; this forms the first half of each station-call pulse. No such connection is provided from the station-call rest step to the carrier modulator 13 so that carrier frequency F1 cannot be transmitted on this next pulse period. In this way, the second half of each station-call pulse is formed. There is thus provided that at the beginning of each station period there shall be a five millisecond pulse period in which carrier is transmitted followed by a five millisecond period in which no carrier is transmitted to thereby form the distinctive station-call pulse. Each of the following pulse periods on steps 1 to 15 is of the same duration, but on each of these the carrier frequency can be transmitted only for the first half of such pulse period as determined by the operating time of the multivibrator included in the carrier modulator 13.

The distinctive synch pulse appearing at the beginning of each cycle is provided by the control of tube 266 included in the carrier modulator 13. Tube 266 is essentially a cathode follower which receives its plate voltage from the cathode follower 72 connected to the step No. 14 stage of control stepper 43 (see Fig. 4A). The plate of this cathode follower tube 266 thus receives the plate voltage required for it to become conductive only on the fourteenth pulse period of each station period. The control grid of this tube 266 has a positive gating voltage selectively applied to it over wire 73 from the cathode follower 71 connected to the synch pulse step of station stepper 44. This control grid consequently receives a positive voltage to condition it to be conductive only when the synch pulse step stage is in its "1" condition. The synch pulse step stage is in its "1" condition only for the two pulse periods that are required to step through steps 14 and 15 of the control stepper 43. Consequently, tube 266 receives the two required gating voltages on its plate and control grid simultaneously only during the first of the two pulse periods on which the synch pulse step stage is in its "1" condition. When tube 266 is gated in this way, it becomes conductive so that its cathode, which is normally at ground potential, is raised in voltage as a result of the flow of plate current through cathode resistor 304. This cathode voltage increase is applied to the control grid of tube 305 and causes this normally cut-off tube to become conductive. In this way, the grid of tube 259 receives a five millisecond negative pulse causing it to be cut off. As a result, the carrier frequency F1 is again transmitted on such pulse period to provide the first half of the signal pulse in accordance with the general code organization shown in Fig. 2.

*Carrier transmitter*

The carrier transmitter 14 includes tubes 259 and 264 which are connected in a circuit organization commonly known as a pulsed Hartley oscillator. The output of this oscillator is applied to the grid of a power amplifier tube 265. The frequency-determining resonant circuit of the oscillator comprises capacitor 267 and inductor 268 which are connected in parallel in the cathode circuit of tube 259. When the control grid voltage of tube 259 is such that this tube is conductive, the oscillator is inoperative. However, when the grid of tube 259 is driven to cutoff or beyond with respect to the cathode, the oscillator becomes operative with the result that a sine wave of voltage of the desired frequency appears on the cathode of tube 264. The detailed manner of operation of this oscillator will not be described here since its structure and manner of operation is well-known in the art. Furthermore, various other types of pulsed oscillators might equally well be used.

The potentiometer 269 connected between the cathode of tube 264 and ground provides a means for selecting the desired level of input to the grid of tube 265. Tube 265 is cathode biased as a result of the flow of plate current through its cathode resistor 236. This resistor 236 is by-passed by a capacitor 237 whose purpose is to avoid degeneration of the frequency being amplified. The alternating plate current of the tube that results from the corresponding alternating voltage applied to its control grid induces a voltage in the secondary winding of transformer 238, the primary of which is included in the plate circuit of tube 265. The secondary voltage is applied through the band-pass filter 15 to the line wires 10. It may thus be said in summary that the transmitter is normally ineffective to provide the distinctive carrier frequency to the line wires 10 but becomes effective to do so throughout each interval that the grid of tube 259 is driven to cutoff.

FIELD STATION APPARATUS

*Carrier receiver*

The control code received at each field station from the control office as interrupted carrier frequency F1 (Fig. 8A, line A) is applied from the line wires 10 through band-pass filter 16 to the carrier receiver 17. This carrier receiver 17 includes a detector stage so that the output of the carrier receiver provides a low level of direct-current output voltage when carrier is being received and a higher level of direct-current voltage when no carrier is received. This output voltage of the carrier receiver 17 is applied through capacitor 270 to the control grid of tube 271 included in the carrier squaring amplifier 77.

*Squaring amplifier*

Tube 271 is preferably of the kind such as a 6BN6 having the characteristic that a slight variation in its control grid voltage causes the tube to vary from a fully conductive to a fully nonconductive condition. Thus, when no carrier frequency F1 is being received at a field station, the control grid voltage of tube 271 is at a high level and the tube is then cut off so that its plate voltage is high. However, when the carrier frequency F1 is being received at a field station, the output voltage of the carrier receiver is at a low level so that tube 271 is cut off and its plate voltage is at a high level. The effect then is that the plate voltage of tube 271 provides a positive-going pulse for each pulse of carrier frequency F1 received at the field station, and the duration of such positive-going pulse equals the duration of the received carrier frequency as shown in Fig. 8A at line B.

*Mark multivibrator*

Each such positive-going pulse is applied through capacitor 272, isolation diode 273, and resistor 274 to the control grid of tube 275 which is included in the mark multivibrator 78. Tubes 275 and 276 are interconnected to form a one-shot multivibrator similar to the one previously described in connection with the control office apparatus. Tube 276 is normally fully conductive and tube 275 nonconductive. Upon the positive-going leading edge of each pulse obtained from the plate of tube 271, the condition of the multivibrator is abruptly reversed so that tube 276 becomes cut off while tube 275 becomes fully conductive. The length of time that the mark multivibrator remains in this condition is selected to be greater than the 2½ millisecond interval during which the carrier frequency F1 is received on a mark digit control code but less than the 5 millisecond interval throughout which carrier frequency is received to form the distinctive synch and station-call pulses.

*Delayed mark amplifier*

During the time that the mark multivibrator 78 is in its abnormal state with tube 275 conductive, the plate voltage of the nonconducting tube 276 is at a high level (see Fig. 8A, line C). When the mark multivibrator 78 restores itself to its normal condition, the plate voltage of tube 276 is abruptly reduced. The plate voltage of tube 276 is applied through capacitor 277 to the control grid of tube 278 included in the delayed mark amplifier 79. This amplifier 79 comprises a differentiator circuit similar to that previously described so that the negative-going voltage variation applied to the grid of tube 278 when the mark multivibrator is restored to its normal condition causes tube 278 to become nonconductive for a brief interval of time dependent upon the length of time required for capacitor 277 to be discharged to its new steady-state value. Thus, as indicated at line D of Fig. 8A, the delayed mark amplifier provides a positive-going trigger pulse whose leading edge is substantially coincident with the trailing edge of the positive-going output pulse obtained from the plate of tube 276.

*Synch and station-call pulse separator*

Each of these positive-going trigger pulses obtained from the delayed mark amplifier 79 is applied through capacitor 279 to the control grid of tube 280 included in the synch and station-call pulse separator 80. This tube 280 is a pentode type of tube having its screen grid provided with the proper operating potential by a connection through resistor 281 to (B+). Both control and suppressor grids of this tube are normally biased negatively so as to prevent conduction of the tube by connections provided through resistors 282 and 283, respectively, to (B−) terminal. Only by the simultaneous occurrence of positive gating voltages on these control and suppressor grids can tube 280 be made conductive.

The control grid is driven momentarily positive to condition the tube to a conductive condition in response to each positive-going trigger pulse from the delayed mark amplifier 79. The suppressor grid, on the other hand, receives a positive gating voltage through capacitor 284 from the plate of tube 271 in the squaring amplifier 77. As can be seen from a comparison of lines D and B of Fig. 8A, the required gating voltages for tube 280 occur concurrently only at the time of either a synch or a station-call pulse. Thus, the squaring amplifier is still effective to provide a high output voltage to gate the suppressor grid at the time of occurrence of a positive trigger pulse from the delayed mark amplifier only for each synch or station-call pulse. For the shorter mark digits appearing in the control code, the output voltage of the squaring amplifier is already reduced to its normal low value at the time of occurrence of the associated trigger pulse from the delayed mark amplifier. As a result, tube 280 becomes momentarily conductive and effective to provide a negative-going trigger pulse at its plate only for either a synch or a station-call pulse, as indicated at line E of Fig. 8A.

Each negative-going trigger pulse from the plate of tube 280 is applied through capacitor 285 and resistor 286 to the control grid of tube 287 which together with tube 288 is included in the synch and station-call pulse multivibrator 81. This multivibrator operates in the same manner as the mark multivibrator 78. Tube 288 is normally conductive and tube 287 nonconductive. Upon the positive-going trailing edge of each pulse appearing at the plate of tube 280, the condition of conduction of these two tubes 287 and 288 is abruptly reversed. With tube 288 nonconductive, a positive-going voltage variation appears at the plate of this tube. The recovery time of this multivibrator 81 is selected to be of some nominal value so as to provide a positive voltage pulse at the plate of tube 288 as indicated at line F of Fig. 8A having sufficient duration to provide the required energy for an intergrating circuit associated with the synch pulse separator 82.

*Synch pulse separator*

The synch pulse separator 82 includes pentode tube 289 having its screen grid provided with proper operating potential by being connected through resistor 290 to (B+). Both the control and suppressor grids of the tube are negatively biased to an extent to prevent conduction of the tube by connections provided to a negative source of biasing voltage. The control grid is connected through resistor 291 and resistor 292 to the terminal (B−) and the suppressor grid is connected through resistors 293 and 294 also to (B−). For this tube to become conductive it is required that both its control and suppressor grids be concurrently gated with positive voltages each of sufficient amplitude to overcome the normal cutoff bias provided.

The positive voltage pulse obtained from the plate of tube 288 and applied through capacitor 295 and resistor 293 to the suppressor grid of tube 289 sufficiently raises the potential of this negatively biased grid to condition the tube for conduction. Each pulse obtained from the plate of the tube 288 is also supplied through an integrating circuit to the control grid of tube 289. This intergrating circuit includes the capacitors 296, 297, and 298 and also the resistor 299. Each individual positive pulse obtained from the plate of tube 288 causes a charging of the capacitors 296 and 297 so that the control grid voltage of tube 289 is somewhat raised in potential but not sufficiently to enable the tube to become conductive.

When station-call pulses are received at a field station with the usual station period interval between successive pulses, the interval between the application of pulses through this intergrating circuit to the control grid of tube 289 is sufficiently great so that the charge built up on the capacitors 296 and 297 by one pulse is substantially dissipated by the discharging of these capacitors before the arrival of the next such pulse. However, at the beginning of a cycle of operation when the synch pulse is immediately followed by the station-call pulse for station No. 1, two positive-going pulses are applied in quick succession from the plate of tube 288, through the integrating circuit, to the control grid of tube 289. The first of these pulses causes the integrating capacitors to be partially charged; upon the occurrence of the second of these pulses, the still charged integrating capacitors are further charged so that the control grid voltage of tube 289 is thereby sufficiently raised with respect to the cathode to condition this tube for conduction. Since the suppressor grid is positively gated by each of these pulses, tube 289 is properly gated at such time to become conductive. The momentary conduction of this tube that then results produces a voltage drop across its plate load resistor 300 so that a negative-going voltage pulse is applied over wire 301 and through capacitor 302 to the plate of gas discharge tube 303 included in the station stepper synchronizing control 83.

*Station stepper*

The negative-going output pulses obtained from the synch and station-call pulse separator 80 illustrated at line E of Fig. 8A are applied over wire 85 and through capacitor 308 to the station stepper 86. These pulses are applied directly to the guide electrode 309 and are also applied through the pulse delay 87 to a similar guide electrode 310.

The pulse delay 87 includes resistors 311 and 312 as well as the capacitor 313. In its normal condition, the capacitor 313 is fully discharged so that the guide electrode 310 is at ground potential. When a negative-going pulse appears on wire 85, capacitor 313 charges negatively so as to decrease the potential at the guide electrode 310. The voltage across capacitor 313 cannot change immediately, however, so that the guide electrode 310 reaches its maximum negative potential some time after the other guide electrode 309 has reached its maximum negative potential. In this way, each negative-going pulse on wire 85 immediately produces a negative pulse on the guide electrode 309 and shortly thereafter another pulse on the guide electrode 310. In response to these pulses, the glow may be transferred from any cathode to an adjacent cathode in a prescribed direction. With the pulse on the guide electrode 310 somewhat delayed with respect to that on electrode 309, the transfer of glow from cathode to cathode proceeds in the direction of the arrow shown, i. e. from any cathode to the next lower numbered cathode. These cathodes are arranged in a circular pattern about the anode of the tube so that actually cathode K10 is adjacent cathode K1. Thus, a pulse appearing on bus 85 when the glow is on cathode K1 causes the glow to be transferred directly to cathode K10.

The general structural organization of the multicathode tube 314 included in the station stepper 86 and also its general manner of operation are described in an article appearing in the November 1953 issue of the magazine "Electronics." This article, titled "Polycathode counter tube applications" describes in greater detail the manner in which the glow is transferred from cathode to cathode in response to the application of input pulses to the tube.

When the glow is on a particular cathode of tube 314, there is a flow of current from the plate of the tube to that particular cathode so that a voltage drop appears across the resistor connected in series with the cathode. Since the glow is transferred from one cathode to the next only in response to the station-call pulses, the glow remains on any cathode, causing the voltage on that cathode to be at a high level, for the duration of a single station period. On the various station periods, different system functions are to be performed. This is accomplished by applying the positive voltage appearing at selected cathodes of tube 314 and applying these voltages as gating voltages to particular circuit organizations which accomplish the desired result.

Figure 7A:
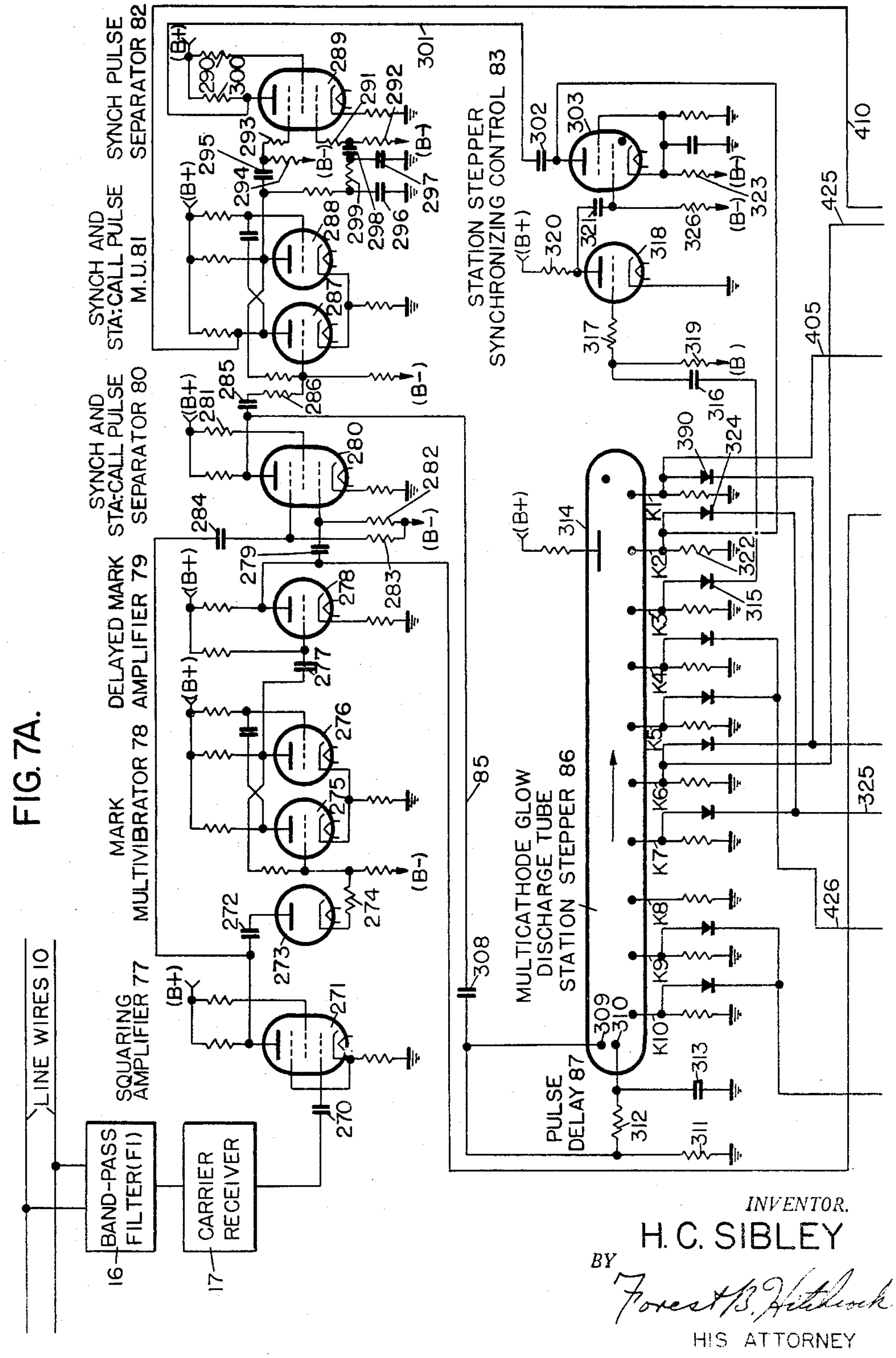

As previously explained, it is necessary that the station stepper at each station have the glow of its tube 314 at the proper cathode at the beginning of the cycle. To accomplish this, connections are provided from two adjacent cathodes of tube 314 to the station stepper synchronizing control 83. The connections shown in Fig. 7A are those which would be provided at field station No. 2. As indicated in Fig. 9B, at this field station the glow is required to be on cathode K2 during the synch pulse period and the group A-station No. 1 station period of a cycle. For this reason, a connection is provided from cathode K3 of tube 314, through the isolation rectifier 315, capacitor 316, and resistor 317, to the grid of tube 318. Also, a connection is provided from the plate output circuit of tube 303 to cathode K2.

Fig. 9B illustrates the fact that, at station No. 2, the glow is normally at cathode K3 at the end of each cycle. Thus, the next pulse appearing on wire 85 and applied to tube 314 corresponds to the synch pulse and causes the glow to transfer from cathode K3 to cathode K2.

On the station period that the cathode glow is on cathode K3, the rise in potential of cathode K3 produces a corresponding increase in grid voltage of tube 318. This tube is normally biased to cutoff by the connection provided from its control grid through resistors 317 and 319 to (B—). However, when the glow is on cathode K3, tube 318 conducts so that its plate voltage decreases and causes a negative pulse to appear on the grid of gas discharge tube 303. This negative-going voltage pulse can have no effect upon the conduction of tube 303, since this tube is already biased to a nonconductive condition by a connection provided from its grid, through resistor 326, to (B—).

When the occurrence of the synch pulse at the beginning of the next cycle causes the glow to transfer from cathode K3 to cathode K2, there is an abrupt decrease of voltage at cathode K3 which causes tube 318 to become momentarily nonconductive. Its plate voltage then rises abruptly so that a positive-going voltage pulse appears on the grid of tube 303 causing this tube to be fired.

The plate of tube 303 is normally at ground potential since it is connected through the resistor 322 directly to ground. The required high plate-cathode voltage required for the tube to fire is provided by connecting the cathode of this tube through resistor 323 to the (B—) terminal. As a result, when tube 303 becomes conductive, its normally grounded plate which is connected to cathode K2 becomes substantially negative with respect to ground. The cathode K2 then assumes a sufficiently negative voltage with respect to all the other cathodes of this tube to ensure that conduction will take place only between this cathode K2 and the anode. It is thus assured that, under normal operating conditions, the occurrence of the synch pulse at the beginning of each cycle will result in the placing of the glow, at field station No. 2, on cathode K2 rather than on any other cathode of the tube.

The first station-call pulse which immediately follows the synch pulse produces a negative-going voltage variation at the plate of tube 289 in the synch pulse separator 82. This negative pulse, applied through capacitor 302 to the plate of tube 303, causes this tube to be extinguished. As a result, there is no longer any flow of plate current through resistor 322 associated with cathode K2. Cathode K2 is then no longer held at a potential below ground but is instead allowed to rise to a positive potential as determined by the flow of cathode current through resistor 322.

If the station stepper 86 at any field station gets out of synchronism at any time, it is assured of being quickly brought back into a synchronized condition. At any field station which is operating out of synchronism, the stepping operation of the station stepper 86 eventually causes a positive-going voltage to be applied to the station stepper synchronizing control 83. This causes tube 303 to be fired so that the glow is then maintained on a particular cathode of the tube as selected by the connections between this synchronizing control 83 and the station stepper 86. At the field station No. 2 shown in Fig. 7A, for example, the operation of the station stepper 86 as it responds to trigger pulses received from the synch and station-call pulse separator 80 eventually causes the cathode glow to transfer from cathode K3 to cathode K2. This causes tube 303 in the station stepper synchronizing control 83 to be fired as already described. The firing of tube 303 so lowers the potential of cathode K2 that the glow is assured of being on this cathode and on no other cathode of the tube. Tube 303 remains fired, holding the glow continually on cathode K2, until the occurrence of the output pulse obtained from the synch pulse separator 82 at the beginning of a new cycle of operation. With tube 303 thus extinguished, the potential at cathode K2 can assume the positive potential it ordinarily assumes when the glow is on this cathode. In this way, the station stepper 86 starts the new cycle with the glow on the cathode K2 as required.

During the time that the glow is on a particular cathode of the station stepper tube, one or more circuit functions may be performed, and these are initiated by the positive voltage appearing on that cathode at such time. One or more system functions may be performed at certain of the field stations during the first station period of the cycle. As already described, the cathode at which the glow is located during the first station period of a cycle also has the glow during the synch pulse period of the cycle. During the synch pulse period, however, that cathode has its potential maintained below ground by reason of the conduction of gas discharge tube 303. This negative potential at the cathode of the station stepper tube cannot produce the required gating so that any system function cannot be accomplished until tube 303 is extinguished by the output pulse from the synch pulse separator 82. The system function can thus be accomplished only during the first station period of the cycle and not on the synch pulse period.

*Oscillator gate control*

On the two station periods during which controls are received at any field station, the multicathode glow tube of the station stepper 86 has its glow on either cathodes K1 or K6 depending upon whether the group A or group B controls and indications respectively, are being transferred. On both of these station periods, the positive voltages existing at cathodes K6 and K1 are applied through capacitor 330 and over wire 331 and resistor 332 to the control grid of tube 333 included in the oscillator gate control 95. Tube 333 normally is biased to cutoff because of the connection provided for its control grid through resistor 334 to the (B—) terminal. When in this normal nonconductive condition, this tube has a relatively high plate voltage because there is then no voltage drop through the plate load resistor 335. When, however, a positive gating voltage is applied to the control grid of tube 333 on selected station periods, this tube becomes conductive so that its plate voltage is abruptly reduced and remains at such low value throughout the entire station period.

*200 C. P. S. oscillator*

The 200 C. P. S. oscillator 96 is of the kind known as a pulsed colpitts oscillator. This oscillator comprises the two triode tubes 336 and 337 with the tube 336 having a frequency determining resonant circuit in its cathode circuit. This resonant circuit includes the inductor 338 and capacitors 339 and 340. The grid of tube 336 tends to be normally at about ground potential since this grid is connected through resistor 341 to ground. Under these conditions, the oscillator is inoperative. The discharging of capacitor 342 that occurs when tube 333 becomes conductive results in a lowering of the grid potential of tube 336 which is sufficient to render tube 336 nonconductive. With tube 336 nonconductive, a 200 C. P. S. sinusoidal output voltage appears at the grid of tube 337, and this voltage is applied through resistor 343 to the control grid of tube 344 included in the oscillator squaring amplifier 97. The oscillator 96 has its resonant circuit adjusted to operate at the same rate as the oscillator provided at the control office, i. e. at 200 cycles per second in one specific embodiment of this invention. The characteristics of the oscillator 96 are such that the sinusoidal output voltage always is initiated with a negative half cycle as illustrated at line I of Fig. 8A.

*Oscillator squaring amplifier*

Tube 344 included in the squaring amplifier 97 is readily driven between conductive and nonconductive conditions by the sine wave of voltage it receives from oscillator 96. As a result, a substantially square wave of output voltage is obtained from the plate of tube 344 as this tube is driven to cut off on the negative half-cycles of its input voltage wave and to saturation on the positive half-cycles of its input voltage wave. The voltage that thus appears at the plate of this tube is applied through capacitor 345 to the control grid of tube 346 included in the shift pulse E–J flip-flop 98 is substantially as illustrated at line J of Fig. 8A.

*Shift pulse Eccles-Jordan flip-flop*

The Eccles-Jordan flip-flop circuit 98 is of a conventional type comprising the two interconnected triode tubes 346 and 347. This trigger circuit has two stable conditions, one in which tube 346 is conductive with tube 347 cut off and the other condition in which these relative conductive conditions are reversed. Upon each positive-going voltage variation at the plate of tube 344, a positive pulse appears at the grid of tube 346 which tends to make this tube conductive with the result that tube 347 becomes cut off. Each negative-going voltage variation at the plate of tube 344 produces a negative-going trigger pulse at the grid of tube 346 causing this tube to become cut off and tube 347 conductive. In this way, the flip-flop trigger circuit 98 is made to operate alternately between its opposite conditions at a rate established by the oscillator 96.

*Intermediate shift trigger amplifier*

The output voltage appearing at the plate of tube 347 of the flip-flop circuit 98 is applied over wire 99 to the intermediate shift trigger amplifier 100. When the output voltage of the oscillator squaring amplifier 97 arises, tube 346 becomes conductive and tube 347 nonconductive so that the voltage obtained from the plate of tube 347 rises also. Thus, the voltage applied to the grid of tube 350 and over wire 99 to the grid of tube 348 may be considered as being in phase with the voltage at the plate of tube 344; this latter voltage waveform is as shown at line J of Fig. 8A. The wire 99 connects directly to the control grid of triode amplifier tube 348 which acts as an inverter amplifier so that the voltage at the plate of this tube is actually the inverse of that applied to its control grid. The waveform of voltage appearing at the plate of this tube 348 and applied to bus 116 corresponds to that shown at line L of Fig. 8A.

*Pulse inverter and main shift trigger amplifier*

The voltage at the plate of tube 347 is also applied through a coupling resistor 349 to the control grid of triode amplifier tube 350 included in the pulse inverter 101. The pulse inverter 101 provides at the junction of its plate load resistors 351 and 352 a voltage which is the inverse of that applied to its control grid. The inverted voltage is then applied directly to the control grid of triode amplifier tube 353 included in the main shift trigger amplifier 102. This amplifier stage 102 also inverts its input waveform to provide an output voltage on bus 115 which is as shown at line K.

The maximum voltage on both buses 115 and 116 must be limited to some preselected value. If this is not done, the cathodes of the tubes included in the shift register may be raised so high with respect to their plates that they will be fired in the reverse direction. The maximum voltage appearing on bus 115 when tube 353 is nonconductive is fixed by the voltage at the junction of the voltage dividing resistors 354 and 355. Any transient voltage variation tending to appear on this bus and raise the voltage above the preselected maximum value causes a flow of current through rectifier 356 shunting the plate load resistor 357. This prevents the voltage on bus 115 from rising above the preselected value.

As shown in Fig. 8A, the output of the oscillator squaring amplifier 97 is at a maximum during the negative half-cycles of the output of oscillator 96 and is a minimum during the positive half-cycles of the oscillator output. Each positive-going pulse edge shown in line J acts upon the flip-flop trigger circuit 98 to make tube 346 conductive. Thus, the first negative half-cycle of the output of oscillator 96 is assured of operating the flip-flop 98 to the condition where tube 347 is nonconductive so that a high voltage is applied to the control grid of tube 350. The conduction of tube 350 that then results causes a low voltage to appear at the control grid of tube 353. The low conductive state of tube 353 then causes this tube to supply a relatively high voltage to bus 115 as shown at line K of Fig. 8A. At the same time, the high plate voltage of tube 347 causes tube 348 to be highly conductive so that a relatively low voltage appears on the intermediate shift trigger bus 116 as shown at line L of Fig. 8A. On each positive half-cycle of the output of oscillator 96, the relative conductive conditions of the various tubes are reversed so that the voltage on the main shift trigger bus 115 is at a low level and the voltage appearing on the intermediate shift trigger bus 116 is at a high level. Consequently, as the oscillator continues to operate, the voltage on buses 115 and 116 varies alternately between two levels in the manner shown at lines K and L of Fig. 8A.

*Shift register*

Most of the system functions which are accomplished by the station stepper 86 throughout a cycle of operation relate to the operation of the shift register. Before discussing in detail how these various system functions are accomplished, it is believed expedient, therefore, to describe the circuit organization and manner of operation of this shift register.

Figure 7B:
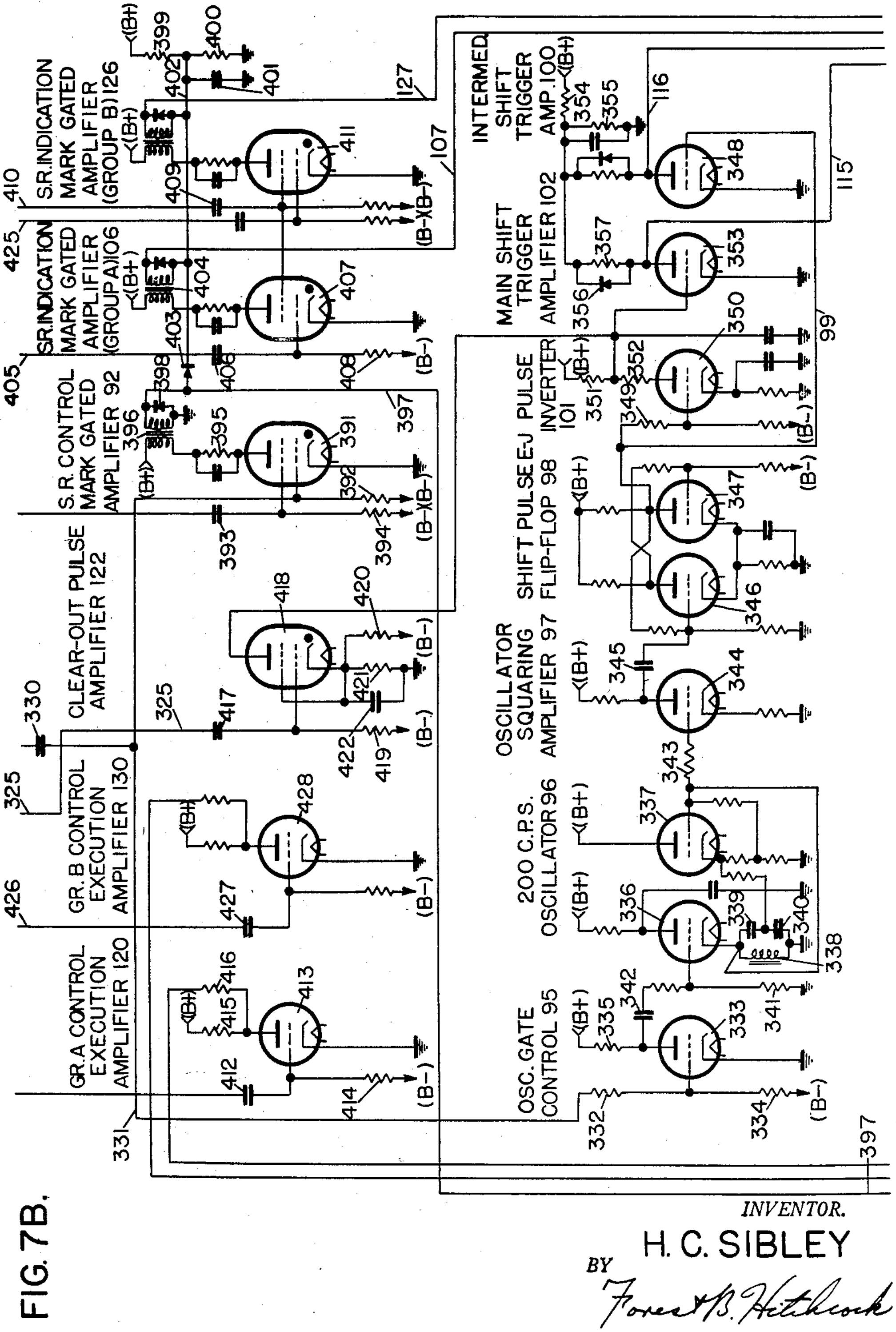
Figure 7C:
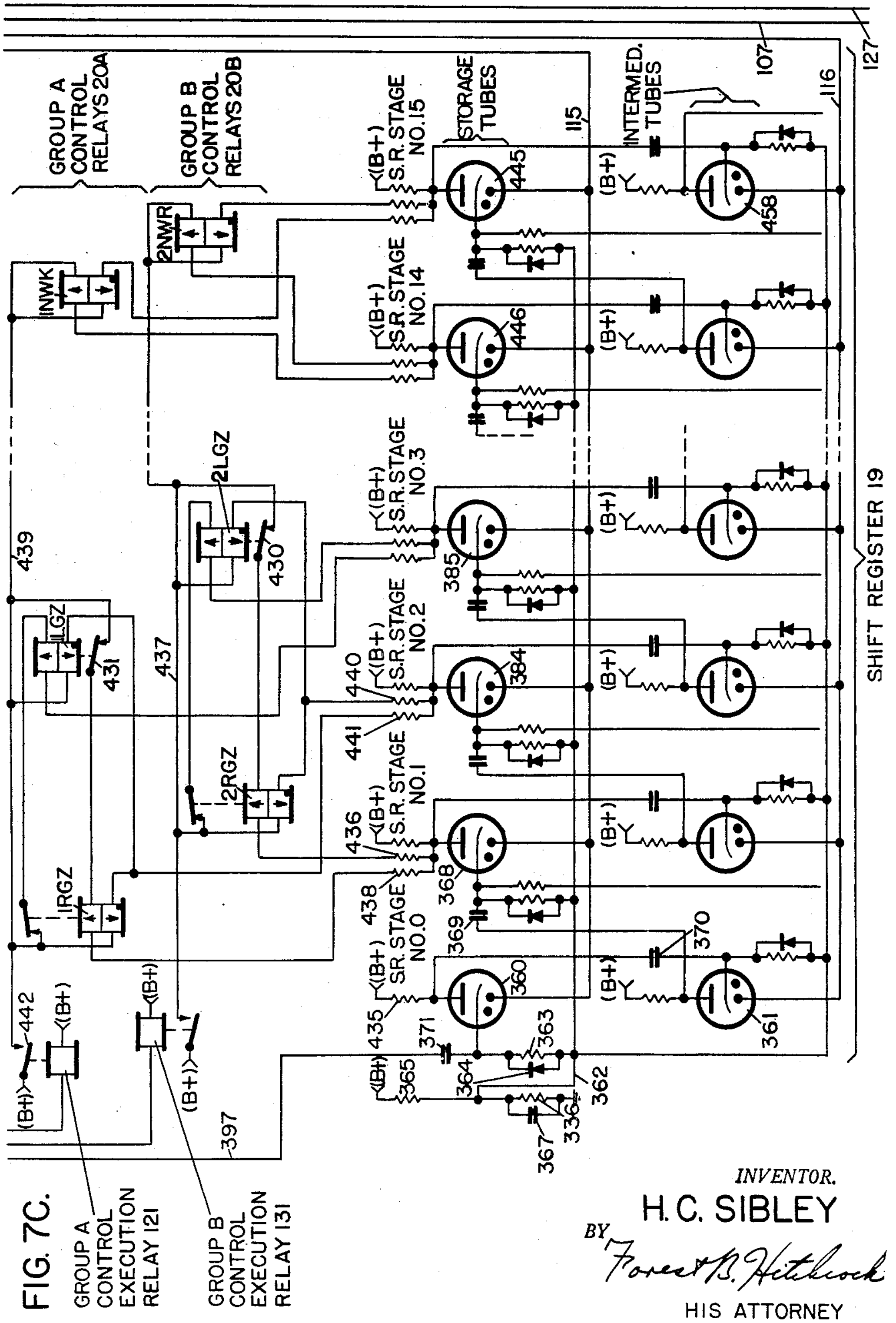

The shift register of the present invention shown in detail in Fig. 7C comprises a plurality of stages with one being provided for each of the fifteen pulse periods included in a station period with an additional No. 0 stage. In Fig. 7C, stages Nos. 0 to 3 and stages Nos. 14 and 15 only are shown; the remaining stages of the shift register are identical to those illustrated.

Each shift register stage comprises two grid controlled, cold cathode, glow discharge tubes. The storage tube of each stage such as tube 368 of stage No. 1 provides for the storage of the various code digits; the intermediate tube of each stage such as tube 361 in the stage No. 0 provides an intermediate or temporary storage of each digit as it is transferred from one stage to the next.

Each storage and each intermediate tube in the shift register is controllable to either of two distinctive conditions; one where the tube is in a stable conductive condition, and the other in which the tube is in a stable nonconductive condition. These conductive and nonconductive conditions correspond, respectively, to the "1" and "0" conditions established by the customary binary notation. When storing a mark code digit, the storage tube of any stage is in its conductive or "1" condition; when storing a space digit, it is in its nonconductive or "0" condition.

The cathode of each of the storage tubes is connected directly to bus 115, and the cathode of each intermediate tube is similarly connected to bus 116. The plate of each storage and each intermediate tube is connected through a plate load resistor to (B+). The grid of each tube is connected through a resistor and rectifier in parallel to a bus 362. The grid of tube 360 is connected, for example, through the parallel-connected resistor 363 and rectifier 364 to bus 362 which is connected to the junction of resistors 365 and 366. This voltage divider provided by the resistors 365 and 366 connected between (B+) and ground provide a positive bias for the grid of each tube in the shift register for reasons which will be later more fully described. Resistor 366 in this voltage divider is shunted by a capacitor 367 whose purpose is to prevent any abrupt variations in the voltage on bus 362 as might be produced by transient variations in the (B+) power supply.

Each of the storage tubes other than the one included in stage No. 0 receives an input from the plate of the intermediate tube associated with the immediate preceding stage. As an example, the storage tube 368 of stage No. 1 receives an input through capacitor 369 from the plate of the intermediate tube 361 included in stage No. 0. Each intermediate tube, on the other hand, receives an input to its grid from the plate of the storage tube of the same stage. The grid of intermediate tube 361 receives its input through capacitor 370 from the plate of storage tube 360 also in stage No. 0. In contrast, the storage tube of stage No. 0 receives an input for its control grid through capacitor 371 from the shift register control mark gated amplifier 92. As will later be described in detail, a positive-going trigger pulse is obtained from this gated amplifier 106 for each mark digit appearing in the control code for the particular field station under consideration.

The shift buses 115 and 116 are alternately pulsed with positive voltages so that when one bus is at a low potential, the other is at a high potential, and this condition is reversed back and forth at a rate established by the oscillator 96. Normally, however, as shown in Fig. 8A at lines K and L, bus 115 is at a low potential and bus 116 is at a high potential. This means that the cathode of each storage tube is at a low positive potential with respect to ground. A comparison of lines E, G, and L of Fig. 8A shows that the delayed mark amplifier 79 of Fig. 7A provides a positive-going output pulse for each mark in the control code and that these trigger pulses are suitably delayed so that each one occurs at a time when the voltage on the main shift bus 115 is at a low level.

The first of such trigger pulses to occur during a station period momentarily raises the potential of the grid of tube 360 sufficiently with respect to the grid to cause this tube to fire. In cold cathode tubes of this kind, the grid must be driven positively with respect to the cathode for the tube to fire. Since each of these tubes is provided with a positive biasing voltage from bus 362, a positive pulse of only moderate amplitude need be applied to the control grid to cause the tube to fire. This positive biasing voltage must of course not be so great as to cause the tube to fire in the absence of an external pulse.

The conductive condition of the tube 360 exists only temporarily since the voltage on bus 115 is soon raised to a sufficient amplitude with respect to the plate of this tube so that conduction can no longer be sustained. As a result, the tube is extinguished, and the voltage at its plate which was at a low level while the tube was conducting, abruptly rises to a higher level substantially equalling that provided by the (B+) source of voltage.

At the same time that the voltage on bus 115 is raised, the voltage on bus 116 is lowered. Consequently, the positive-going voltage variation at the plate of tube 360 which is applied through capacitor 370 and is effective to produce a positive-going pulse at the grid of tube 361 raises the grid potential of tube 361 sufficiently with respect to the now substantially grounded cathode to fire tube 361.

A short time later, the voltage on bus 116 is raised simultaneously with the lowering of voltage on bus 115. The low plate-cathode voltage of tube 361 that then results is insufficient to hold this tube conductive so that it is extinguished. Its plate voltage then abruptly rises so that a positive-going trigger pulse appears at the grid of tube 368 which is the storage tube of stage No. 1. This pulse can now cause tube 368 to become conductive since the cathode of this tube is at a low potential by reason of the low voltage now appearing on bus 115. Any tube in the shift register not in a conductive condition is not affected by the rise in potential of the associated shift bus so that it cannot provide a pulse to any other tube to fire such tube.

The rate at which the shift pulses are applied to buses 115 and 116 is established by the oscillator 96 of Fig. 7B as already mentioned, and this oscillator is made to operate at the same frequency as the oscillator 35 at the control office. In this way, the occurrence of the shift pulses is synchronized with the received control code digits in such a way that bus 115 is always at a low level of potential as each pulse is applied to the tube 360 of the first shift register stage from the shift register control mark gated amplifier 92.

Between successive pulse periods, the shift pulses first cause the potential of bus 115 to be raised, thereby causing any storage tube in a conductive condition to transfer this condition to its associated intermediate tube, and then the raising in potential of bus 116 that follows causes the conductive condition of any intermediate tube to transfer to the storage tube of the following stage.

From this description, it can be seen that the two shift pulses occurring between successive pulse periods cause the particular condition of each shift register stage to be transferred to the next higher numbered stage in the sense that the conductive condition of one storage tube results in the conduction of the storage tube of the next succeeding stage; whereas, any storage tube in a nonconductive condition transfers no input to the next stage so that the next stage remains nonconductive.

As an example of this mode of operation, it is shown at line N of Fig. 8A that the first positive-going trigger pulse obtained from the gated amplifier 92 and applied to the first stage of the shift register occurs at a time when the voltage on bus 115 is at a low level (see line J) and causes the conduction of the storage tube of the first stage as shown at line O of Fig. 8B. Shortly thereafter, the potential of bus 115 is raised so as to extinguish the storage tube of stage No. 0, and this results in the firing of the intermediate tube of this stage as indicated at line P. Following this, the potential on bus 116 is raised while the voltage on bus 115 is lowered to its original level. This results in the extinguishing of the intermediate tube of the first stage and the firing of the storage tube of the second stage. At this time, no input pulse is applied to the storage tube of the first stage from the gated amplifier 92 so that this tube is not fired. When the voltage on bus 115 is again raised, there is then no output applied from the storage tube to fire the associated intermediate tube of the first stage.

A single pair of shift pulses occurs on buses 115 and 116 at the conclusion of the last pulse period because the generation of these pulses can be terminated only by the occurrence of the next station-call pulse. If the shift register included only one stage for each pulse period, the first-received digit would be stepped out of the No. 15 stage by the last pair of shift pulses. By providing the additional No. 0 stage, the first received digit is stepped into stage No. 15 by the last pair of shift pulses and the last-received digit is then transferred from stage No. 0 to stage No. 1.

It may thus be considered that the application of the shift pulses to all stages of the shift register on successive pulse periods, while a time-spaced code of input pulses selectively fires the storage tube of the first stage, causes the time-spaced code to be stepped into the shift register. With the completion of the stepping operation, the first received digit from the gated amplifier 92 resides in the last stage of the shift register, while the last received code digit is located in the first stage.

This stepping operation produced by the application of shift pulses to the buses 115 and 116 may, as in the present embodiment of this invention, also be utilized for stepping an indication code out of the shift register. Thus, at the beginning of a station period, a positive-going trigger pulse is obtained from a gated amplifier and applied through contacts of one of the groups of indication relays to the various shift register stages Nos. 1 to 15. For example, at the beginning of the station period on which group A controls are being received, a positive-going trigger pulse is obtained from the shift register indication mark gated amplifier (group A) 106 and is applied over bus 107 and through contacts of the group A indication relays 108 to the respective shift register stages. The manner in which this pulse is provided in response to a control received from the station stepper 86 will later be described in detail.

These various indication relays may be selectively controlled devices diagrammaticaly illustrated by the block 21 of Fig. 6B. For each indication relay that is in a picked-up condition the positive-going trigger pulse appearing on bus 107 is applied through a front contact of such relay and a series-connected neon lamp to the grid of the storage tube of a corresponding stage of the shift register. For example, if the relays 375 and 377 of the group A indication relays are picked up, the positive-going trigger pulse on bus 107 is applied through front contacts 380 and 381 respectively of these relays as well as through the respective neon lamps 382 and 383 to the storage tubes 368 and 385 included in shift register stages Nos. 1 and 3. Similarly, if the group A indication relays 376, 378 and 379 are dropped away, their front contacts will be opened so that the positive-going trigger pulse on bus 107 cannot be applied to make conductive the storage tubes of the second, fourteenth, and fifteenth shift register stages. On a subsequent station period, when group B controls are being received at the field station, the similar positive-going trigger pulse on bus 107 is effective at that time to selectively fire the storage tubes of the various shift register stages in accordance with the operated conditions of the various group B indication relays.

With the storage tubes of the various shift register stages selectively conditioned in this manner in accordance with an indication code at the beginning of a station period, the shift pulses on bus 115 and 116 are effective during that station period to step the indication code digits from stage to stage. The result is that the final stage No. 15 has its tubes made selectively conductive and nonconductive on successive pulse periods in a time-spaced pattern corresponding exactly to the particular indication code placed in the shift register at the beginning of the station period. This transfer of the code digits from one stage of the shift register to the next is accomplished in the same manner as is the transfer of control digits which are applied in a time-spaced code pattern to the first stage. This action has been described in detail so that it is not deemed necessary to describe it again in detail in connection with the indication code.

It will now be described how various system functions relating to the operation of the shift register are accomplished through operation of the station stepper 86.

On the particular station period during which the group A controls are received from the control office and group A indications are transmitted back to the control office, the glow is on cathode K1 of the multicathode tube employed in the station stepper. The positive voltage that appears then on this cathode K1 is applied through an isolation rectifier 390 and through capacitor 330 to wire 331. From wire 331, this positive voltage is applied to the input of the oscillator gate control 95 in a manner already described in detail. This causes the oscillator 96 to become operative with the final result that the shift pulses appear on buses 115 and 116.

The positive voltage pulse appearing on wire 331 is also applied to the control grid of gas discharge tube 391 included in the shift register control mark gated amplifier 92. Since the capacitor 330 has a relatively large value of capacitance, the time constant for charging this capacitor is correspondingly long so that the positive voltage obtained from cathode K1 causes the grid potential of tube 391 to remain elevated above the normal negative biasing potential provided by the connection of the grid through resistor 392 to (B−) for substantially the entire station period. Thus, it may be considered that throughout the entire station period on which the glow is at cathode K1, the gas discharge tube 391 has its control grid positively gated so that it can become conductive in response to a positive-going pulse applied to its shield grid.

The shield grid of tube 391 receives the positive-going trigger pulses shown in line D of Fig. 8A. These are obtained from the delayed mark amplifier 79 of Fig. 7A and applied to the shield grid through capacitor 393. This shield grid is normally biased negatively by being connected through resistor 394 to the (B−) voltage supply. Each positive-going trigger pulse applied to the shield grid raises its potential sufficiently so that the tube will be fired provided that the control grid is being properly gated on that station period.

The plate of tube 391 is connected through a resistor 395 and parallel capacitor and the primary winding of transformer 396 to (B+). The inductive effect of the primary winding of this transformer 396 in the plate circuit of gas tube 391 results in the generation of an induced voltage in the plate circuit of this tube each time that it becomes conductive, and this induced voltage tends to reduce the plate voltage momentarily to such a low level that conduction can no longer be sustained and the tube is then extinguished. As a result of this self-extinguishing characteristic, the gas tube 391 is conductive only momentarily for each trigger pulse applied to its shield grid.

Each time that the plate of tube 391 conducts current, a voltage is induced in the secondary winding of transformer 396. A positive-going voltage variation is then applied over wire 397 to the grid circuit of the storage tube 360 provided for the shift register stage No. 0. Any negative-going voltage variations induced in the secondary of transformer 396 and tending to appear on wire 397 are effectively short-circuited by the rectifier 398 connected directly across the terminals of the secondary winding of the transformer. Wire 397 is connected through the clamping diode rectifier 403 to the junction of the voltage dividing resistors 399 and 400 connected in series between (B+) and ground. This causes the upper level of the voltage on wire 397 to be clamped to the level of the voltage at the junction of these resistors 399 and 400 and thereby prevents the voltage on wire 397 from exceeding a suitable value. Capacitor 401 shunting the resistor 400 tends to prevent any abrupt voltage changes from appearing on wire 402.

During the time that cathode K1 of the station stepper 86 is at an elevated potential, a positive gating voltage is applied over wire 405 and through capacitor 406 to the control grid of the gas discharge tube 407 included in the shift register indication mark gated amplifier (group A) 106. This control grid is also normally biased negatively to an extent to prevent the tube from firing by a connection provided through resistor 408 to (B−). The positive voltage from cathode K1 raises the control grid potential of tube 407 throughout the station period on which the glow is on cathode K1 so that the tube can become fired provided that the potential of its normally negative biased shield grid is raised. The shield grid of this tube 407 is connected through capacitor 409 and over wire 410 to the plate of tube 287 included in the synch and station-call pulse multivibrator 81. Normally, the plate of tube 287 is at a high level of voltage because this tube is normally in a nonconductive condition. Upon the occurrence of each synch or station-call pulse in the cycle, however, tube 287 becomes conductive for a brief interval so that its plate voltage is reduced to a low level. Capacitor 409 then discharges and a negative-going voltage pulse appears on the shield grid of tube 407, but this negative-going pulse has, of course, no effect upon the conduction of tube 407. When the multivibrator 81 restores itself to a normal condition so that tube 287 once more becomes nonconductive, its plate voltage abruptly rises so that capacitor 409 again charges with the result that a positive-going pulse appears on the shield grids of both tubes 407 and 411. Of these two tubes, only tube 407 has its control grid positively gated by reason of the glow being on cathode K1 of the station stepper so that only tube 407 is fired at this time. Tube 407 remains fired only momentarily since it is organized to be self-extinguishing in the same manner as described for tube 391.

Figure 7D:
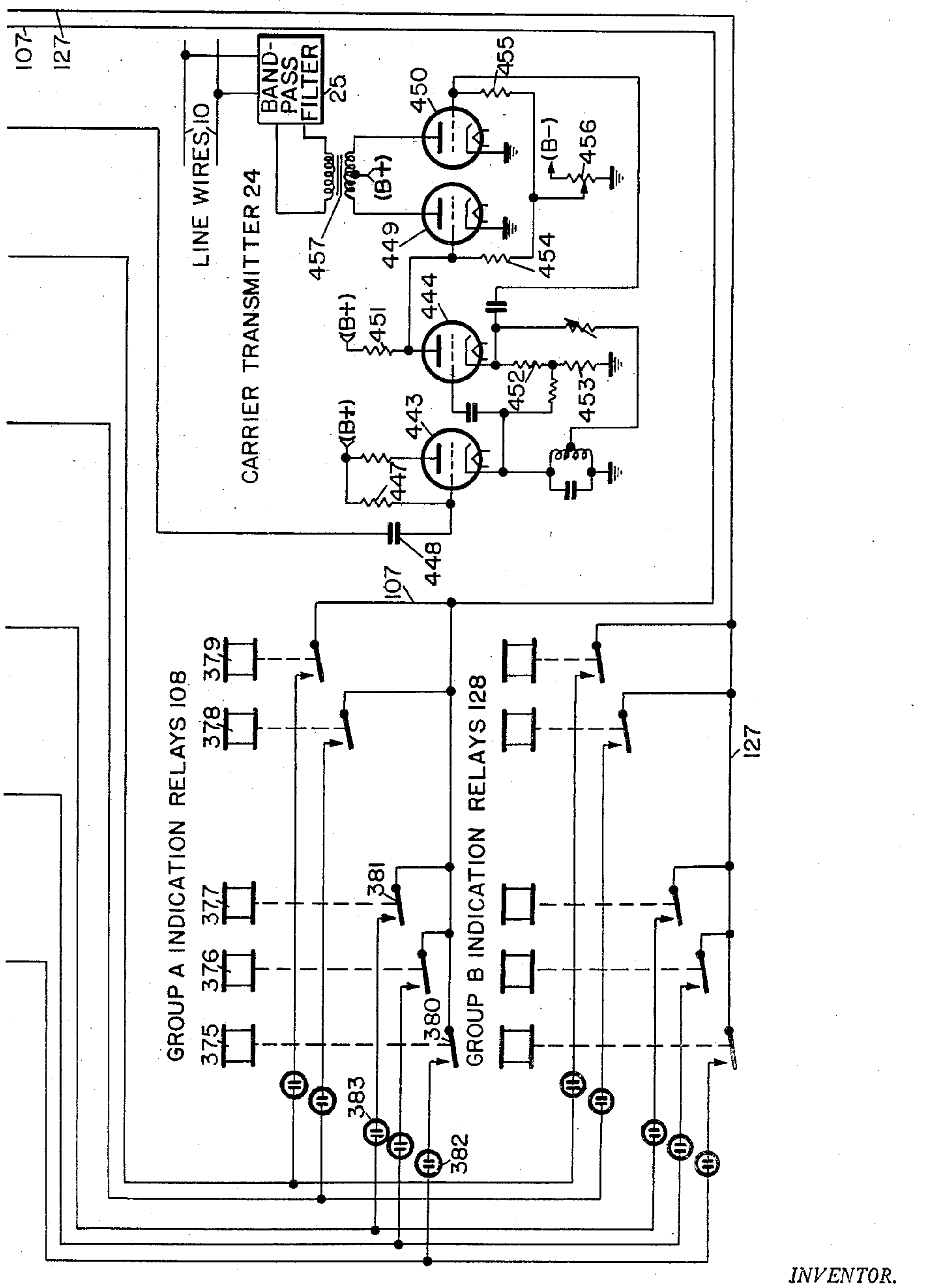

In a manner similar to that described for the gated amplifier 92, the firing of tube 407 causes a positive-going pulse to be applied over wire 107 to the contacts of the group A indication relays shown in Fig. 7D. As described in connection with the operation of the shift register, this pulse on wire 107 causes the various stages of the shift register to be properly conditioned at the beginning of the station period in accordance with the desired code pattern to be transmitted to the control office on that station period. The connection with respect to the secondary winding of transformer 404 differs somewhat from that of transformer 396. Transformer 404 has the lower terminal of its secondary winding connected directly to the junction of resistors 399 and 400. Thus, a positive biasing potential appears on bus 107, and this biasing potential aids in the firing of the various shift register cold cathode tubes.

During the two station periods that the glow is on cathodes K10 and K9 of station stepper 86, a positive voltage is applied through capacitor 412 to the grid of triode tube 413 included in the group A control execution amplifier 120. The grid of tube 413 is normally biased to cutoff by being connected through a resistor 414 to (B−). Being thus cut off, there is no flow of plate current through the plate load resistor 415 which is connected to (B+), nor is there any flow of plate current through resistor 416 and the winding of the group A control execution relay 121 which has its other terminal also connected to (B+). During the two station periods that the glow is on cathodes K10 and K9, however, the grid potential of tube 413 is raised sufficiently to cause this tube to conduct. As a result, current flows from (B+), through the winding of relay 121, through resistor 416 and the plate cathode circuit of the tube 413, to ground. As a result, this relay is picked up at the beginning of the station period on which the glow transfers to cathode K10 and remains energized throughout this station period and the following one until the glow transfers to cathode K8. The effect of picking up this relay 121 on execution of the controls stored in the shift register will subsequently be described in detail.

No system function is ordinarily provided when the glow of the station stepper 86 is on cathode K8. At certain of the field stations, however, a connection is made from this cathode K8 to the station stepper synchronizing control 83 for reasons already described.

On the following station period when the glow as transferred to cathode K7, a positive gating voltage is applied over wire 325 and through capacitor 417 to the control grid of the gas discharge tube 418 included in the clear-out pulse amplifier 122. The grid of this tube 418 is connected through a resistor 419 to (B−). The cathode and shield grid are both connected to the junction of resistors 420 and 421 connected in series between (B−) and ground, and as a result of this connection, the cathode and shield grid are both maintained at a potential substantially negative with respect to ground. Capacitor 422 shunting resistor 421 tends to prevent any abrupt voltage variations such as might be caused by transient variations in the voltage supply from appearing on cathode and shield grid of tube 418.

Although the cathode of tube 418 is maintained at a negative potential, the control grid, by being directly connected through resistor 419 to (B−) is at a still more negative potential so that the tube is normally biased to a cutoff condition. However, when the potential of cathode K7 is raised, the control grid voltage of tube 418 rises sufficiently with respect to the cathode voltage so that this tube will be fired. Because of the relatively large negative voltage appearing on the cathode, the plate voltage also becomes substantially negative when the tube is fired so that the grid voltage of tube 353 included in the main shift trigger amplifier 102 is suddenly driven to cutoff. Normally, this tube 353 is conductive so that a low voltage appears on bus 115 which connects to all the storage tubes in the shift register. When tube 353 is cut off by the firing of tube 418, the plate voltage of tube 353 rises to a high value so that the cathode voltage of each of the storage tubes in the shift register is raised to such a high level with respect to the plate that conduction cannot be sustained and they are all extinguished. A high voltage appears upon the bus 116 at this time also so that none of the intermediate tubes of the shift register whose cathodes are connected to bus 116 can become conductive as an associated storage tube is extinguished. In this way, the cutting off of tube 353 so that buses 115 and 116 are both at a high potential ensures that all the storage and intermediate tubes of the shift register are restored to nonconductive conditions. Any previously received control code is thus cancelled from the shift register so that the shift register is properly conditioned to receive a new indication code for stepping out of the shift register and for receiving a new control code to be stepped into the shift register.

The system functions that are accomplished when the glow is on cathode K6 of station stepper 86 are similar to those occurring when the glow is on the cathode K1. Thus, positive gating voltages are applied through capacitor 330 and over wire 331 to the oscillator gate control 95 and to the shift register control mark gated amplifier 92. Also, a positive gating voltage is applied over wire 425 to the shift register indication mark gated amplifier (group B) 126. Thus, when the shield grid of tube 411 is positively gated by a trigger pulse received from the synch and station-call pulse multivibrator 81 at the beginning of the station period, a pulse is produced on wire 127, and this pulse is then selectively applied through contacts of the group B indication relays of Fig. 7D to the various stages of the shift register. In this way, an indication code is applied to the shift register whose digits correspond to the operated conditions of the group B indication relays.

During the two following station periods when the glow is on cathodes K5 and K4 of station stepper 86, a positive gating voltage is applied over wire 426 and through capacitor 427 to the control grid of tube 428 included in the group B control execution amplifier 130. This gating voltage makes tube 428 conductive so that there is a flow of plate current of this tube through the winding of the group B control execution relay 131 of Fig. 7C. Thus, on these two station periods, the relay 131 is then picked up so that the group B controls stored in the shift register may be executed in a manner to be described.

As illustrated in the chart of Fig. 9A, no particular system function is accomplished on the station period during which the glow is on cathode K3 of the station stepper 86. However, as shown in Fig. 7A, at certain of the field stations, a connection may be provided from this cathode K3 to the station stepper synchronizing control 83.

During the next station period, when the glow is on cathode K2 of station stepper 86, a positive gating voltage is again applied over wire 325 to tube 418 of the clear-out pulse amplifier 122. Exactly as in the manner already described, the firing of tube 418 causes the voltage on bus 115 to be raised to a high level at the same time that the voltage on bus 116 is already at a high level so that all of the tubes of the shift register are restored to their normal nonconductive conditions, and the shift register may be considered as being cleared out of any previously received controls.

*Execution of controls*

Each control code received at a field station and stepped into its shift register is subsequently executed by selectively controlling the various control relays in accordance with the conditions of the various shift register stages. After the group A controls have been received, the group A control relays are made responsive to the conditions of the shift register stages; the group B control relays are similarly made responsive to the conditions of the shift register stages immediately after the group B control codes have been stepped into the shift register.

As described in connection with the control matrix and control levers of the control office apparatus, the particular code characters transmitted on the first two pulse periods of a station period may be determined in accordance with the position of a two position switch or control lever. This switch selects whether a mark digit appears on the first or second pulse period of the code; a space digit is then transferred on the remaining pulse period. These first two digits of the control code are eventually stored in shift register stages Nos. 15 and 14 in accordance with the description already given of the shift register. It will be shown how the codes of these last two stages of the shift register may be made effective to control the operation of a single control relay in either the group A or the group B bank of control relays.

A three-position control lever may also be readily used as has been described to select on which of three successive pulse periods a mark character shall be transmitted. The detailed circuits of the control office apparatus show how such a three-position control lever determines the make-up of the control code transmitted on the last three pulse periods of a station period. Since the last three code digits are eventually stored in the shift register stages Nos. 1, 2, and 3, it is shown in Fig. 7C how these three stages of the shift register may be used to control the conditions of two of the control relays of a bank of control relays.

Each of the relays controlled by the shift register is shown in Fig. 7C as being a magnetic stick type of relay. Energization of the upper winding causes the relay to pick up, while energization of the lower winding causes it to drop away. The magnetic stick characteristic causes each relay to remain in its last-actuated position until controlled to the opposite position.

Each storage tube of a shift register stage has its plate connected through a resistor to (B+). The plate of tube 360 of the shift register stage No. 0 has its plate connected in this way through resistor 435 to (B+). The plate of tube 368 is connected also through a resistor 436, through the upper winding of relay 2RGZ, and back contact 430 of relay 2LGZ, to the bus 437. Still another connection is provided from the plate of tube 368, through resistor 438, the upper winding of relay 1RGZ ,and back contact 431 of relay 1LGZ, to bus 439. In a similar way, the upper windings of relays 1LGZ and 2LGZ are connected through respective resistors to the plate of tube 395 included in the shift register stage No. 3.

The plate of tube 384 which is the storage tube for shift register stage No. 2 is connected through resistor 440, and through the windings of relays 2LGZ and 2RGZ in parallel to bus 437. This plate of tube 384 is similarly connected through resistor 441 and the lower windings in series of relays 1LGZ and 1RGZ to bus 439.

If it is assumed that the three-position control lever at the control office is so positioned that a mark character is transmitted on the fifteenth pulse period so that space characters are transmitted on the fourteenth and thirteenth pulse period, then the shift register at the corresponding field station will have its stage Nos. 1 to 3 so conditioned that tube 368 will be conductive while tubes 384 and 385 will be nonconductive. If it is further assumed that it is the group A controls that have been received, then, according to the description already given with respect to the various system functions provided by station stepper 86, it will be clear that on the two station periods immediately following the reception of such group A controls, the group A control execution relay 121 will be picked up. When relay 121 picks up, it closes its front contact 442 so as to energize the bus 439. There is then a flow of current from (B+), through front contact 442, bus 439, back contact 431 of relay 1LGZ, the upper winding of relay 1RGZ, resistor 438, and through the plate-cathode circuit of the now conducting tube 368. This tube has its cathode connected over bus 115, and this bus is connected to the plate of tube 353 so that a path is provided from the plate of this tube 353 to ground so as to complete a circuit which includes the upper winding of relay 1RGZ. As a result of this energization, relay 1RGZ is picked up.

If the group A control code were so arranged that a mark character were received on the thirteenth instead of the fifteenth pulse period, tube 385 of stage No. 3 would be conductive; whereas, tubes 368 and 384 would then be nonconductive. Under these conditions, a circuit would be completed upon the picking up of relay 121, and this circuit would cause current to pass through the upper winding of relay 1LGZ so as to pick up this relay.

If the control code were so arranged that a mark were transmitted on the fourteenth pulse period and with spaces appearing on the thirteenth and fifteenth pulse periods so that tube 384 would be conductive, a circuit would then be completed upon the picking up of relay 121 to energize the lower windings of both relays 1RGZ and 1LGZ. Energization of these lower windings would then result in the dropping away of both of these relays.

In this way, three successive digits of the control code may be utilized for the control of two relays at a field station to any one of three distinctive conditions. Thus, the transmission of a mark on the fifteenth pulse period causes the picking up of relay 1RGZ at a selected field station. The transmission of a mark on the thirteenth pulse period results in the picking up of relay 1LGZ at the same field station. Transmitting a mark on the fourteenth pulse period causes both relays 1RGZ and 1LGZ to be dropped away.

Following the reception of the group B controls at any field station, the group B control execution relay 131 is picked up. Energy is then applied to bus 437 so that the relays 2RGZ and 2LGZ then become responsive to the conditions of the first three shift register stages in exactly the same way as just described for relays 1RGZ and 1LGZ.

Any two shift register stages such as stages Nos. 14 and 15 may be used to control a single relay in either of the group A or group B banks of control relays. If a mark is transmitted on the first pulse period so that storage tube 445 of stage No. 15 becomes conductive, then the lower winding of either relay 1NWR or 2NWR is energized depending upon whether it is a group A or a group B control that is being executed. Similarly, the upper windings of these relays may be selectively energized if a mark is transmitted on the second pulse period so as to cause the tube 446 of stage No. 14 to become conductive. In this way, the transmission of a mark on the first pulse period of the group A code for a second station causes the relay 1NWR at that station to be dropped away. The transmission of a mark on the second pulse period of the group A control for that station results in the picking up of the relay 1NWR at that station.

*Carrier transmitter*

The carrier transmitter 24 shown in Fig. 7D is modulated directly from the last stage of the shift register and is effective to cause the distinctive carrier frequency F2 to be selectively applied to the line wires in a particular code pattern of marks and spaces.

The carrier transmitter 24 is, in most respects, similar to the carrier transmitter provided at the control office and shown in Fig. 4C. The carrier transmitter 24 also includes a pulsed Hartley oscillator comprising the tubes 443 and 444. Tube 443 is normally conductive because its control grid is connected through resistor 447 to (B+). With tube 443 conductive, the oscillator is inoperative so that carrier frequency F2 cannot be applied to the line wires 10.

The control grid of tube 443 is connected through a coupling capacitor 448 to the plate of the cold cathode intermediate tube 458 of shift register stage No. 15 shown in Fig. 7C. Normally tube 458 is in a non-conductive condition so that its plate voltage is at a relatively high level, and capacitor 448 is then charged to this high potential existing between the plate of tube 458 and the grid of tube 443 which is at approximately ground potential.

According to the description of the shift register that has already been given, the stepping of a control code into the shift register on selected station periods of a cycle is accompanied by the stepping out of an indication code through the last stage of the shift register. In effect, the last stage of the shift register is selectively controlled to its "0" or its "1" condition on successive pulse periods in accordance with the indication code previously stored in the shift register. For each space character of the indication code, tube 445 of stage No. 15 remains nonconductive. Therefore, when bus 115 is raised in potential, tube 458 remains nonconductive because there is then no change in the condition of tube 445.

On each pulse period that a mark character appears in the last stage of the shift register, tube 445 is fired. Then the raising of potential across bus 115 causes tube 445 to be extinguished and tube 458 is then fired. Each time that tube 458 is fired in this way for the occurrence of a mark character in the indication code, there occurs a decrease in plate potential of this tube throughout the corresponding pulse period. As a result, there is an abrupt decrease of voltage at the grid of tube 443, and this voltage decrease is of sufficient magnitude and duration to hold tube 443 nonconductive throughout that pulse period. As a result, the oscillator becomes operative, causing the plate current of tube 444 to vary sinusoidally at a frequency selected by the tank circuit in the cathode circuit of tube 445.

Tube 444 is provided with a load resistor in both its plate and cathode circuits so that the required out-of-phase voltages may be provided to drive the push-pull power amplifier including tubes 449 and 450. The grid of tube 449, for example, receives an input voltage that is developed across the plate load resistor 451 of tube 444; whereas, the input grid voltage of tube 450 is obtained from the voltage drop appearing across the series resistors 452 and 453 appearing in the cathode circuit of tube 444.

The grids of tubes 449 and 450 are also connected through the respective resistors 454 and 455 to a tap on the potentiometer 456 which is connected between (B−) and ground. The tap on the potentiometer is adjusted to provide the desired bias for tubes 449 and 450, thereby providing a means for regulating the output level of this amplifier stage. The primary winding of a transformer 457 is included in the plate circuits of tubes 449 and 450, and a tap on this primary winding is connected directly to (B+). The alternating voltage induced in the secondary winding and having the frequency F2 is applied through the band-pass filter 25 to line wires 10.

The carrier transmitter 24 is thus normally inactive. As an indication code is stepped out of the shift register, the intermediate tube 458 of the last shift register stage becomes conductive for each mark character appearing in the indication code. Since only one-half of a pulse period elapses following the transfer of the code character to tube 458 before the potential on bus 116 is raised to extinguish this tube 458, the tube remains in its conductive stage only for one half of a pulse period. Since the carrier transmitter 24 is effective to supply the carrier frequency F2 to the line wires only throughout the time that tube 458 is conductive, it follows that the indication code includes mark characters which are similar to those appearing in the control code in that they comprise a pulse period in which carrier frequency is transmitted for the first half but with no carrier transmitted on the second half.

CONTROL OFFICE APPARATUS—RECEPTION OF INDICATIONS

*Carrier receiver*

The indication code comprising intermittent pulses of carrier frequency F2 is applied from the line wires 10, through band-pass filter 26, to the control grid of amplifier tube 464 included in the carrier receiver 27. Both the tube 464 and tube 465 are operated as cathode biased, class A amplifier stages with resistance-capacitance coupling used between the stages. The plate voltage of tube 465 which comprises intermittent pulses of the carrier frequency F2, is applied through a coupling capacitor 466 to the cathode of a diode rectifier 467. Filtering of the rectified output appearing at the plate of this rectifier 467 is provided by a filter comprising resistors 468 and 469 as well as capacitors 470 and 471. As a result of this rectification and filtering, there is applied to the control grid of the triode amplifier tube 472, through resistor 473, a voltage which has a negative-going pulse for each occurrence of a carrier pulse applied to the receiver input.

*Squaring amplifier*

The squaring amplifier 140 is essentially an over-driven amplifier whose control grid is connected through resistor 473 to the junction of resistors 474 and 475 connected in series between (B+) and ground. Because of the positive bias that is applied to the control grid in this manner, tube 472 is normally in a fully conductive condition so that there is a high voltage drop across its plate load resistor 476. For each occurrence of carrier frequency F2 in the received indication code, the control grid of tube 472 is driven negatively with respect to its grounded cathode so that the tube becomes cut off and its plate voltage rises to a higher level. Since only a relatively small voltage variation at the control grid of this tube 472 causes the tube to vary from its normally conductive condition to a cutoff condition, the variations in plate voltage of tube 472 are relatively abrupt with the result that a substantially square wave of voltage appears at the plate of this tube and is applied, through the coupling capacitor 477, to the control grid of tube 478 included in the mark multivibrator 141.

*Mark multivibrator*

Tubes 478 and 479 are included in a one-shot multivibrator which is normally in the condition where tube 479 is conductive and tube 478 is nonconductive. In response to the positive-going leading edge of each pulse appearing at the plate of tube 472, the conductive conditions of these two tubes 478 and 479 are abruptly reversed. This condition is illustrated in Fig. 5B which shows at line V that the mark multivibrator 141 reverses its condition upon the leading edge of each pulse provided by the receiver 27. This negative-going leading edge of the receiver pulse is coincidental with the positive-going leading edge of the output pulse provided by the squaring amplifier 140. After a brief interval which is less than the 2½ millisecond interval that carrier frequency F2 is applied for an indication mark, the mark multivibrator 141 restores itself to its normal condition. The resulting negative-going trailing edge of the voltage appearing at the plate of tube 479 of this multivibrator produces a negative trigger pulse at the grid of tube 480 of the trigger delay 142.

*Trigger delay*

The trigger delay comprises a differentiator circuit similar to those already described. Tube 480 becomes nonconductive for a time in response to the negative-going pulse applied to its control grid through capacitor 481, and during this interval of nonconduction the plate voltage of tube 480 rises to substantially the (B+) level because there is then no plate current drop through its load resistor 482. Consequently, as shown in Fig. 5B at line W, a positive-going trigger pulse is provided by the trigger delay to bus 143 each time that the mark multivibrator 141 restores itself to its normal condition wherein tube 478 is nonconductive.

*Indication storage matrix*

Figure 4D:
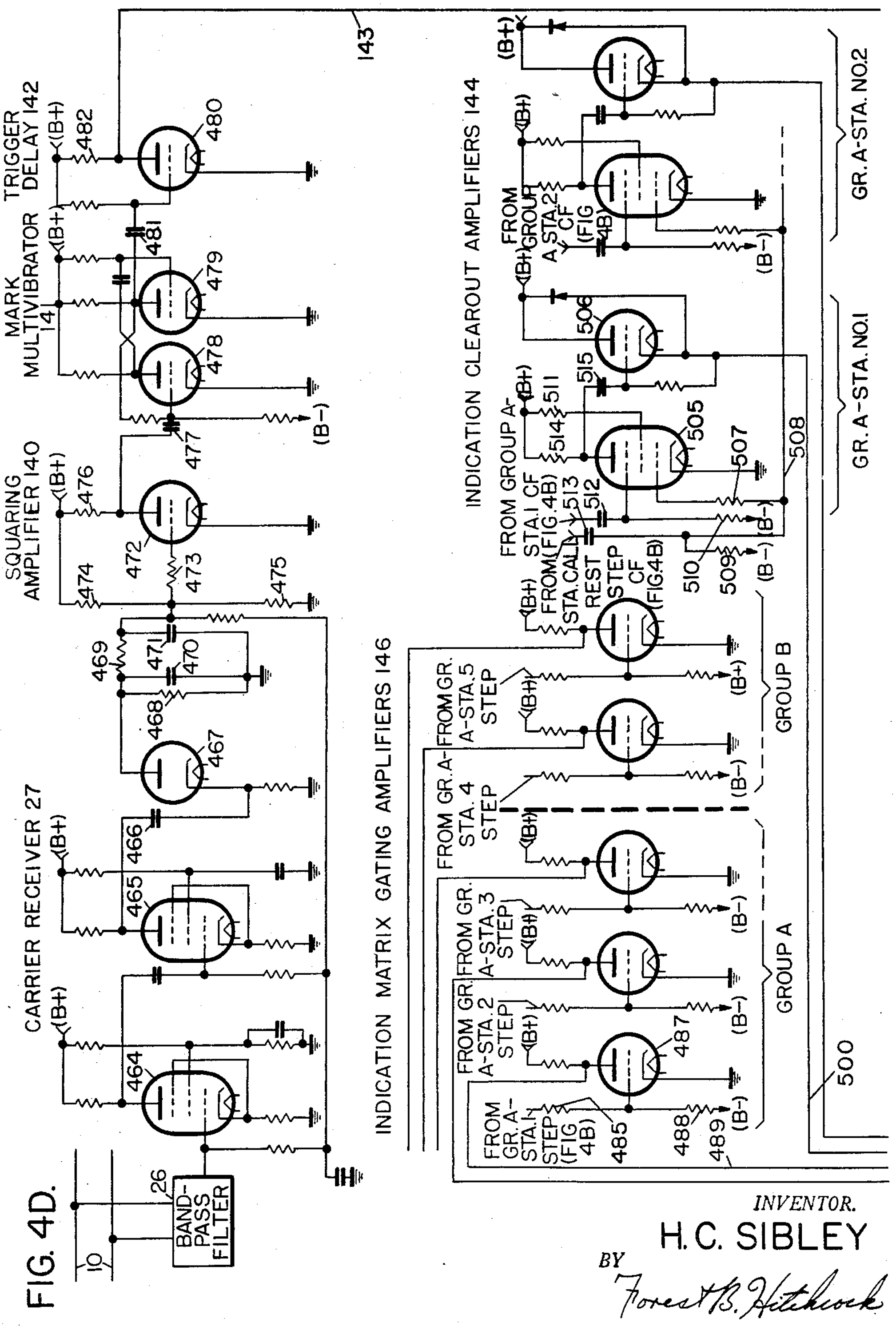
Figure 4E:
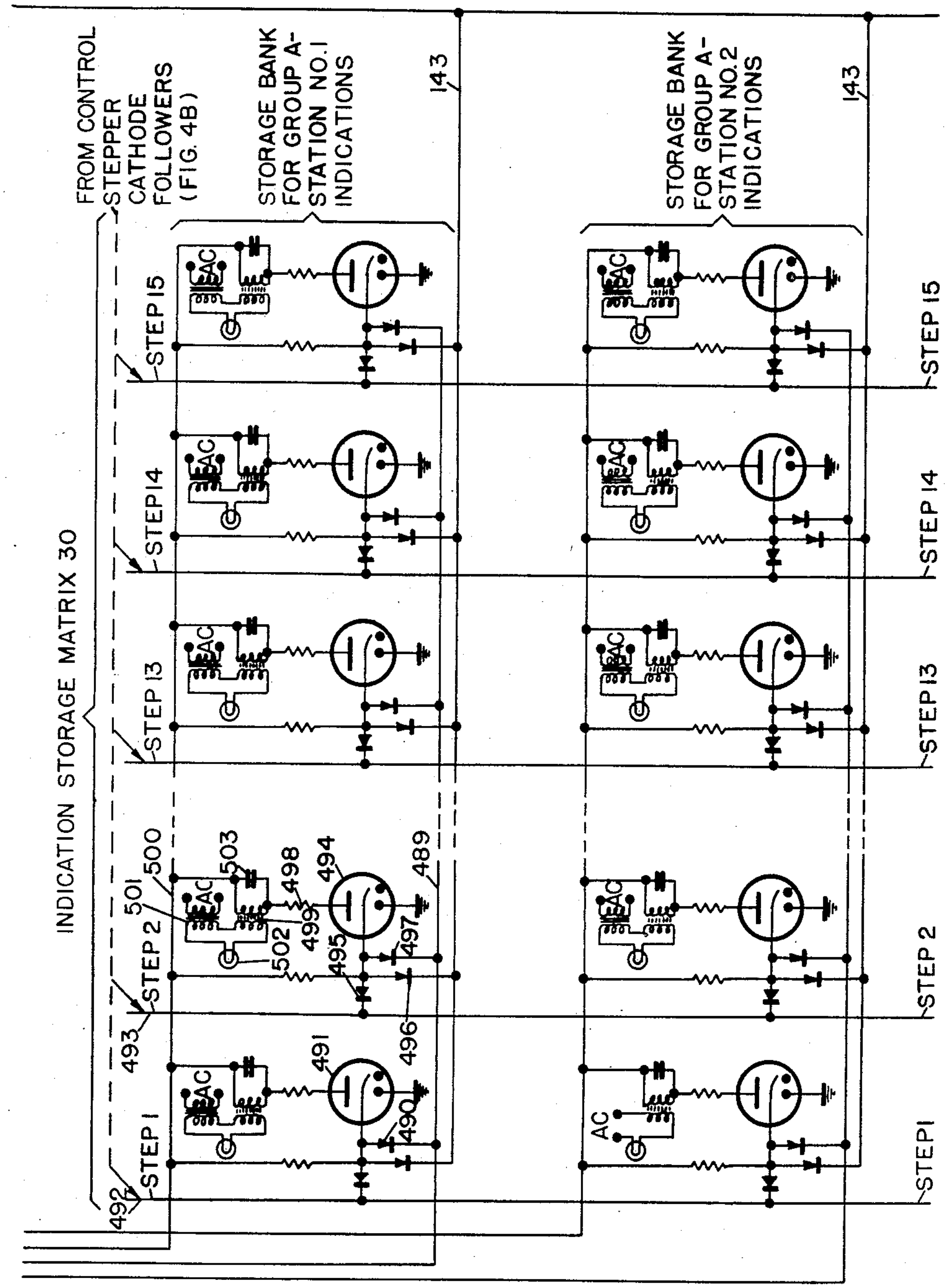

The indication storage matrix 30 illustrated in Fig. 4E comprises a number of banks of cold cathode storage tubes. One such bank of cold cathode storage tubes is provided for each station period in a cycle of operation and is used for storing all of the indications received on each cycle during that particular station period. Actually, therefore, two such banks of storage tubes are provided for each field station in the system; one bank is provided to store the group A indication codes from that station, and the other bank is provided to store the group B indication codes from that station.

Each such bank of storage tubes includes an individual tube for each of the fifteen pulse periods included in that station period. The cathode of each storage tube is grounded and its plate is connected through a plate resistor and the primary winding of a saturable transformer to a bus. The plate of tube 494 is thus connected through a resistor 498 and the primary winding of transformer 499 to bus 500. Bus 500 is normally at a relatively high potential by being connected to the cathode of cathode follower amplifier tube 506 included in the indication clear-out amplifiers 144.

Each of the storage tubes is gated from three different sources, and all three gating voltages must be simultaneously present before any storage tube can become fired. On any station period, the proper one out of all of the banks of storage tubes is selected by a gating voltage obtained from the indication matrix gating amplifiers 146.

Each of these gating amplifiers comprises a triode amplifier tube having its cathode grounded and its grid connected to a respective one of the stages of station stepper 44 of Fig. 4B. The particular gating amplifier tube 487 relating to the group A-station No. 1 station period, for example, has its control grid connected through resistor 485 to the right-hand plate of the group A-station No. 1 stage of station stepper 44. During the group A-station No. 1 station period, this particular stage of the station stepper is in its "1" condition so that the right-hand half of its tube 486 is conductive. Consequently, a relatively low plate voltage exists at this right-hand plate of tube 486, and this voltage is sufficiently low so that it cannot overcome the negative bias provided for the control grid of tube 487 by its connection through resistor 488 to (B−). Tube 487 is, therefore, cut off so that its plate voltage is at a high level. This high plate voltage is then applied over bus 489 to each of the tubes included in the group A-station No. 1 bank of storage tubes and provides one of the required gating voltages for these tubes. A connection is provided from the bus 489 through an isolation rectifier to the grid of an associated cold cathode storage tube. For example, a connection is provided from bus 489 through the isolation rectifier 490 to the grid of cold cathode tube 491 which is the storage tube provided for the control of the code character received on the first pulse period of this particular station period.

On each other station period in a cycle, the group A-station No. 1 stage of the station stepper is in its "0" condition so that the right-hand half of tube 486 is nonconductive. The plate voltage that is applied under these circumstances to the control grid of tube 487 included in the gating amplifiers 146 sufficiently raises the grid voltage of tube 487 to make this tube conductive. Its plate voltage is then lowered so that a low voltage appears on bus 489, and this voltage is not of sufficient amplitude to properly gate the grids of the various storage tubes connected to this bus. In a similar way, the various gating amplifiers 146 are effective to select the proper bank of storage tubes relating to the particular station period then in effect.

The particular storage tube out of each bank of storage tubes that is to be responsive to receive the indication character appearing on any pulse period is selected by providing additional gating voltages to the storage tubes from the cathode followers associated with the various steps of the control stepper 43. On each pulse period of a station period, one of the steps Nos. 1 to 15 of the control stepper 43 is in its "1" condition with the result that the corresponding cathode follower connected with that stage of the control stepper supplies a high output voltage to one of the buses supplying the indication storage matrix 30. Consequently, with the step No. 1 stage of the control stepper in its "1" condition during the first pulse period of each station period, the bus 492 shown in Fig. 4E has its potential raised to a relatively high level. On the second pulse period of any station period, the potential of bus 492 is restored to its normal value, and at the same time the voltage on bus 493 is raised to a higher level. Although all of the storage tubes relating to the step No. 2 are thus gated by the voltage appearing on bus 493, only the particular bank of storage tubes as selected by one of the gating amplifiers 146 is at that time also receiving the required second gating voltage. In this way, only one out of the entire matrix of tubes is simultaneously receiving two gating voltages on any pulse period of a cycle. Thus, the gating voltages are effective to condition the various tubes of the matrix 30 at the proper time in each cycle.

When any tube thus receives the required gating voltages, that tube can then actually become conductive only provided that it also receives a positive-going trigger pulse from bus 143. From the description that has been given, it is clear that such a positive-going trigger pulse will appear on bus 143 only if a mark character has been received on that particular pulse period of the indication code. For example, during the second pulse period of the group A-station No. 1 station period, the storage tube 494 receives simultaneously gating voltages from buses 493 and 489. If, during this pulse period, a positive-going trigger pulse also appears on bus 143, the cumulative effect of all three voltages appearing on these buses will raise the grid potential of tube 494 to a sufficiently high level so that this tube will become conductive.

Fig. 5B illustrates how the various storage tubes of one of the banks included in the matrix are selectively made conductive by a received indication code. A time-spaced pattern of indication marks is shown, each of which results in a positive-going trigger pulse from the trigger delay. These indication pulses are received during the group B-station No. 5 station period as evidenced by the fact that the station stepper is then providing a high output voltage from its group B-station No. 5 stage as shown at line L of Fig. 5A. Because of this, only the bank of storage tubes relating to this particular station period receives the required station period gating voltage.

On each pulse period of this station period, one of the tubes in the bank corresponding to the period is then receiving a second gating voltage. For example, at the time of occurrence of the first of the output pulses shown as being provided by the trigger delay (line W of Fig. 5B) the step No. 1 stage of the control stepper is providing a high output voltage as indicated at line F of Fig. 5A. In this way, only the step No. 1 tube of this particular bank is receiving the required second gating voltage so that only this tube can be fired by the output pulse of the trigger delay which is applied simultaneously to all the storage tubes of the matrix. In the same manner, each of the succeeding output pulses of the trigger delay results in making conductive only the corresponding storage tube of those included in the matrix. The received indication pulses then result in selectively making conductive the various tubes of the storage matrix in the manner indicated in line X—HH of Fig. 5B.

Each of the storage tubes such as tube 494 is connected to one of the gating buses through an isolation rectifier. Tube 494 is thus connected through rectifiers 495, 496, and 497 to the buses 493, 143, and 489, respectively. These rectifiers prevent undesired feed-around conditions from occurring. For example, the rectifier 495 prevents a positive gating voltage on bus 143 from also appearing on bus 493 and thus being applied to all the step No. 2 storage tube in the matrix.

*Indication lamps*

When a storage tube of the matrix 30 is in its normal condition, there is no flow of plate current through the tube. When tube 494 is in its normal condition, for example, there can be no flow of plate current through its plate resistor 498 and through the primary winding of the saturable transformer 499 to the bus 500. Under these circumstances, the reactance provided by the secondary winding of saturable transformer 499 is high. Consequently, the alternating-current voltage applied to the circuit encounters a sufficiently high impedance so that there is not a sufficient flow of current through the corresponding indication lamp 502 to cause this lamp to be lit.

However, when storage tube 494 has been made conductive by the occurrence of an indication mark at the proper place in the indication code, there is a flow of plate current through the primary winding of saturable transformer 499, and this results in a substantial lowering of the reactance of the secondary winding. Accordingly, the impedance of the secondary circuit is lowered so that the voltage provided by the A. C. source can produce a sufficient flow of current to light lamp 502. In this way, a visual indication is provided by the indication storage matrix 30 by means of the illumination of a lamp for each conducting storage tube. A somewhat similar circuit organization may be provided so that each conductive storage tube will cause the energization of a corresponding relay.

At the beginning of each station period, the particular bank of storage tubes that is to be gated so as to be responsive to the indications to be received on that station period is cleared out of all previously stored indications. This clear-out of indications is accomplished by restoring each of the storage tubes in that particular bank to its normal nonconductive condition and this is accomplished by the indication clear-out amplifiers 144.

The indication clear-out amplifiers 144 include two amplifier tubes for each station period and thus for each bank of storage tubes in the matrix 30. The clear-out amplifier relating to the storage bank for the group A-station No. 1 station period comprises the pentode tube 505 and triode amplifier tube 506. Both the control and suppressor grids of tube 505 are normally biased to an extent to prevent the tube from becoming conductive. The bias for the control grid is provided by a connection through resistor 507 to the bus 508. Normally, the bus 508 is at a low voltage by reason of the connection that is provided from this bus 508 through resistor 509 to (B−). The suppressor grid of tube 505 is connected through a resistor 510 to (B−) to obtain the desired cutoff bias for this grid. The required positive operating voltage for the screen grid of this tube 505 is provided by a connection, through resistor 511, to (B+).

During the group A-station No. 1 station period of a cycle, the output voltage provided by the cathode follower connected to the corresponding step of the station stepper 44 provides a relatively high output voltage. As indicated in Fig. 4D, this voltage is applied through capacitor 512 to the suppressor grid of tube 505 and sufficiently raises the potential of the suppressor grid during this station period to properly gate this grid of the tube.

The bus 508 is provided with a gating voltage from the station-call rest step cathode follower of Fig. 4B. Consequently, a position gating voltage is applied through capacitor 513 to bus 508 only when this particular step of the control stepper 43 is in its "1" condition.

Since tube 505 can become conductive only when the potentials of both its suppressor and control grids are suitably raised with respect to the grounded cathode, it is clear that this tube can become conductive only during the five millisecond pulse period of the group A-station No. 1 station period during which the station-call rest step of the control stepper is in its "1" condition.

When tube 505 is in its normal nonconductive condition, it provides a relatively high plate voltage because of the lack of a plate current drop through its plate load resistor 514. Under these conditions, the cathode follower tube 506 is fully conductive so that its cathode is at a relatively high voltage, and this high voltage is then applied over bus 500 to the plate of each of the storage tubes of matrix 30 which are in the group A-station No. 1 bank of storage tubes. As a result, these tubes are normally provided with the required high plate voltage so that they can selectively be made conductive.

When the pentode tube 505 becomes momentarily conductive at the beginning of the group A-station No. 1 station period, the normally charged capacitor 515 discharges and so reduces the grid voltage of tube 506 that this tube is cut off. The cathode voltage of this tube then is so lowered that sufficient voltage is no longer present on bus 500 to maintain the tubes in the group A-station No. 1 bank of storage tubes in conductive condition so any tube which had been controlled to be conductive in accordance with the indication code received on the preceding cycle is restored to a nonconductive condition. In this way, the indication clear-out amplifiers 144 cause each bank of storage tubes to be cleared out of all previously received indications just prior to the reception of a new indication code.

On a particular station period there may be no change from one cycle to the next so that a storage tube which is conductive on one cycle of operation may, after being momentarily extinguished by the indication clear-out amplifiers 144, be immediately restored to a conductive condition by the newly received indication code. Although the corresponding storage tube is thus momentarily in a nonconductive condition, the indication lamp associated with that tube will remain illuminated. This results from the fact that a capacitor is connected across the primary winding of the saturable transformer. For example, capacitor 503 is connected in parallel with the primary winding of transformer 499 in the plate circuit of tube 494. The charge stored in such capacitor during the time that the tube is conductive discharges through the primary winding of the saturable transformer during the short interval that the tube is nonconductive with the result that the conditions with respect to the saturable transformer are substantially unchanged, and the indication lamp controlled thereby is thus not effective.

*Field station application circuits*

Fig. 10 illustrates the manner in which the communication system of the present invention may be used to control various devices such as signals and switches at a typical wayside location and also shows how various indication relays are governed by the conditions at the wayside location.

The various control relays shown in Fig. 10 correspond to those illustrated in Fig. 7C. These relays are controlled by various stages of the shift register in a manner already described. The typical wayside location is shown as including a stretch of main track having a passing siding with traffic selectively routed by a switch operated by the switch machine 1SM. Signals 1LA and 1LB are provided to control the movement of westbounrd traffic left through switch 1SM, and the signal 1R similarly controls eastbound traffic to the right through this switch. The track section 1T is provided to detect the presence of trains in the area and has associated therewith the track relay 1TR.

The picking up of relay 1RGZ results in the clearing of the signal 1R. The particular aspect displayed by this signal is governed by local circuits at the field station location. The picking up of relay 1LGZ similarly causes the clearing of either signal 1LA or 1LB in accordance with existing traffic conditions. When both these relays 1RGZ and 1LGZ are dropped away, all the signals at the wayside location are controlled to display stop indications. Switch machine 1SM is controlled by relay 1WZ. The picking up of relay 1WZ causes the switch to be operated to its normal position, while relay 1WZ in its dropped away condition causes the switch to be operated to its reverse condition.

Relay 1RRGP is a signal indication repeater relay. Whenever the signal 1R is controlled to display a stop indication, relay 1RRGP is picked up. For any other single indication of this signal 1R, the relay 1RRGP is dropped away. Relay 1LRGP repeats the condition of signals 1LA and 1LB in a similar manner. Track occupancy indication is provided in accordance with the condition of track repeater relay 1TR. When track section 1T is occupied, the normally energized track relay 1TR drops away. The actual operated position of the switch controlled by switch machine 1SM is in accordance with the conditions of the switch repeater relays 1RWP and 1NWP. When the switch machine has been operated to its fully normal condition, relay 1NWP is picked up. When the switch machine is operated to its reverse condition, relay 1NWP is picked up. When the switch machine is operated to its reverse condition, relay 1RWP is picked up.

These various indication relays control the conditions of corresponding stages of the shift register in the manner previously described. Thus, these relays determine the makeup of the indication code transmitted back to the control office and so govern the indications displayed at the control office.

Having described an electronic code communication system as one specific embodiment of this invention, I desire it to be understood that various other forms may be provided to illustrate the specific embodiment of this invention without in any manner departing from the spirit or scope of the present invention.

What I claim is:

1. An electronic code communication system for transmitting controls over one channel and indications over a second channel between a control office and a remote field station location comprising, coding circuit means at said control office for repeatedly transmitting to said field staton over said one channel of communication a series of distinctively time-spaced code characters on successively occurring pulse perods representing the control code for said station, a shift register at said field station having a separate stage for each of said pulse periods, first circuit means for repeatedly conditioning selected stages of said shift register to distinctive conditions in accordance with an indication code to be transmitted prior to the reception of the control code for said station, second circuit means for applying said time spaced pulses constituting the control code for said station to the first stage of said shift register, shift pulse means connected to each stage of said shift register to cause the condition of any stage to be transferred to the next on each succeeding pulse period, means responsive to the condition of the last stage of said shift register to cause distinctive code digits to be transmitted over said second channel of communication to said control office, whereby the stepping of said control codes into said shift register as governed by said shift pulse means concurrently causes the indication code previously stored in said shift register stages to be stepped out of said shift register and result in the transmission of distinctive time-spaced digits to said control office.

2. An electronic code communication system for transmitting controls and indications simultaneously between a control office and a remote field station location over separate communication channels comprising, circuit means at said control office for transmitting repeatedly over one of said channels a series of distinctively time-spaced pulses on selected ones of a succession of regularly occurring pulse periods thereby constituting the control code for said station, a shift register at each field station comprising a plurality of cascaded bistable state stages each operated to its normal condition prior to the reception of said control code at said field station, means for causing the first stage of said shift register to be operated from its normal condition in response to each of said distinctive control code pulses, circuit means for operating selected stages of said shift register to their opposite conditions subsequent to said operation of said stages to their normal condition and prior to the reception of said control code to thereby cause the successive stages of said shift register beginning with the last to correspond by their operated conditions with an indication code desired to be transmitted over a different channel of communication, shift pulse means effective on each pulse period to transfer the condition of any shift register stage not in its normal condition to the next succeeding stage, transmitting means governed by the last stage of said shift register and effective to transmit a distinctive indication code pulse to said control office over another of said channels for each operation of said last shift register stage from its normal condition, whereby the stepping of a control code into the various stages of said shift register is accompanied by the transmission of an indication code to said control office.

3. A system for transmitting controls and indications between a control office and a field station comprising, apparatus at said control office for repeatedly transmitting to said field station code pulses on selected ones of a plurality of successively occuring pulse periods constituting a station period, circuit means at said field station including a shift register being adapted to store a control code and to cause an indication code to be transmitted to said control office, said shift register including a stage for each of said pulse periods, each shift register stage comprising a storage tube and an intermediate tube each being of the cold cathode grid glow type, circuit means simultaneously acting selectively on the grid of the storage tube of each stage for rendering said tube conductive to thereby selectively condition the various stages of said shift register in accordance with said indication code to be transmitted to said control office, circuit means acting on the grid of the storage tube for the first stage to make said tube conductive for each received control code pulse, a plate circuit for each tube connecting said plate through a load resistor to a source of positive voltage, coupling circuit means connecting the plate of the storage tube of each stage to the grid of the intermediate tube of the same stage and for connecting the plate of the intermediate tube of each stage to the storage tube of the next stage, shift pulse circuit means for controlling the voltage on the cathodes of said shift register tubes, said shift pulse means being normally effective to maintain the cathodes of said storage tubes at a low voltage to thereby provide a plate-cathode voltage sufficient to permit the associated tube to become conductive in response to a positive voltage pulse applied to its grid, said shift pulse means becoming also responsive during each pulse period to raise first the voltage on the cathodes of all said storage tubes and then the voltage on the cathodes of all said intermediate tubes, indication code transmitting means governed by the last stage of said shift register and being effective to transmit an indication code pulse to said control office for each occurrence of conduction of said intermediate tube of the last stage, whereby the stepping of an indication code into the stages of said shift register is accompanied by the transmission of an indication code to said control office.

4. A system for transmitting controls and indications between a control office and a field station comprising, apparatus at said control office for repeatedly transmitting to said field station code pulses on selected ones of a plurality of successively occurring pulse periods constituting a station period, circuit means at said field station including a shift register being adapted to store said control code, said shift register including a stage for each of said pulse periods, each shift register stage comprising a storage tube and an intermediate tube each being of the cold cathode grid glow type, circuit means acting on the grid of the storage tube of the first stage to make said tube conductive for each received control code pulse, a plate circuit for each tube connecting said plate through a load resistor to a source of positive voltage, coupling circuit means connecting the plate of the storage tube of each stage to the grid of the intermediate tube of the same stage and for connecting the plate of the intermediate tube of each stage to the storage tube of the next stage, shift pulse circuit means for controlling the voltage on the cathodes of said tubes, said shift pulse means being normally effective to maintain the cathodes of said storage tubes at a low voltage to thereby provide a plate-cathode voltage sufficient to permit the associated tube to become conductive in response to a positive voltage pulse applied to its grid, said shift pulse means becoming also responsive during each pulse period to raise first the voltage on the cathodes of said storage tubes and then the voltage on the cathodes of said intermediate tube on each pulse period of said station period, a plurality of controlled devices at said field station, means becoming effective at the conclusion of said station period to render said controlled devices responsive to the selectively operated conditions of the stages of said shift register to thereby execute said control code.

5. An electronic code type continuous scanning system for communicating between a control office and each of a plurality of field stations all connected to a communication circuit comprising control office apparatus including a station stepper for demarcating successive station periods in each cycle of operation and also including a control stepper to further demarcate successive pulse periods in each of said station periods, a plurality of nonconsecutive station periods in each cycle being allotted to communication with each of said field stations, coding circuit means at said control office for transmitting a distinctive code representing a portion of the controls intended for any station on each of the several pulse periods allotted to that station over one communication channel of said communication circuit, a station stepper at each field station being operable to a different condition on each station period, decoding circuit means at each field station governed by said station stepper and being rendered effective on each of the station periods allotted to said field station to receive the distinctive code transmitted from the control office, code storage means at said field station for receiving and storing said distinctive code received on any of said allotted station periods, circuit means also governed by said station stepper at each field station for executing and for then cancelling said code stored by said code storage means in the interval between said successive allotted station periods to thereby enable said code storage means to receive and store an additional portion of the controls intended for that station on the subsequent station period allotted to such station.

6. A continuous scanning electronic code communication system for transmitting controls and indications concurrently between a control office and each of a plurality of remote field station locations over separate communication channels comprising, an electronic stepping circuit organization at said control office being operated in each cycle of operation of said system in succession through a plurality of distinctive conditions each demarcating a station period allotted to the transmission on one of said channels of a group of distinctively time-spaced control code characters constituting the control code for one of said field stations, means at said control office for also transmitting at the beginning of each station period a distinctive station-call pulse, control code receiving and decoding means at each field station, means at each field station responsive to said station-call pulses to cause said field station to become responsive only on the particular station period allotted to that station, indication code transmitting means at each field station being made effective on said particular station period to transmit on another of said channels a group of distinctively time-spaced indication pulses constituting the indication code for that station to said control office, a matrix of cold cathode storage tubes at said control office for storing the indication code received on each station period and having a separate bank of tubes for each station period, each of said banks being selectively provided with a gating voltage by said station stepper on the station period corresponding to said bank to thereby select the particular bank to be responsive to the indication code received on such station period.

7. A continuous scanning electronic code communication system for communicating between a control office and each of a plurality of field stations, circuit means at said control office for transmitting to said field stations a series of distinctive time-spaced code characters comprising in succession the control codes for the respective field stations, the group of code characters comprising the code for each station being preceded by a distinctive station-call mark digit to thereby demarcate the successive station periods in a cycle of operation, a station stepper at each field station comprising a multicathode grid-glow cold cathode tube, means governed by each of said station-call pulses to cause the glow of said tube to transfer to an adjacent cathode, a resistor connected in series with each of said cathodes to thereby cause a voltage to appear on the cathode on which said glow appears at any time, decoding circuit means at each field station being rendered responsive by the increased voltage on a selected one of the cathodes of said station stepper tube to receive the code intended for that station, code storage means at each field station for storing said code being cleared out of said stored code by the increased voltage appearing on another selected cathode of said station stepper tube prior to the reception of said code for said station, controlled devices at each field station being selectively energized in accordance with the code stored in said code storage means on preselected station periods of said cycle following the reception of said code and prior to the clear-out of said code as governed by the increased voltage appearing during such station periods on other selected cathodes of said station stepper tube.

8. A continuous scanning code system for transmitting controls and indications concurrently between a control office and each of a plurality of remote field station locations over separate communication channels comprising, circuit means at said control office for transmitting a control code cycle including successive station periods each having distinctive control code pulses appearing on selected ones of successively occurring pulse periods, each station period being initiated by the transmission of a distinctive station-call pulse and the beginning of each cycle of operation being characterized by the transmission of a distinctive synchronizing pulse, station stepper means at each field station being operated to different distinctive conditions by each station-call pulse and being effective on selected station periods to execute predetermined system functions associated with the reception of said controls and the transmission of said indications, station stepper synchronizing means governed by said station stepper and being effective when said station stepper operates to a selected one of its plurality of distinctive conditions to maintain said stepper in said one condition and to make said stepper unresponsive to said station-call pulses, said synchronizing means being governed by the occurrence of said synchronizing pulse to make said station stepper again responsive to said station-call pulses, whereby said station stepper is resynchronized at the beginning of each cycle of operation.

9. A continuous scanning electronic code communication system for transmitting controls and indications concurrently on separate channels of communication between a control office and each of a plurality of field stations comprising, means at said control office for transmitting repeatedly a control code cycle comprising in succession groups of distinctive code pulses constituting the control for the various field stations in order, a shift register at each field statiton being selectively preconditioned according to an indication code to be transmitted to said control office, means associated with said shift register to restore a portion of the received control code intended for that station and to cause the previously stored indication code to be stepped out of said shift register to thereby provide serially occurring pulses to be transmitted to said control office.

References Cited in the file of this patent

UNITED STATES PATENTS

| | | |
|---|---|---|
| 2,584,739 | Rees et al. | Feb. 5, 1932 |
| 2,629,088 | Kendall | Feb. 17, 1953 |
| 2,678,409 | Holden | May 11, 1954 |